US012606707B2

(12) United States Patent
Kono et al.

(10) Patent No.: US 12,606,707 B2
(45) Date of Patent: *Apr. 21, 2026

(54) PIGMENT COMPOSITION, COLORING COMPOSITION, PAINT, INK, INK SET, PRINTED ARTICLE, AND PACKAGING MATERIAL

(71) Applicants: artience Co., Ltd., Tokyo (JP); TOYOCOLOR CO., LTD., Tokyo (JP)

(72) Inventors: Takayoshi Kono, Tokyo (JP); Kohei Takijiri, Tokyo (JP); Takeshi Matsumoto, Tokyo (JP); Shohei Sakamoto, Tokyo (JP)

(73) Assignees: artience Co., Ltd., Tokyo (JP); TOYOCOLOR CO., LTD., Tokyo (JP)

( * ) Notice: Subject to any disclaimer, the term of this patent is extended or adjusted under 35 U.S.C. 154(b) by 495 days.

This patent is subject to a terminal disclaimer.

(21) Appl. No.: 18/014,342

(22) PCT Filed: Jul. 14, 2021

(86) PCT No.: PCT/JP2021/026445
§ 371 (c)(1),
(2) Date: Jan. 4, 2023

(87) PCT Pub. No.: WO2022/014635
PCT Pub. Date: Jan. 20, 2022

(65) Prior Publication Data

US 2023/0365811 A1 Nov. 16, 2023

(30) Foreign Application Priority Data

Jul. 15, 2020 (JP) ................................ 2020-121014
Jun. 8, 2021 (JP) ................................ 2021-095559

(51) Int. Cl.
*C09B 57/04* (2006.01)
*C09B 67/46* (2006.01)
(Continued)

(52) U.S. Cl.
CPC .......... *C09B 57/04* (2013.01); *C09B 67/0084* (2013.01); *C09D 4/06* (2013.01);
(Continued)

(58) Field of Classification Search
CPC . C09B 57/04; C09B 67/0084; C09B 67/0034; C09D 4/06; C09D 11/037;
(Continued)

(56) References Cited

U.S. PATENT DOCUMENTS 4,340,735 A * 7/1982 Lotsch .................... C09B 57/04 106/31.77
4,645,539 A * 2/1987 Lotsch .................... C09B 57/04 106/494
(Continued)

FOREIGN PATENT DOCUMENTS

EP 0132818 B1 * 12/1986 ............. C09B 57/04
JP H10140066 5/1998
(Continued)

OTHER PUBLICATIONS

EP0132818B1 Translation (Year: 1986).*
(Continued)

*Primary Examiner* — Pamela H Weiss
(74) *Attorney, Agent, or Firm* — JCIPRNET

(57) ABSTRACT

The pigment composition contains the isoindoline compound represented by formula (1) below and the isoindoline compound represented by formula (2) below. In the formulae (1) and (2), $R_1$ to $R_4$ represent hydrogen atoms, $R_5$ and $R_6$ each independently represent alkyl groups, and A and A'
(Continued)

MANUFACTURING EXAMPLE 1-1 represent a group represented by formula (3) below or formula (5) below. In the formula (3) and (5), X represents —O— or —NH—, $R_7$ represents an alkyl group or an aryl group, and $R_{10}$ to $R_{14}$ each independently represent hydrogen atoms, halogen atoms, alkyl groups, alkoxy groups, aryl groups, aryloxy groups, thioalkyl groups, or thioaryl groups, (1)

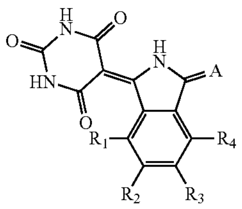

(2)

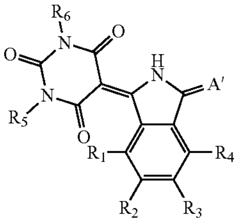

(3)

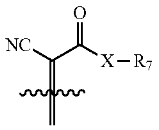

(5)

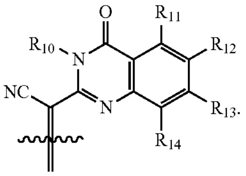

13 Claims, 3 Drawing Sheets

(51) Int. Cl.

| | |
|---|---|
| ***C09D 4/06*** | (2006.01) |
| ***C09D 11/037*** | (2014.01) |
| ***C09D 11/322*** | (2014.01) |
| ***C09D 11/40*** | (2014.01) |
| ***G03G 9/09*** | (2006.01) |

(52) U.S. Cl.
CPC .......... *C09D 11/037* (2013.01); *C09D 11/322* (2013.01); *C09D 11/40* (2013.01); *G03G 9/091* (2013.01)

(58) Field of Classification Search
CPC ........ C09D 11/322; C09D 11/40; C09D 7/41; G03G 9/091
See application file for complete search history.

(56) References Cited

U.S. PATENT DOCUMENTS

| | | | | |
|---|---|---|---|---|
| 4,845,214 A * | 7/1989 | Lotsch | C09B 67/0017 | 544/252 |
| 5,326,872 A * | 7/1994 | Wagner | C09B 57/04 | 544/298 |
| 6,120,944 A * | 9/2000 | Schadeli | G03F 7/0007 | 430/7 |
| 2006/0178402 A1* | 8/2006 | Muller | A61K 31/454 | 514/323 |
| 2008/0238998 A1* | 10/2008 | Nakazawa | B41J 11/0015 | 347/100 |
| 2011/0023754 A1* | 2/2011 | Hainz | C08K 5/0041 | 106/498 |
| 2013/0065029 A1* | 3/2013 | Fujii | C09D 11/101 | 524/548 |
| 2014/0080049 A1* | 3/2014 | Ujifusa | G03G 9/0914 | 430/108.21 |
| 2019/0163053 A1* | 5/2019 | Nakamura | G03F 7/2004 | |

FOREIGN PATENT DOCUMENTS

| | | |
|---|---|---|
| JP | 2008103474 | 5/2008 |
| JP | 2009543917 | 12/2009 |
| JP | 2019112537 | 7/2019 |
| JP | 2020090627 | 6/2020 |

OTHER PUBLICATIONS

"International Search Report (Form PCT/ISA/210) of PCT/JP2021/026445," mailed on Sep. 14, 2021, with English translation thereof, pp. 1-4.
"Written Opinion of the International Searching Authority (Form PCT/ISA/237) of PCT/JP2021/026445," mailed on Sep. 14, 2021, with English translation thereof, pp. 1-8.
"Search Report of Europe Counterpart Application", issued on Jul. 15, 2024, p. 1-p. 9.

* cited by examiner

PIGMENT COMPOSITION, COLORING COMPOSITION, PAINT, INK, INK SET, PRINTED ARTICLE, AND PACKAGING MATERIAL

CROSS-REFERENCE TO RELATED APPLICATION

This application is a 371 of international application of PCT application serial no. PCT/JP2021/026445, filed on Jul. 14, 2021, which claims the priority benefit of Japan application no. 2020-121014 filed on Jul. 15, 2020 and Japan application no. 2021-095559 filed on Jun. 8, 2021. The entirety of each of the above-mentioned patent applications is hereby incorporated by reference herein and made a part of this specification.

TECHNICAL FIELD

The present invention relates to a pigment composition containing an isoindoline compound.

BACKGROUND ART

As typical coloring agents that are used for uses such as plastic products, toners, paints, and printing ink, pigments are exemplified. Pigments are roughly classified into inorganic pigments and organic pigments, and, ordinarily, organic pigments tend to be poor in terms of weather resistance and heat resistance compared with inorganic pigments. However, organic pigments are more outstanding than inorganic pigments from the viewpoint of the clearness and coloring power of color and are thus in use for a variety of uses. For example, as organic pigments, azo pigments, quinophthalone pigments, isoindoline pigments, isoindolinone pigments, anthraquinone pigments, diketopyrrolopyrrole pigments, quinacridone pigments, and the like are known.

Incidentally, in recent years, from the viewpoint of reduction of environmental impacts and safety and health assurance, the demand for organic pigments and coloring agents not containing a primary aromatic amine, heavy metal, and the like is increasing. As organic pigments having yellow to red hues, azo pigments are mainly in use, but there are cases where a primary aromatic amine is contained in the components of azo pigments due to a raw material that is in use or decomposition by light or heat. Therefore, in recent years, from the viewpoint of environmental compatibility and safety and health, isoindoline pigments containing no primary aromatic amine, such as C.I. Pigment Yellow 185, C.I. Pigment Yellow 139, and C.I. Pigment Red 260, have been drawing attention.

For example, Patent Literature 1 discloses an isoindoline pigment intended for uses for plastic coloring. In addition, Patent Literature 2 discloses a dispersion element for inkjet ink containing water, a dispersant and an isoindoline pigment.

CITATION LIST

Patent Literature

[Patent Literature 1]
Published Japanese Translation No. 2009-543917
[Patent Literature 2]
Japanese Patent Laid-Open No. H10-140066

SUMMARY OF INVENTION

Technical Problem

However, conventional isoindoline compounds were difficult to disperse and had poor dispersion stability. In addition, for coloring compositions containing an isoindoline compound, there was also a problem of the lack of weather resistance or heat resistance.

Furthermore, in the case of using an isoindoline compound for an aqueous inkjet ink use, it was necessary to set the pH value of the ink to 7 or higher and 10 or lower from the viewpoint of storage stability, but there was a problem of fading over time in basic environments.

The purpose of the present invention is to provide a pigment composition having outstanding dispersion characteristics, weather resistance, and heat resistance, has favorable storage stability, minimizes fading over time in a basic atmosphere, and contains isoindoline compounds.

Solution to Problem

A pigment composition of the present invention contains an isoindoline compound represented by formula (1) below and an isoindoline compound represented by formula (2) below.

[Chem. 1]

(1)

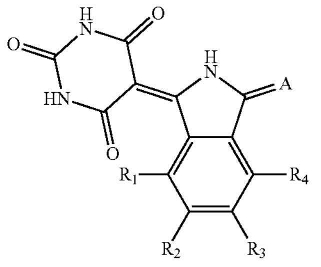

(2)

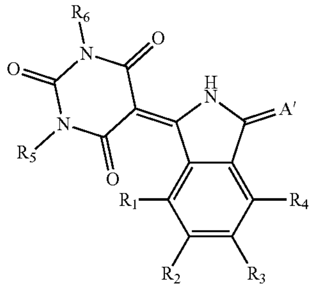

In the formulae, $R_1$ to $R_4$ represent hydrogen atoms, $R_5$ and $R_6$ each independently represent alkyl groups, and A and A' represent a group represented by formula (3) below, formula (4) below, or formula (5) below.

[Chem. 2]

(3)

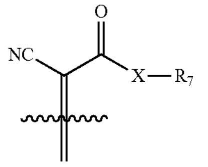

(4)

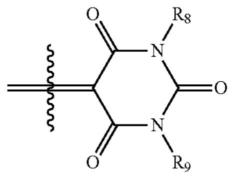

(5)

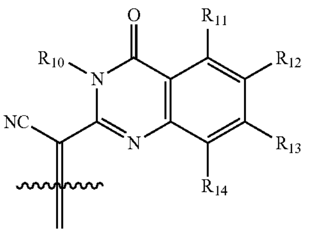

In the formula, X represents —O— or —NH—, $R_7$ represents an alkyl group or an aryl group, and $R_8$ to $R_{14}$ each independently represent hydrogen atoms, halogen atoms, alkyl groups, alkoxy groups, aryl groups, aryloxy groups, thioalkyl groups, or thioaryl groups.

Advantageous Effects of Invention

According to the present invention, it is possible to provide a pigment composition having outstanding dispersion characteristics, weather resistance, and heat resistance, has favorable storage stability, minimizes fading over time in a basic atmosphere, and contains isoindoline compounds. In addition, it is possible to provide an ink set, a printed article, and a packaging material each containing yellow ink that are favorable in terms of dispersion characteristics and storage stability and are capable of forming images with high saturation and the like.

DESCRIPTION OF EMBODIMENTS

Figure 1:
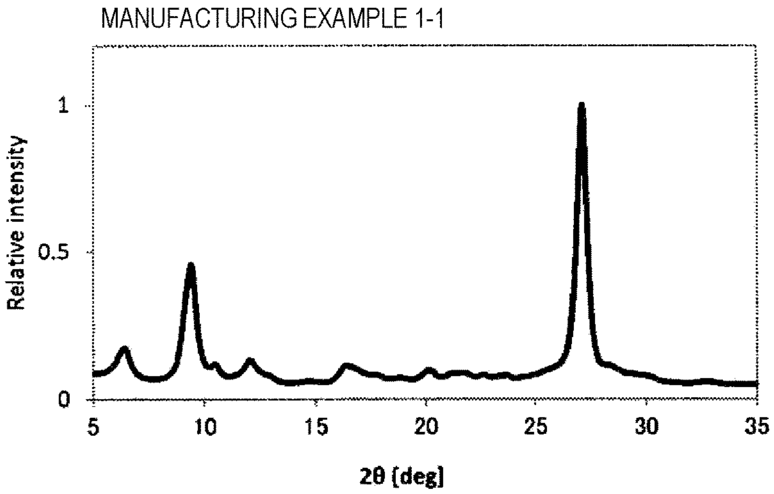
FIG. 1 is an X-ray diffraction spectrum of an isoindoline compound obtained in Manufacturing Example 1-1.

First, terms in the present specification will be defined. Unless particularly otherwise described, the expressions "(meth)acryloyl", "(meth)acrylic", "(meth)acrylic acid", "meth(acrylate)", and "(meth)acrylamide" mean "acryloyl and/or methacryloyl", "acrylic and/or methacrylic", "acrylic acid and/or methacrylic acid", "acrylate and/or methacrylate", and "acrylamide and/or methacrylamide", respectively. In addition, "C.I" means the color index (C.I.).

<Pigment Composition>

A pigment composition of the present invention contains an isoindoline compound represented by formula (1) and an isoindoline compound represented by formula (2).

The pigment composition of the present invention contains two kinds of isoindoline compounds as described above and is thereby capable of solving problems of dispersion characteristics, weather resistance, heat resistance, storage stability, and fading over time in basic atmospheres, which were weak points of conventional isoindoline compounds. The pigment composition of the present invention can be used for a broad range of uses such as plastic molded bodies, toner, paint, printing ink, and inkjet ink.

[Isoindoline Compound (1)] and [Isoindoline Compound (2)]

Hereinafter, the isoindoline compound represented by formula (1) will be referred to as isoindoline compound (1), and the isoindoline compound represented by formula (2) will be referred to as isoindoline compound (2).

[Chem. 3]

(1)

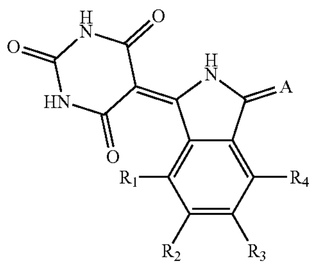

(2)

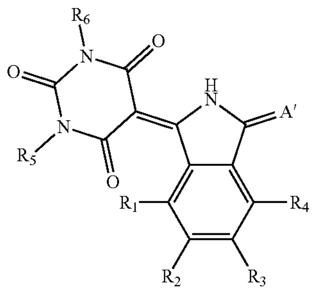

The content of isoindoline compound (1) in 100 mass % of the pigment composition is preferably 50 to 99 mass % and more preferably 70 to 95 mass %.

In formula (1), $R_1$ to $R_4$ represent hydrogen atoms.

$R_5$ and $R_6$ each independently represent alkyl groups.

A and A' represent a group represented by formula (3) below, formula (4) below, or formula (5) below.

[Chem. 4]

(3)

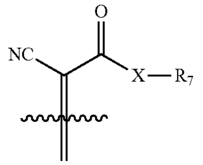

(4)

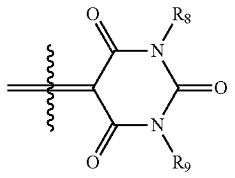

(5)

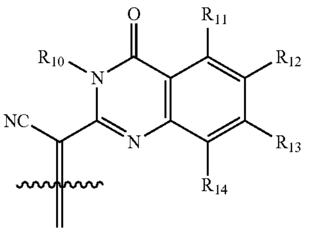

In formula (3), X represents —O— or —NH—, and $R_7$ represents an alkyl group or an aryl group.

In formula (4) and formula (5), $R_8$ to $R_{14}$ each independently represent hydrogen atoms, halogen atoms, alkyl groups, alkoxy groups, aryl groups, aryloxy groups, thioalkyl groups, or thioaryl groups.

In formula (2), $R_5$ and $R_6$ each independently represent alkyl groups. The number of carbon atoms in the alkyl group (—R) is preferably 1 to 20, more preferably 1 to 10, and still more preferably 1 to 6. The alkyl group may be any of a linear structure, a branched structure, a monocyclic structure, or a condensed polycyclic structure.

While not particularly limited, examples of the alkyl group include a methyl group, an ethyl group, a propyl group, a butyl group, a pentyl group, a hexyl group, a heptyl group, an octyl group, a nonyl group, a decyl group, a dodecyl group, an octadecyl group, an isopropyl group, an isobutyl group, an isopentyl group, a 2-ethylhexyl group, a 2-hexyldodecyl group, a sec-butyl group, a tert-butyl group, a sec-pentyl group, a tert-pentyl group, a tert-octyl group, a neopentyl group, a cyclopropyl group, a cyclobutyl group, a cyclopentyl group, a cyclohexyl group, an adamantyl group, a norbornyl group, a boronyl group, a 4-decylcyclohexyl group, and the like.

In the alkyl group, at least one hydrogen atom may be substituted by a different substituent such as a fluorine atom. That is, the alkyl group may be a fluoroalkyl group or a perfluoroalkyl group. Examples of the fluoroalkyl group include a monofluoromethyl group, a difluoromethyl group, and a trifluoromethyl group.

$R_5$ and $R_6$ are more preferably the same alkyl groups. The alkyl group is preferably an alkyl group having 1 to 6 carbon atoms, more preferably an alkyl group having 1 to 4 carbon atoms, and still more preferably an alkyl group having 1 or 2 carbon atoms (a methyl group or an ethyl group).

In formula (3), X represents —O— or —NH— and is preferably —NH—.

In $R_7$, the alkyl group and the aryl group are the same as described above. From the viewpoint of heat resistance, weather resistance, and dispersion stability, the alkyl group is preferably an alkyl group having 1 to 4 carbon atoms and more preferably an alkyl group having 1 or 2 carbon atoms.

In formula (4) and formula (5), the halogen atoms in $R_8$ to $R_{14}$ are not particularly limited, and examples thereof include fluorine, chlorine, bromine, and iodine.

In formula (4) and formula (5), the number of carbon atoms in the alkyl groups (—R) in $R_8$ to $R_{14}$ is preferably 1 to 20, more preferably 1 to 10, and still more preferably 1 to 6. The alkyl group may be any of a linear structure, a branched structure, a monocyclic structure, or a condensed polycyclic structure.

While not particularly limited, examples of the alkyl group include a methyl group, an ethyl group, a propyl group, a butyl group, a pentyl group, a hexyl group, a heptyl group, an octyl group, a nonyl group, a decyl group, a dodecyl group, an octadecyl group, an isopropyl group, an isobutyl group, an isopentyl group, a 2-ethylhexyl group, a 2-hexyldodecyl group, a sec-butyl group, a tert-butyl group, a sec-pentyl group, a tert-pentyl group, a tert-octyl group, a neopentyl group, a cyclopropyl group, a cyclobutyl group, a cyclopentyl group, a cyclohexyl group, an adamantyl group, a norbornyl group, a boronyl group, a 4-decylcyclohexyl group, and the like.

In the alkyl group, at least one hydrogen atom may be substituted by a different substituent such as a fluorine atom. That is, the alkyl group may be a fluoroalkyl group or a perfluoroalkyl group. Examples of the fluoroalkyl group include a monofluoromethyl group, a difluoromethyl group, and a trifluoromethyl group.

The alkyl group may have a structure in which two or more alkyl groups (here, one is an alkylene group) bond to each other through a linking group. Specific examples of the linking group include an ester bond (—COO—), an ether bond (—O—), and a sulfide bond (—S—). That is, in the present specification, examples of the alkyl group include groups represented by "—R'—O—R" (R' represents an atomic group where one hydrogen atom has been removed from the alkyl group). Specific examples thereof include $—C_2H_4—O—C_2H_5$.

In the present specification, the alkyl group is preferably an alkyl group having 1 to 6 carbon atom, more preferably an alkyl group having 1 to 4 carbon atoms, and still more preferably an alkyl group having 1 or 2 carbon atoms.

In formula (4) and formula (5), the alkoxy groups in $R_8$ to $R_{14}$ are groups where an oxygen atom has bonded to the alkyl group (—R) (—OR).

In formula (4) and formula (5), the aryl groups (—Ar) in $R_8$ to $R_{14}$ are atomic groups where one hydrogen atom has been removed from an aromatic hydrocarbon. The number of carbon atoms is preferably 6 to 30 and more preferably 6 to 20.

Examples of the aryl group include a phenyl group, a biphenylyl group, a terphenylyl group, a quaterphenylyl group, a pentalenyl group, an indenyl group, a naphthyl group, a binaphthalenyl group, a ternaphthalenyl group, a quaternaphthalenyl group, an azulenyl group, a heptalenyl group, a biphenylenyl group, an indacenyl group, a fluoranthenyl group, an acephenanthrylenyl group, an acenathrylenyl group, a phenalenyl group, a fluorenyl group, an anthryl group, a bianthracenyl group, a teranthracenyl group, a quateranthracenyl group, an anthraquinolyl group, a phenanthryl group, a triphenylenyl group, a pyrenyl group, a chrysenyl group, a naphthacenyl group, a pleiadenyl group, a picenyl group, a perylenyl group, a pentaphenyl group, a pentacenyl group, a tetraphenylenyl group, a hexaphenyl group, a hexacenyl group, a rubicenyl group, a coronenyl group, a trinaphthylenyl group, a heptaphenyl group, a heptacenyl group, a pyrantrenyl group, an ovalenyl group, and the like. Among these, a phenyl group is preferable.

In formula (4) and formula (5), the aryloxy groups in $R_8$ to $R_{14}$ are groups where an oxygen atom has bonded to the aryl group (—Ar) (—OAr). In the present specification, the aryloxy group is preferably a phenoxy group.

In formula (4) and formula (5), the thioalkyl groups in $R_8$ to $R_{14}$ are groups where a sulfur atom has bonded to the alkyl group (—SR). In one embodiment, preferable examples of the thioalkyl group include groups where a sulfur atom has bonded to an alkyl group having a straight-chain structure. In addition, the thioaryl group is a group where a sulfur atom has bonded to the aryl group (—SAr). Among these, the thioaryl group is preferably a thiophenyl group.

In the present specification, in formula (4) and formula (5), it is preferable that $R_8$ to $R_{14}$ are each independently selected from the group consisting of a hydrogen atom, an alkyl group having 1 to 6 carbon atoms, a fluoroalkyl group having 1 to 6 carbon atoms, an alkoxy group (the number of carbon atoms in the alkyl group is 1 to 6), a phenyl group, a phenoxy group, a thioalkyl group (the number of carbon atoms in the alkyl group is 1 to 6), and a thiophenyl group.

In formula (4) and formula (5), the aryloxy groups in $R_8$ to $R_{14}$ are groups where an oxygen atom has bonded to the aryl group (—Ar) (—OAr). In the present specification, the aryloxy group is preferably a phenoxy group.

In formula (4) and formula (5), the thioalkyl groups in $R_8$ to $R_{14}$ are groups where a sulfur atom has bonded to the alkyl group (—SR). In one embodiment, preferable examples of the thioalkyl group include groups where a sulfur atom has bonded to an alkyl group having a straight-chain structure. In addition, the thioaryl group is a group where a sulfur atom has bonded to the aryl group (—SAr). Among these, the thioaryl group is preferably a thiophenyl group.

In formula (4) and formula (5), it is preferable that $R_8$ to $R_{14}$ are each independently selected from the group consisting of a hydrogen atom, an alkyl group having 1 to 6 carbon atoms, a fluoroalkyl group having 1 to 6 carbon atoms, an alkoxy group (the number of carbon atoms in the alkyl group is 1 to 6), a phenyl group, a phenoxy group, a thioalkyl group (the number of carbon atoms in the alkyl group is 1 to 6), and a thiophenyl group.

As each of isoindoline compound (1) and isoindoline compound (2), one compound may be used singly or two or more kinds of compounds can be jointly used.

[Method for Manufacturing Isoindoline Compound (1) and Isoindoline Compound (2)]

Isoindoline compound (1) and isoindoline compound (2) that are used in the pigment composition of the present embodiment can be manufactured by a well-known synthesis method. For example, as shown in scheme 1 below, the compound can be synthesized using phthalonitrile represented by formula (6) below (hereinafter, referred to as compound (6)) or 1,3-diiminoisoindoline represented by formula (7) below (hereinafter, referred to as compound (7)) as a starting raw material.

Hereinafter, the synthesis method will be described along the specific examples of isoindoline compound (1) and isoindoline compound (2). In description below, numbers shown in each formula are shown as the numbers of compounds.

(Compound Where A and A' are Formula (3))

In one embodiment, isoindoline compound (1) and isoindoline compound (2) can be manufactured according to scheme 1-1 or 1-2 below.

(Scheme 1-1)

[Chem. 5]

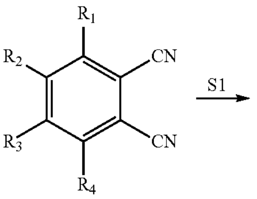

(6)

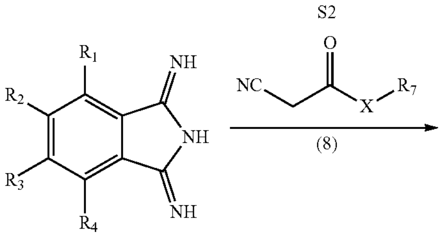

(7)

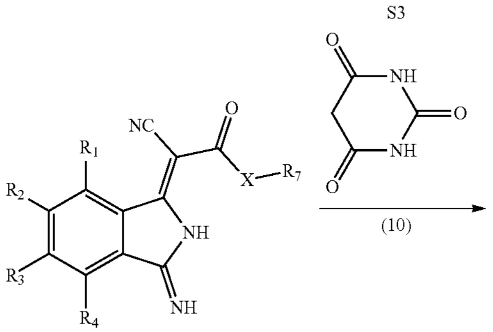

(9)

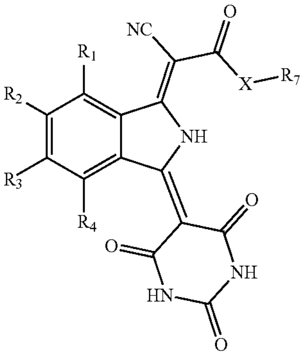

(11)

(Scheme 1-2)

[Chem. 6]

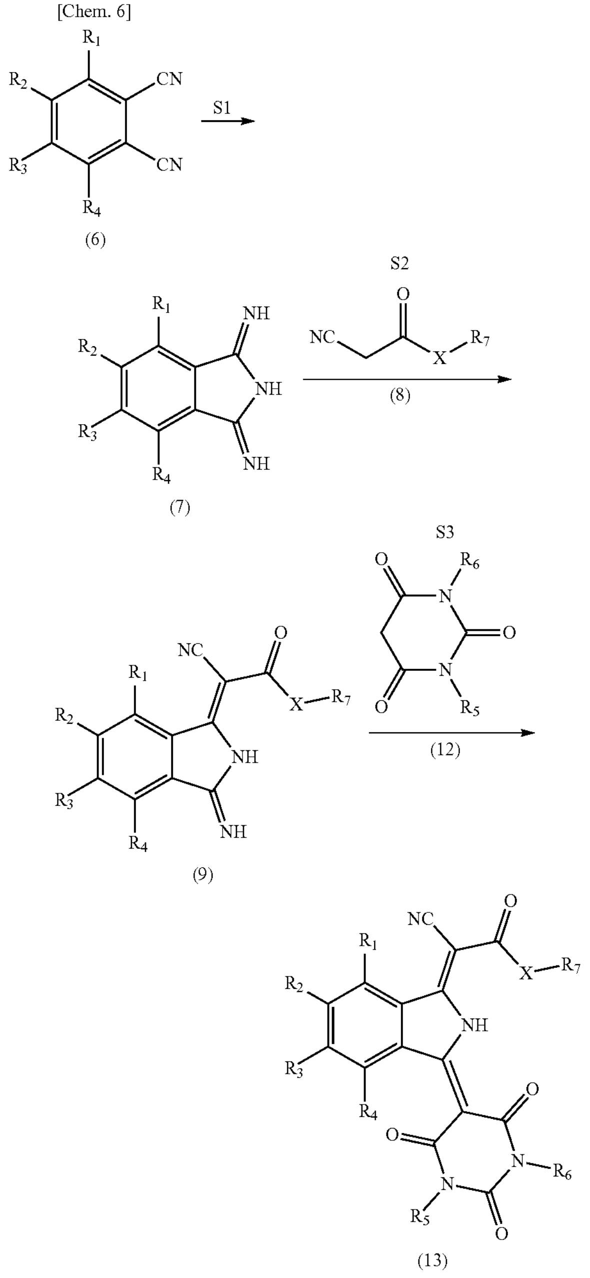

Scheme 1-1 may include first step (S1) of reacting compound (6) and a base in a solvent to obtain compound (7); second step (S2) of subsequently reacting compound (7) and compound (8) in the presence of water; and third step (S3) of subsequently reacting compound (9) and compound (10) in the presence of acetic acid. The reaction temperature in each step of scheme 1-1 is preferably approximately 10° C. to 100° C.

Similarly, scheme 1-2 may include first step (S1) of reacting compound (6) and a base in a solvent to obtain compound (7); second step (S2) of subsequently reacting compound (7) and compound (8) in the presence of water; and third step (S3) of subsequently reacting compound (9) and compound (12) in the presence of acetic acid. The reaction temperature in each step of scheme 1-2 is preferably approximately 10° C. to 100° C.

In a case where the relationship between substituents $R_5$ and $R_6$ in compound (12) becomes asymmetric, the final product is obtained as a mixture containing an isomer.

On the other hand, in a case where the relationship between substituents $R_5$ and $R_6$ in compound (12) is all symmetric, the final product becomes a single compound.

Isoindoline compound (1) and isoindoline compound (2) that configure the pigment composition may be any of a mixture containing an isomer and each a single compound.

Examples of the solvent that is used in first step (S1) include alcohols such as methanol, ethanol, isopropanol, butanol, and glycol; ethers such as glycol ether and tetrahydrofuran; and acyclic or cyclic amides such as formamide, dimethylformamide, dimethylacetamide, and N-methylpyrrolidone. Among these, acyclic or cyclic amides are preferable, and tetrahydrofuran or formamide is more preferable.

The solvent can be used singly or two or more kinds of solvents can be jointly used. The amount of the solvent used is an amount that is preferably 5 to 15 times and more preferably 5 to 10 times 100 parts by mass of compound (6).

Examples of the base include alkali metal hydroxides, alkali metals such as lithium, sodium or potassium, alkali metal amides, alkali metal hydrides; and alkali metal or alkaline earth metal alkoxides derived from a primary, secondary, or tertiary aliphatic alcohol having an alkyl chain or alkylene chain having 1 to 10 carbon atoms. Among these, sodium hydroxide or potassium carbonate is preferable.

In addition, as another synthesis method, isoindoline compound (1) and isoindoline compound (2) can be manufactured according to, for example, scheme 2-1 or 2-2 below.

(Scheme 2-1)

[Chem. 8]

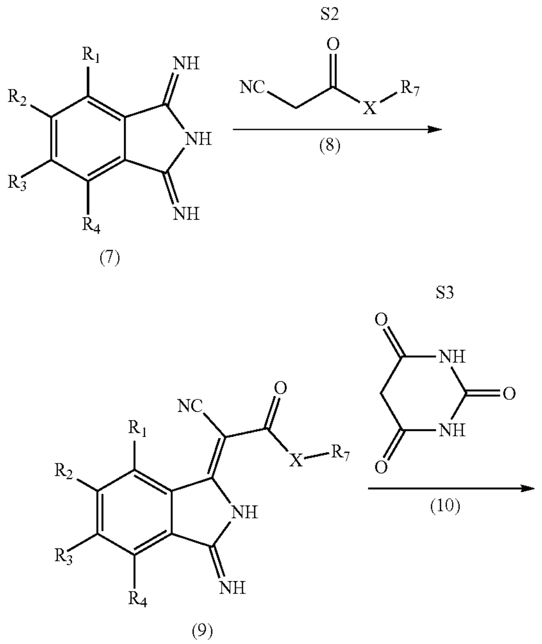

-continued

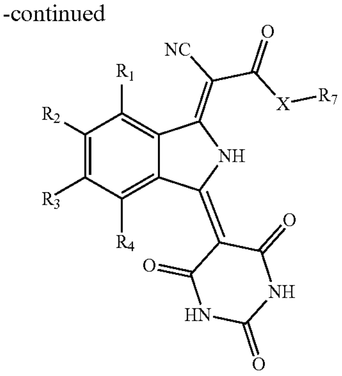

(11)

(Scheme 2-2)

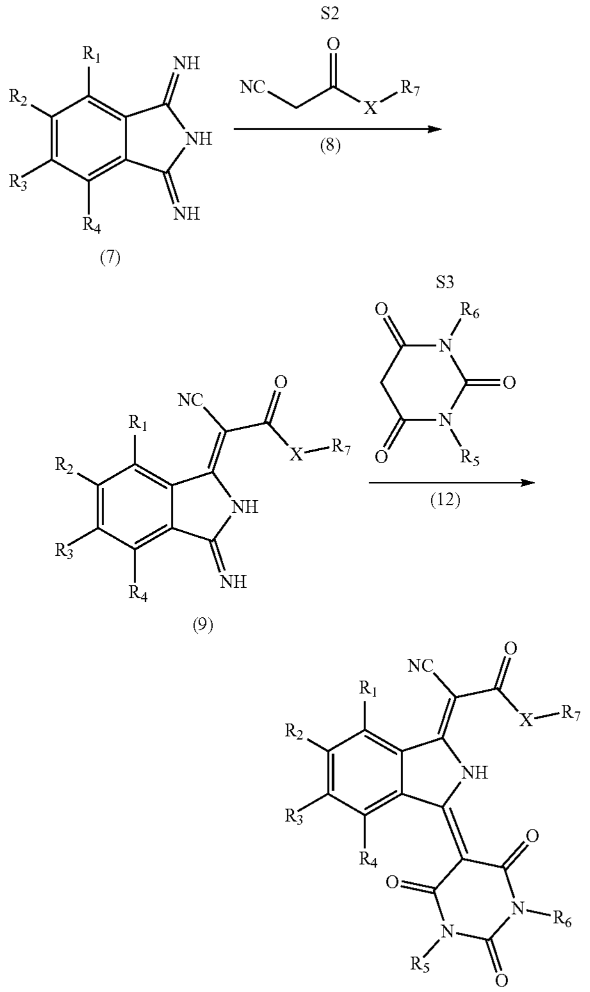

(7)

(9)

(13)

Scheme 2-1 may include second step (S2) of reacting compound (7) and compound (8) in the presence of an ammonia aqueous solution; and third step (S3) of subsequently reacting compound (9) and compound (10) in the presence of acetic acid. Similarly, scheme 2-2 may include second step (S2) of reacting compound (7) and compound (8) in the presence of an ammonia aqueous solution; and third step (S3) of subsequently reacting compound (9) and compound (12) in the presence of acetic acid.

In second steps (S2) of schemes 2-1 and 2-2, the amount of the ammonia aqueous solution used is an amount that is preferably 1 to 20 times and more preferably 1 to 5 times 100 parts by mass of compound (7) in a case where a 28% ammonia aqueous solution is used.

Isoindoline compound (1) and isoindoline compound (2) are preferably manufactured according to scheme 2-1 or 2-2.

(Compound Where A and A' are Formula (4))

In one embodiment, isoindoline compound (1) and isoindoline compound (2) can be manufactured according to scheme 3-1 or 3-2 below.

(Scheme 3-1)

[Chem. 8]

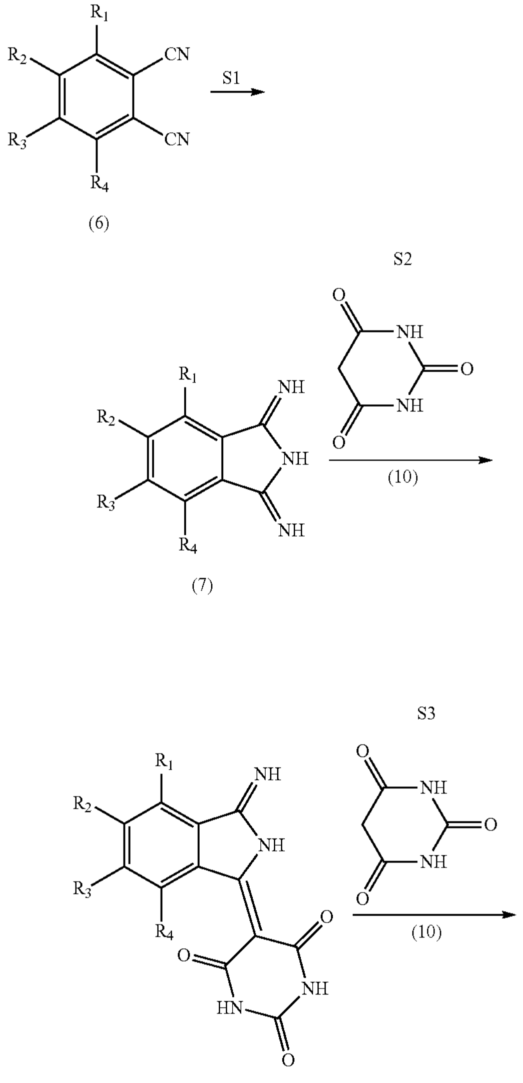

(6)

(7)

(14)

-continued

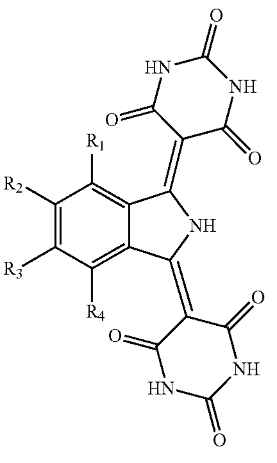

(15)

-continued

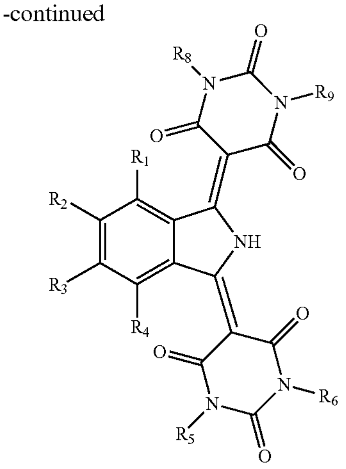

(18)

(Scheme 3-2)

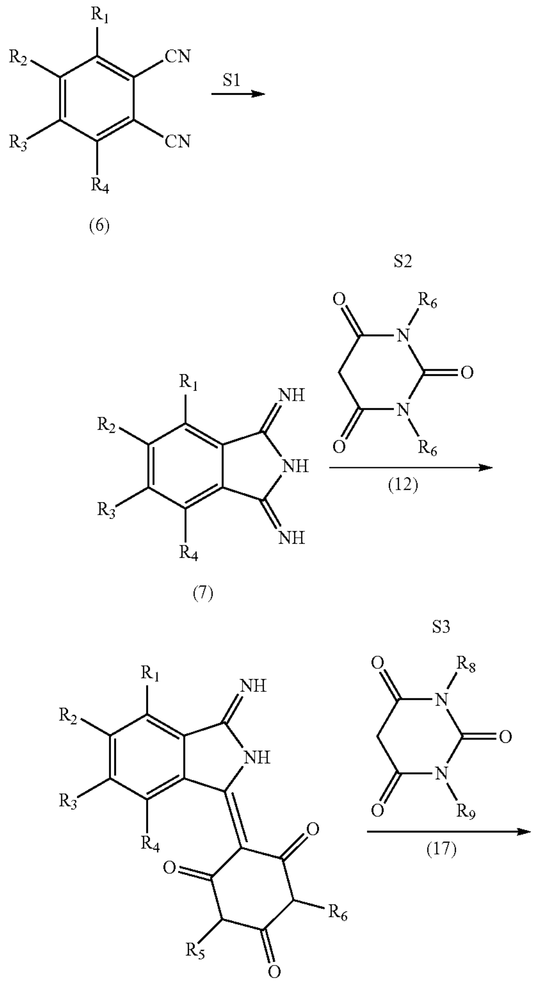

Scheme 3-1 may include first step (S1) of reacting compound (6) and a base in a solvent to obtain compound (7); second step (S2) of subsequently reacting compound (7) and compound (10) in the presence of acetic acid; and third step (S3) of subsequently reacting compound (14) and compound (10) in the presence of acetic acid. The reaction in each step of scheme 3-1 is preferably performed at 10° C. to 100° C.

Similarly, scheme 3-2 may include first step (S1) of reacting compound (6) and a base in a solvent to obtain compound (7); second step (S2) of subsequently reacting compound (7) and compound (12) in the presence of acetic acid; and third step (S3) of subsequently reacting compound (16) and compound (17) in the presence of acetic acid. The reaction in each step of scheme 3-2 is preferably performed at 10° C. to 100° C.

In a case where the relationship between substituents $R_5$ and $R_6$ in compound (12) becomes asymmetric, the product is obtained as a mixture containing an E isomer and a Z isomer as isomers. Furthermore, in a case where the relationship between substituents $R_8$ and $R_9$ in compound (17) becomes asymmetric, the product is obtained as a mixture containing an E isomer and a Z isomer as isomers.

On the other hand, in a case where the relationship between substituents $R_5$ and $R_6$ in compound (12) and the relationship between substituents $R_8$ and $R_9$ in compound (17) are all symmetric, the final product becomes a single compound.

Isoindoline compound (1) and isoindoline compound (2) that configure the pigment composition may be any of a mixture containing isomers and a single compound.

Examples of the solvent that is used in first step (S1) include alcohols such as methanol, ethanol, isopropanol, butanol, and glycol; ethers such as glycol ether and tetrahydrofuran; and acyclic or cyclic amides such as formamide, dimethylformamide, dimethylacetamide, and N-methylpyrrolidone. Among these, acyclic or cyclic amides are preferable, and tetrahydrofuran or formamide is more preferable.

The solvent can be used singly or two or more kinds of solvents can be jointly used. The amount of the solvent used is an amount that is preferably 5 to 15 times and more preferably 5 to 10 times 100 parts by mass of compound (6).

Examples of the base include alkali metal hydroxides, alkali metals such as lithium, sodium or potassium, alkali metal amides, alkali metal hydrides; and alkali metal or alkaline earth metal alkoxides derived from a primary, secondary, or tertiary aliphatic alcohol having an alkyl chain or alkylene chain having 1 to 10 carbon atoms. Among these, sodium hydroxide or potassium carbonate is preferable.

In addition, as another synthesis method, isoindoline compound (1) and isoindoline compound (2) can be manufactured according to scheme 4-1 or 4-2 below.

(Scheme 4-1)

[Chem. 9]

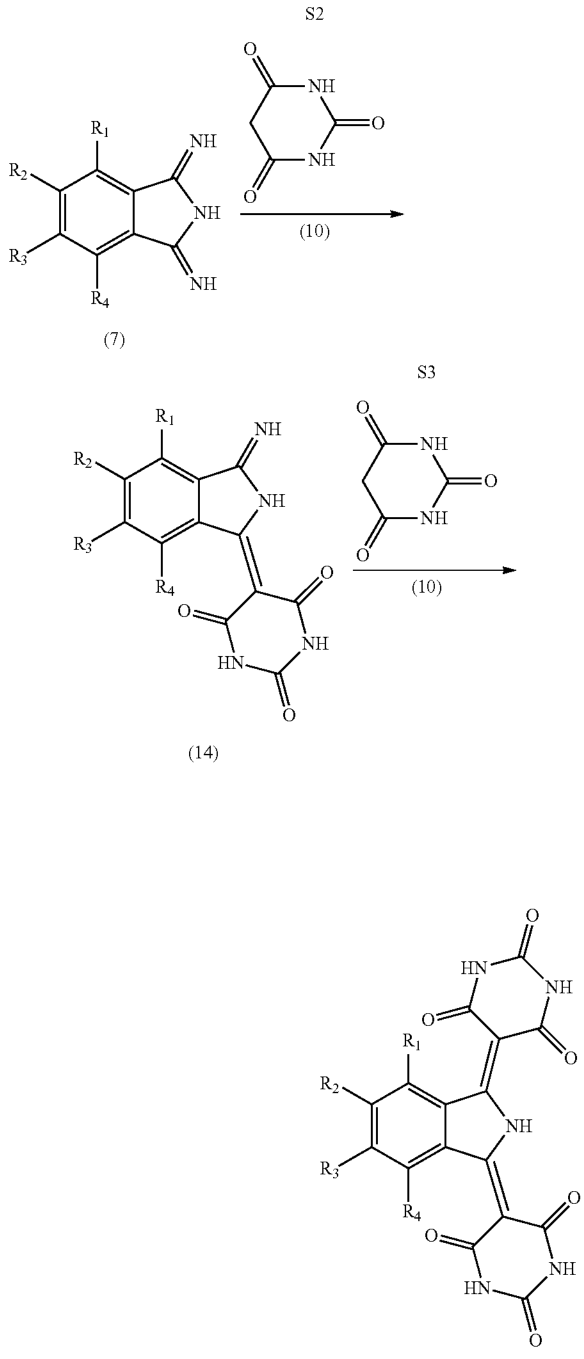

(7) (14) (15)

(Scheme 4-2)

[Chem. 10]

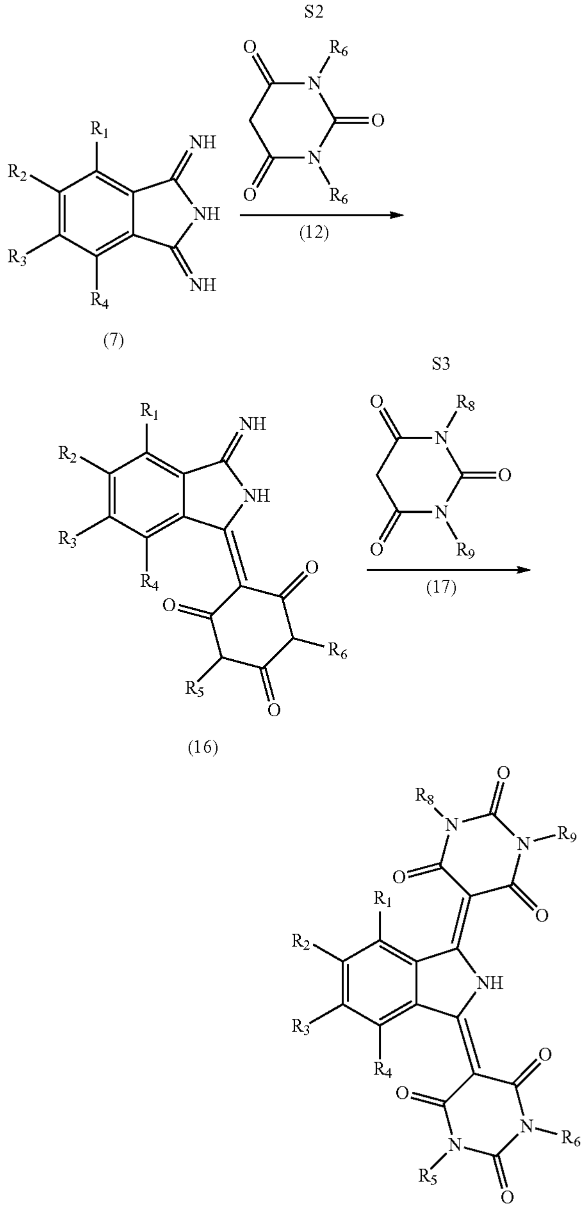

(7) (16) (18)

Scheme 4-1 may include second step (S2) of reacting compound (7) and compound (10) in the presence of acetic acid; and third step (S3) of subsequently reacting compound (14) and compound (10) in the presence of acetic acid.

Similarly, scheme 4-2 may include second step (S2) of reacting compound (7) and compound (12) in the presence of acetic acid; and third step (S3) of subsequently reacting compound (16) and compound (17) in the presence of acetic acid.

(Compound Where A and A' is Formula (5)

In one embodiment, isoindoline compound (1) and isoindoline compound (2) can be manufactured according to scheme 5-1 or 5-2 below.

(Scheme 5-1)

[Chem. 11]

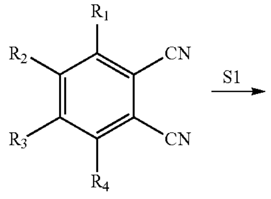

(6)

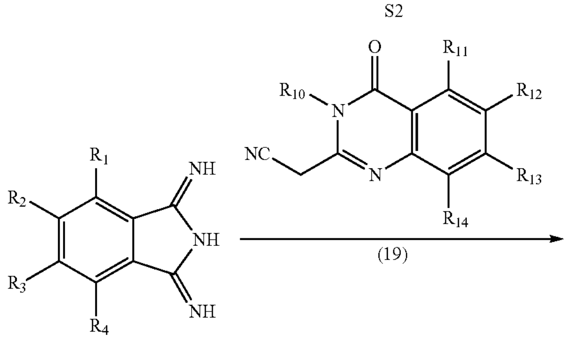

(7)

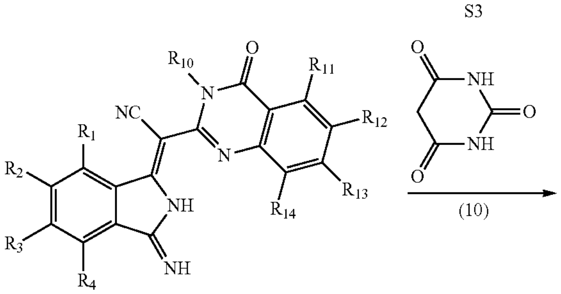

(20)

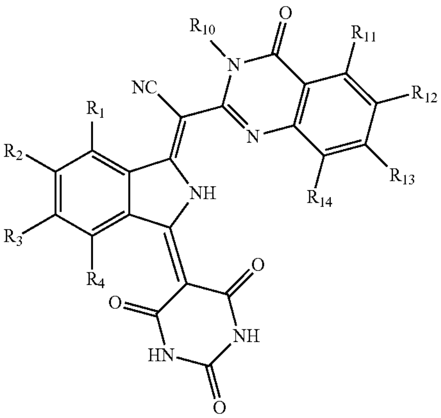

(21)

(Scheme 5-2)

[Chem. 12]

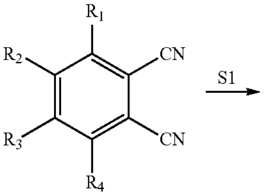

(6)

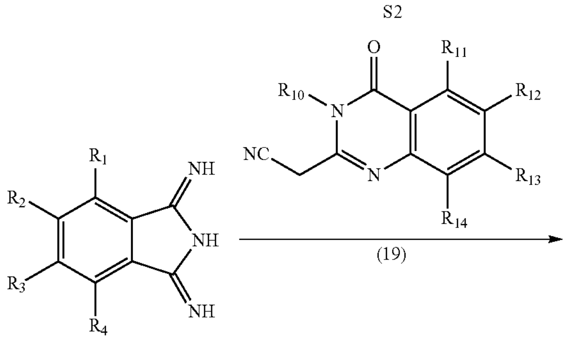

(7)

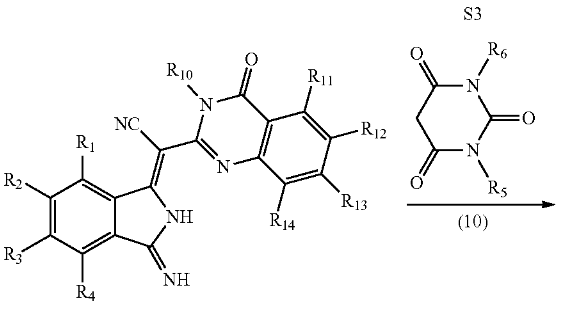

(20)

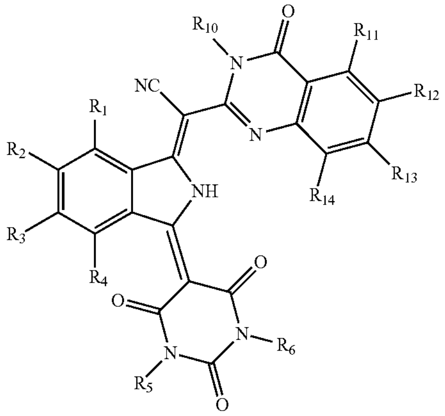

(22)

Scheme 5-1 may include first step (S1) of reacting compound (6) and a base in a solvent to obtain compound (7); second step (S2) of subsequently reacting compound (7) and compound (19) in the presence of water; and third step (S3) of subsequently reacting compound (20) and compound (10) in the presence of acetic acid. The reaction temperature in each step of scheme 5-1 is preferably 10° C. to 100° C.

Similarly, scheme 5-2 may include first step (S1) of reacting compound (6) and a base in a solvent to obtain compound (7); second step (S2) of subsequently reacting compound (7) and compound (19) in the presence of water; and third step (S3) of subsequently reacting compound (20) and compound (12) in the presence of acetic acid. The reaction temperature in each step of scheme 5-2 is preferably 10° C. to 100° C.

In a case where the relationship between substituents $R_5$ and $R_6$ in compound (12) becomes asymmetric, the final product is obtained as a mixture containing an isomer.

On the other hand, in a case where the relationship between substituents $R_5$ and $R_6$ in compound (12) is symmetric, the final product becomes a single compound.

Isoindoline compound (1) and isoindoline compound (2) that configure the pigment composition may be any of a mixture containing isomers and a single compound.

Examples of the solvent that is used in first step (S1) include alcohols such as methanol, ethanol, isopropanol, butanol, and glycol; ethers such as glycol ether and tetrahydrofuran; and acyclic or cyclic amides such as formamide, dimethylformamide, dimethylacetamide, and N-methylpyrrolidone. Among these, acyclic or cyclic amides are preferable, and tetrahydrofuran or formamide is preferable.

Solvent can be used singly or two or more kinds of solvents can be jointly used. The amount of the solvent used is an amount that is preferably 5 to 15 times and more preferably 5 to 10 times 100 parts by mass of compound (6).

Examples of the base include alkali metal hydroxides, alkali metals such as lithium, sodium or potassium, alkali metal amides, alkali metal hydrides; and alkali metal or alkaline earth metal alkoxides derived from a primary, secondary, or tertiary aliphatic alcohol having an alkyl chain or alkylene chain having 1 to 10 carbon atoms. Among these, sodium hydroxide or potassium carbonate is preferable.

In addition, as another synthesis method, isoindoline compound (1) and isoindoline compound (2) can be manufactured according to scheme 6-1 or 6-2 below.

(Scheme 6-1)

[Chem. 13]

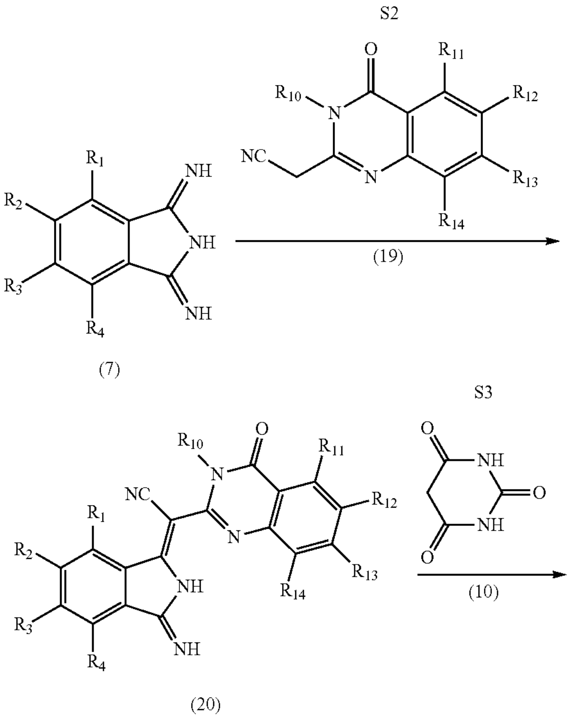

-continued

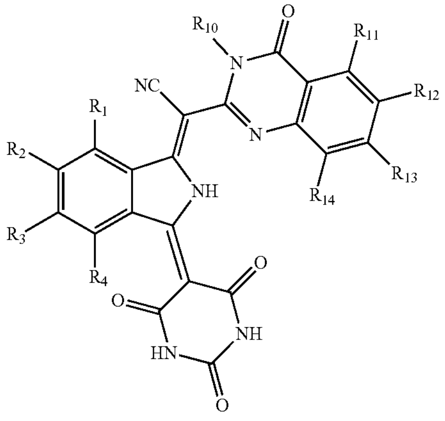

(21)

(Scheme 6-2)

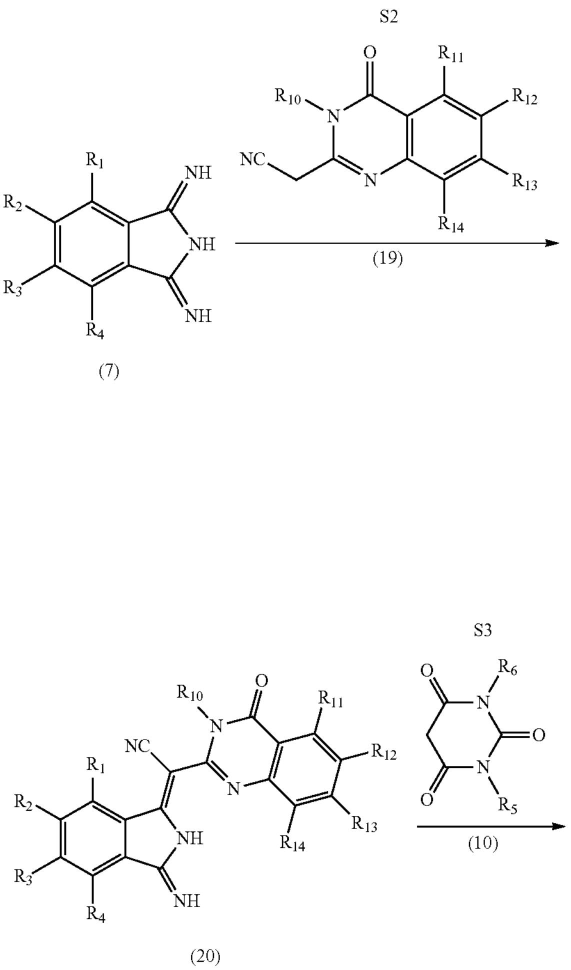

-continued

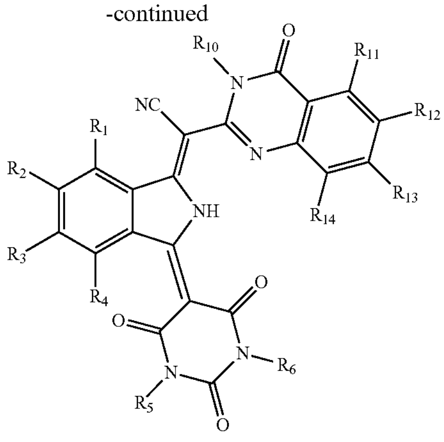

(22)

Scheme 6-1 may include second step (S2) of reacting compound (7) and compound (19) in the presence of an ammonia aqueous solution; and third step (S3) of subsequently reacting compound (20) and compound (10) in the presence of acetic acid.

In second step (S2) of scheme 6-1, the amount of the ammonia aqueous solution used is an amount that is preferably 1 to 20 times and more preferably 1 to 5 times 100 parts by mass of compound (7) in a case where a 28% ammonia aqueous solution has been used.

Similarly, scheme 6-2 may include second step (S2) of reacting compound (7) and compound (19) in the presence of an ammonia aqueous solution; and third step (S3) of subsequently reacting compound (20) and compound (12) in the presence of acetic acid.

In second step (S2) of scheme 6-2, the amount of the ammonia aqueous solution used is an amount that is preferably 1 to 20 times and more preferably 1 to 5 times 100 parts by mass of compound (7) in a case where a 28% ammonia aqueous solution has been used.

For isoindoline compound (2) that is used in the pigment composition, in formula (2), $R_5$ and $R_6$ are alkyl groups. When the pigment composition contains an isoindoline compound having an alkyl group introduced into a predetermined position, compared with conventional isoindoline pigments not having an alkyl group at a predetermined position, it is possible to significantly improve dispersion characteristics, weather resistance, heat resistance and resistance in basic atmospheres. Therefore, the pigment composition of the present specification can also be used for uses such as water-based paint, printing ink, and inkjet ink for which, conventionally, the application of isoindoline pigments was difficult. Furthermore, the pigment composition can be suitably used not only as four-color ink set where the pigment composition is combined with cyan ink, magenta ink, and black ink but also as five-color ink set further containing white ink.

Ordinarily, in a case where a pigment composition containing a plurality of pigments shows a different X-ray diffraction diagram from the X-ray diffraction diagrams of physical mixtures, the pigment composition is referred to as a solid solution. As the solid solution, there are two kinds of solid solutions, that is, "guest-host type solid solution" and "solid compound type solid solution", which are clearly differentiated. "Guest-host type solid solution" is a solid solution for which the X-ray diffraction diagram of the solid solution is substantially the same as one X-ray diffraction diagram of a component that is referred to as the host among the components of the solid solution. The host component is said to receive other components, that is, guests in the crystal lattices. "Solid compound type solid solution" is a solid solution where two components create one X-ray diffraction diagram that is different from the X-ray diffraction diagram of any component or physical mixture of the two components in association with each other.

In the pigment composition of the present invention, in a case where isoindoline compound (1) and isoindoline compound (2) are not simple mixtures but solid solutions, the transparency in ink compositions, the dispersed particle sizes in coloring compositions, and the like further improve.

Isoindoline compound (1) and isoindoline compound (2) are preferably each or altogether processed into fine particles by a refining treatment and then used and more preferably treated altogether. Examples of the refining treatment include a dissolution precipitation method represented by acid pasting, solvent salt milling, dry milling, and the like. Regarding the pigment particle sizes after the refinement, the average primary particle size is preferably 20 to 300 nm and more preferably 50 to 150 nm. Depending on the conditions for the solvent salt milling, there are also cases where the particle sizes of the pigment particles grow.

Hereinafter, methods for manufacturing the pigment composition containing isoindoline compound (1) and isoindoline compound (2) will be exemplified.

(I) A method in which two or more kinds are synthesized at once (co-synthesis method), (II) a method in which isoindoline compound (1) and isoindoline compound (2) are mixed together at the time of producing a dispersion element, (III) a method in which isoindoline compound (1) and isoindoline compound (2) are made into a pigment together using an acid pasting method, an acid slurry method, a dry milling method, a salt milling method, a solvent salt milling method, a solvent method (a heating treatment is performed in a high-boiling point solvent such as an alcohol or an aromatic solvent) or the like, (IV) a method in which the above-described methods are combined.

Among these, (I) co-synthesis method, (III) a method in which isoindoline compound (1) and isoindoline compound (2) are made into a pigment together using an acid pasting method or a solvent salt milling method, and (IV) a method in which (I) and (III) are combined are preferable.

In the refinement by acid pasting, a pigment is dissolved in concentrated sulfuric acid, and the solution is mixed with a large excess of water, thereby precipitating fine pigment particles. After that, the fine pigment particles are filtered and washed with water repeatedly and dried, whereby refined pigment particles are obtained.

Examples of the acid pasting include a method in which a pigment is dissolved in 5 to 30 times by mass of 98% sulfuric acid and the obtained sulfuric acid solution is mixed with 5 to 30 times by mass of water. The temperature at the time of dissolving the pigment in sulfuric acid may be any temperature as long as the decomposition of the raw material and reactions such as sulfonation do not occur. The temperature at the time of the dissolution is preferably, for example, 3° C. to 40° C. In addition, a method for mixing the sulfuric acid solution of the pigment and water and conditions such as the mixing temperature are also not particularly limited. In many cases, there is a tendency that the pigment particles to be precipitated become fine when the solution is mixed with water at low temperatures rather than at high temperatures. Therefore, the temperature at the time of the mixing is preferably, for example, 0° C. to 60° C. The water that is used at the time of the mixing may be any water as long as the water can be industrially used. However, from the viewpoint of reducing an increase in temperature at the time of the precipitation, water cooled in advance is preferable.

The method for mixing the sulfuric acid solution and water is not particularly limited, and the sulfuric acid solution and water may be mixed by any method as long as the pigment can be completely precipitated. For example, the pigment particles can be precipitated by a method in which the sulfuric acid solution is injected into ice water prepared in advance, a method in which the sulfuric acid solution is continuously injected into flowing water using a device such as an aspirator, or the like.

A slurry obtained by the above-described method is filtered and washed to remove an acidic component, then, dried and pulverized, whereby a pigment adjusted to desired particle sizes are obtained. At the time of filtering the slurry, the slurry that is the mixture of the sulfuric acid solution and water may be filtered as it is; however, in a case where the filterability of the slurry is poor, the slurry may be filtered after being heated and stirred. In addition, the slurry may be filtered after being neutralized with a base.

In the refinement by solvent salt milling, a clay-like mixture composed of at least three components of a pigment, a water-soluble inorganic salt, and a water-soluble solvent is strongly kneaded using a kneader or the like. The kneaded mixture is injected into water and stirred with a variety of stirrers, thereby producing a slurry. The obtained slurry is filtered, thereby removing the water-soluble inorganic salt and the water-soluble solvent. The above-described slurry production, filtration, and water washing are repeated, whereby a refined pigment can be obtained.

As the water-soluble inorganic salt, sodium chloride, sodium sulfate, potassium chloride, and the like can be used. These inorganic salts are used to an extent of 1 time by mass or more, preferably, 20 times by mass or more of the pigment. In a case where the amount of the inorganic salt is set to 1 time by mass, it is possible to sufficiently refine the pigment. In addition, in a case where the amount of the inorganic salt is set to 20 times by mass or less, no enormous efforts are required to remove the water-soluble inorganic salt and the water-soluble solvent after the kneading, and, at the same time, the amount of the pigment that can be treated in a single time of solvent salt milling does not decrease, which is preferable from the viewpoint of the productivity.

In the refinement of the pigment, there are many cases where heat is generated due to kneading. Therefore, from the viewpoint of safety, a water-soluble solvent having a boiling point of approximately 120° C. to 250° C. is preferably used. Specific examples of the water-soluble solvent include 2-(methoxymethoxy)ethanol, 2-butoxyethanol, 2-(isopentyloxy)ethanol, 2-(hexyloxy)ethanol, ethylene glycol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, low-molecular-weight polypropylene glycol, and the like.

In the refinement by dry milling, a pigment is pulverized in a dry manner using a variety of pulverizers and thereby refined. In this method, the pulverization proceeds through collision or friction between pulverization media. A device that is used for dry milling is not particularly limited, and specific examples include a ball mill, an attritor, a vibration mill, which are dry-type pulverizers including pulverization media such as beads, and the like. At the time of pulverizing the pigment in a dry manner using this device, the pressure in a pulverization container may be reduced or the pulverization container may be filled with an inert gas such as nitrogen gas as necessary. In addition, after the dry milling, the above-described solvent salt milling, a stirring treatment in a solvent, or the like may be performed.

<Coloring Composition>

A coloring composition of the present invention preferably contains the pigment composition and a dispersion medium.

[Dispersion Medium]

Examples of the dispersion medium include a resin and a solvent. Examples of the resin include a resin-type dispersant and a binder resin. Examples of the solvent include water and an organic solvent. A low-molecular-weight dispersant, such as a surfactant, can be used as necessary.

Examples of the resin-type dispersant include JONCRYL 67, JONCRYL 678, JONCRYL 586, JONCRYL 611, JONCRYL 683, JONCRYL 690, JONCRYL 57J, JONCRYL 60J, JONCRYL 61J, JONCRYL 62J, JONCRYL 63J, JONCRYL HPD-96J, JONCRYL 501J, JONCRYL PDX-6102B manufactured by BASF Japan Ltd., DISPERBYK 180, DISPERBYK 187, DISPERBYK 190, DISPERBYK 191, DISPERBYK 194, DISPERBYK 2010, DISPERBYK 2015, DISPERBYK 2090, DISPERBYK 2091, DISPERBYK 2095, DISPERBYK 2155 manufactured by BYK, SOLSPERSE 24000, SOLSPERSE 32000, SOLSPERSE 41000 manufactured by The Lubrizol Corporation, SMA 1000H, SMA 1440H, SMA 2000H, SMA 3000H, SMA 17352H manufactured by Sartomer Corporate, and the like.

The binder resin may be, for example, a polyolefin resin, a polyester resin, a styrene copolymer, an acrylic resin, or a modified resin thereof. Specific examples thereof include polyethylenes such as high density polyethylene (HDPE), linear low density polyethylene (L-LDPE), and low density polyethylene (LDPE), polyolefin resins such as polypropylene; polyester resins such as polyethylene terephthalate; styrene copolymers such as a styrene-p-chlorostyrene copolymer, a styrene-vinyltoluene copolymer, a styrene-vinylnaphthalene copolymer, a styrene-acrylic acid ester copolymer, a styrene-methacrylic acid ester copolymer, a styrene-$\alpha$-methyl chloromethacrylate copolymer, a styrene-acrylonitrile copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, and a styrene-acrylonitrile-indene copolymer; acrylic resins such as an acrylic resins and a methacrylic resin; polyvinyl chloride, phenolic resins, natural modified phenolic resins, natural resin modified maleic acid resins, polyvinyl acetate, silicone resins, polyurethane resins, ethylene-vinyl acetate copolymer resins, vinyl acetate resins, nitrocellulose resins, polyamide resins, epoxy resins, xylene resins, polyvinyl butyral resins, polyvinyl acetal resins, cellulose ester resins, alkyd resins, rosin-based resins, ketone resins, cyclized rubbers, chlorinated polyolefin resins, terpene resins, coumarone-indene resins, amino resins, petroleum resins, modified resins thereof, and the like.

Organic solvents can be classified into water-soluble solvents and water-insoluble solvents.

Examples of the water-soluble solvents include ethanol, n-propanol, isopropanol, isobutanol, ethylene glycol, diethylene glycol, triethylene glycol, propylene glycol, glycerin, and the like. Examples of the water-insoluble solvents include toluene, xylene, butyl acetate, methyl acetate, methyl ethyl ketone, methyl isobutyl ketone, butyl alcohol, aliphatic hydrocarbons, and the like.

Each material that configures the coloring composition can be used singly or two or more kinds thereof can be jointly used.

(Water-Based Coloring Composition)

In the present specification, the coloring composition is preferably used as a water-based coloring composition.

The water-based coloring composition preferably contains the pigment composition, a resin as the dispersion medium, water, and a water-soluble solvent. The resin that is used as the dispersion medium is preferably a resin-type dispersant. Examples of the kind of the resin include a styrene-(meth)acrylic acid copolymer, a (meth)acrylic acid-(meth)acrylic acid alkyl ester copolymer, a styrene-(meth) acrylic acid-(meth)acrylic acid alkyl ester copolymer, a styrene-α-methylstyrene-(meth)acrylic acid copolymer, a styrene-α-methylstyrene-(meth)acrylic acid-(meth)acrylic acid alkyl ester copolymer, a poly(meth)acrylic acid, a vinylnaphthalene-(meth)acrylic acid copolymer, a styrene-maleic acid copolymer, a maleic acid-maleic anhydride copolymer, an a olefin-(anhydrous) maleic acid copolymer, an a olefin-(anhydrous) maleic acid-polyalkylene glycol allyl ether copolymer, vinylnaphthalene-maleic acid copolymer, a polyester-modified (meth)acrylic acid polymer, salts thereof, and the like.

In addition, examples of the form of the resin include a water-soluble resin, an emulsion (water-insoluble resin), and the like.

The water is preferably ion exchange water or distilled water.

Examples of the water-soluble solvent include 2-(methoxymethoxy)ethanol, 2-butoxyethanol, 2-(isopentyloxy)ethanol, 2-(hexyloxy)ethanol, diethylene glycol, diethylene glycol monomethyl ether, diethylene glycol monoethyl ether, diethylene glycol monobutyl ether, triethylene glycol, triethylene glycol monomethyl ether, liquid polyethylene glycol, 1-methoxy-2-propanol, 1-ethoxy-2-propanol, dipropylene glycol, dipropylene glycol monomethyl ether, dipropylene glycol monoethyl ether, liquid polypropylene glycol, and the like.

The water-based coloring composition may contain a surfactant. Examples of the surfactant include an anionic surfactant, a nonionic surfactant, and the like.

Examples of the anionic surfactant include fatty acid salts, alkyl sulfate ester salts, alkyl aryl sulfonates, alkyl naphthalene sulfonates, dialkyl sulfonates, dialkyl sulfosuccinates, alkyl diaryl ether disulfonates, alkyl phosphates, polyoxyethylene alkyl ether sulfates, polyoxyethylene alkyl aryl ether sulfates, naphthalene sulfonic acid formalin condensates, polyoxyethylene alkyl phosphate ester salts, and the like.

Examples of the nonionic surfactant include polyoxyethylene alkyl ether, polyoxyethylene alkyl aryl ether, a polyoxyethyleneoxypropylene block copolymer, sorbitan fatty acid ester, polyoxyethylene sorbitan fatty acid ester, polyoxyethylene sorbitol fatty acid ester, glycerin fatty acid ester, polyoxyethylene fatty acid ester polyoxy ethylene alkylamine, glycerol borate fatty acid ester, polyoxyethylene glycerol fatty acid ester, and the like.

The content of the surfactant is preferably 0.3 to 20 mass % and more preferably 1 to 10 mass % in 100 parts by mass of the water-based coloring composition.

The water-based coloring composition may contain other additives. Examples of the other additives include a preservative, a pH adjuster, a defoamer, a wetting agent, and the like.

Examples of the preservative include amine salts of sodium dehydroacetate, sodium benzoate, sodium pyridinethione-1-oxide, zinc pyridinethione-1-oxide, 1,2-benzisothiazolin-3-one, and 1-benzisothiazolin-3-one and the like. The content of the preservative is preferably 0.1 to 2 mass % in 100 parts by mass of the water-based coloring composition.

Examples of the pH adjuster include a variety of amines, an inorganic salt, ammonia, a variety of buffers, and the like.

The defoamer is used to prevent the generation of bubbles at the time of manufacturing the water-based coloring composition. Examples of the commercially available products of the defoamer include SURFYNOL 104E, SURFYNOL 104H, SURFYNOL 104A, SURFYNOL 104BC, SURFYNOL 104DPM, SURFYNOL 104PA, SURFYNOL 104PG-50, SURFYNOL 420, SURFYNOL 440, SURFYNOL 465, SURFYNOL 485, SURFYNOL PSA-336 (all manufactured by Nissin Chemical Industry Co., Ltd.), ADDITOL VXW 6211, ADDITOL VXW 4973, ADDITOL VXW 6235, ADDITOL XW 375, ADDITOL XW 376, ADDITOL VXW 6381, ADDITOL VXW 6386, ADDITOL VXW 6392, ADDITOL VXW 6393, ADDITOL VXW 6399, ADDITOL XW 6544, and the like (all manufactured by Allnex GMBH).

The wetting agent is used to obtain flat coatings at the time of printing or coating. Examples of the commercially available products of the wetting agent include ADDITOL VXL 6237N, ADDITOL XL 260N, ADDITOL VXL 6212, ADDITOL UVX 7301/65, ADDITOL XW 330, ADDITOL VXW 6200, ADDITOL VXW 6205, ADDITOL VXW 6394, ADDITOL VXW 6208, ADDITOL VXW 6208/60, ADDITOL VXW 6374 (all manufactured by Allnex GMBH), and the like.

Each material that is used to produce the water-based coloring composition can be used singly or two or more kinds thereof can be jointly used.

The water-based coloring composition can be produced by performing a dispersion treatment on materials such as the pigment composition, the resin, water, and the other additives as necessary.

Examples of a disperser that is used in the dispersion treatment include a horizontal sand mill, a vertical sand mill, an annular bead mill, an attritor, a microfluidizer, a high-speed mixer, a homomixer, a homogenizer, a high-pressure homogenizer, a ball mill, a paint shaker, a roll mill, a stone mill, an ultrasonic disperser, an opposing impact type high-pressure disperser, an oblique impact type high-pressure disperser, and the like.

More specifically, in a case where the resin-type dispersant that is a water-soluble resin is used as the resin, the water-based coloring composition of the present invention can be obtained by a method described in examples to be described below, that is, a method in which the pigment composition, the resin-type dispersant, water, and the like are mixed together and then a dispersion treatment is performed using the disperser.

In addition, in a case where the resin-type dispersant that is a water-insoluble resin is used as the resin, the water-based coloring composition of the present invention can be obtained by, for example, a method in which the resin-type dispersant is dissolved in an organic solvent capable of dissolving the water-insoluble resin and then mixed with the pigment composition, a dispersion treatment is performed using the disperser, after that, phase inversion emulsification is performed using water, and then the organic solvent is distilled away.

Incidentally, it is preferable to crosslink the resin-type dispersant on the surface of the pigment composition since the dispersion characteristics and dispersion stability of the pigment composition in the water-based coloring composition can be particularly enhanced. Aqueous inkjet ink for which such a pigment composition containing the resin-type dispersant crosslinked on the surface (hereinafter, also referred to as "pigment composition-containing crosslinked resin particles") is used also has outstanding re-dispersion characteristics (a property of the aqueous inkjet ink by which the pigment composition is made to be dispersible again by adding water to the aqueous inkjet ink that has been dried, aggregated, and thickened) and is thus capable of minimizing, for example, nozzle clogging or "blurring" during continuous printing. In addition, when the pigment composition is coated with the crosslinked resin-type dispersant, it is also possible to improve the weather resistance or the pH resistance.

Examples of a method for manufacturing the water-based coloring composition containing the pigment composition-containing crosslinked resin particles include four methods below.

[[Method (i)]]

A method in which the water-based coloring composition containing the pigment composition-containing crosslinked resin particles are manufactured by four steps below.

Step (i-1): A step of performing a dispersion treatment using the pigment composition; the resin-type dispersant that has a crosslinkable functional group and a carboxy group and has been hydrophilized by the neutralization of the carboxyl group by a basic compound; and water.

Step (i-2): A step of adding an acidic compound to the dispersion liquid of the pigment composition produced in step (i-1) and adjusting the pH of the dispersion liquid to be neutral or acidic, thereby precipitating and fixing the resin-type dispersant on the surface of the pigment composition.

Step (i-3): A step of neutralizing the carboxy group in the resin-type dispersant using a basic compound (which may be the same as or different from the basic compound used in step (i-1)) after step (i-2) and re-dispersing the pigment composition to which the resin-type dispersant has been fixed in water.

Step (i-4): A step of reacting and crosslinking the crosslinkable group in the resin-type dispersant and a crosslinking agent after step (i-3), thereby obtaining the water-based coloring composition containing the pigment composition-containing crosslinked resin particles. The crosslinking agent may be added at the time of starting step (i-4) or may be added in any stage of steps (i-1) to (i-3).

[[Method (ii)]]

A method in which the pigment composition to which the resin-type dispersant has been fixed is re-dispersed in water in the same manner as steps (i-1) to (i-3) except that, as the resin-type dispersant, a resin-type dispersant that has a self-crosslinkable functional group and a carboxy group and has been hydrophilized by the neutralization of the carboxyl group by a basic compound is used, and then the resin-type dispersant is self-crosslinked, thereby obtaining the water-based coloring composition containing the pigment composition-containing crosslinked resin particles.

[[Method (iii)]]

A method in which the pigment composition-containing crosslinked resin particles are manufactured by two steps below.

Step (iii-1): A step of mixing a pigment, a resin having a carboxy group, a basic compound, and water.

Step (iii-2): A step of adding a crosslinking agent after step (iii-1) to perform a crosslinking treatment, thereby obtaining the water-based coloring composition containing the pigment composition-containing crosslinked resin particles.

[[Method (iv)]]

A method in which the pigment composition-containing crosslinked resin particles are manufactured by three steps below.

Step (iv-1): A step of mixing a pigment, a resin having a carboxy group, and an organic solvent.

Step (iv-2): A step of adding water after step (iv-1) and removing the organic solvent by distillation under reduced pressure or the like.

Step (iv-3): A step of adding a crosslinking agent after step (iv-2) to perform a crosslinking treatment, thereby obtaining the water-based coloring composition containing the pigment composition-containing crosslinked resin particles.

When a heating treatment or a post treatment is performed on the water-based coloring composition obtained by the above-described method, the dispersion stability of isoindoline compound (1) and isoindoline compound (2) improves. The heating treatment is a treatment in which the water-based coloring composition is heated to 30° C. to 80° C. and held for approximately several hours to one week. In the post treatment, a dispersion treatment is performed on the water-based coloring composition using an ultrasonic disperser or an impact type beadless disperser.

It is possible to perform a pre-dispersion treatment without using water or a water-soluble solvent before the dispersion treatment. Examples of a device that is used in the pre-dispersion treatment include milling mixers such as a kneader and a triple roll mill; non-volatile dispersers such as a twin roll mill, medialess dispersers such as an MK mixer, and the like.

Examples of the aspect of the coloring composition of the present specification include aspect 1 where the pigment composition and a resin are contained (for example, a composition for molding or toner), aspect 2 where the pigment composition and an organic solvent are contained (for example, a solvent-based coloring composition), aspect 3 where the pigment composition described in detail above, a resin, and water are contained (for example, the water-based coloring composition), and the like.

As the uses of each aspect, examples of the uses of aspect 1 include compositions for molding, toner, solventless inkjet ink, and the like. Aspect 2 is a solvent-based coloring composition, and examples of the uses thereof include paint, printing ink, inkjet ink, and the like. Aspect 3 is the water-based coloring composition, and examples of the uses thereof include aqueous paint, aqueous printing ink, aqueous inkjet ink, and the like. In the present specification, in a case where a solvent contains water, the solvent is expressed as "aqueous"; however, in a case where a solvent contains "an organic solvent", the solvent is not particularly expressed as "solvent-based". The water is preferably ion exchange water from which metal ions or the like have been removed or distilled water.

<Composition for Molding>

A composition for molding of the present invention contains the coloring composition (the pigment composition and the resin). The composition for molding preferably contains a thermoplastic resin as the resin. It is preferable that the composition for molding containing a thermoplastic resin is melted, kneaded, and molded into a desired shape to produce a compact. For example, in the case of being melted and kneaded at 300° C., the composition for molding contains isoindoline compound (1) and isoindoline compound (2), which are highly heat-resistant, and is thus capable of minimizing a change in color. The resin is not limited to thermoplastic resins.

Examples of the thermoplastic resin include homopolymers and copolymers in which ethylene, propylene, butylene, styrene, or the like is used as a monomer component. More specifically, examples thereof include polyethylene such as high density polyethylene (HDPE), linear low density polyethylene (L-LDPE), and low density polyethylene (LDPE) and polyolefin resins such as polypropylene and polybutylene. Specific examples of other useful resins include polyester resins such as polyethylene terephthalate, polyamide resins such as nylon 6 and nylon 66, polystyrene resins, thermoplastic ionomer resins, and the like. Among these, polyolefin resins and polyester resins are preferable. The number-average molecular weight of the thermoplastic resin is preferably more than 30,000 and 200,000 or less.

The content of the thermoplastic resin is preferably 10,000 to 10,000,000 parts by mass and more preferably 10,000 to 2,000,000 parts by mass with respect to a total of 100 parts by mass of isoindoline compound (1) and isoindoline compound (2).

The composition for molding may contain wax. The wax is composed of low-molecular-weight polyolefins. These are polymers of olefin monomers such as ethylene, propylene, and butylene and may be a block, a random copolymer, or a terpolymer. Specifically, these are polymers of α-olefins such as low density polyethylene (LDPE), high density polyethylene (HDPE), and polypropylene (PP).

The number-average molecular weight of the wax is preferably 1,000 to 30,000 and more preferably 2,000 to 25,000. When the number-average molecular weight is within this range, the wax appropriately moves to the surface of a compact, which makes the balance between the sliding properties and the minimization of bleeding out outstanding.

The melting point of the wax is preferably 60° C. to 150° C. and more preferably 70° C. to 140° C. When the melting point is within this range, workability at the time of melting and kneading the thermoplastic resin and the wax becomes favorable.

The melt flow rate (MFR) of the wax, which is obtained based on JIS K-7210, is preferably more than 100 g/10 minutes.

The amount of the wax blended is preferably 0.1 to 10 parts by mass with respect to 100 parts by mass of the thermoplastic resin.

The composition for molding may contain other additives. The other additives are materials that are ordinarily used in the technical field of compacts, and examples thereof include an antioxidant, a light stabilizer, a dispersant, a metallic soap, an antistatic agent, a flame retardant, a lubricant, a filler, a coloring agent other than isoindoline compound (1) and isoindoline compound (2), and the like.

The composition for molding can be manufactured in, for example, the compositional ratio of a compact. Alternatively, the composition for molding can be manufactured as a masterbatch containing a high concentration of isoindoline compound (1) and isoindoline compound (2). In the present specification, the masterbatch is preferable since it is easy to uniformly disperse isoindoline compound (1) and isoindoline compound (2) in a compact.

The masterbatch is preferably produced by, for example, melting and kneading the thermoplastic resin and the pigment composition and then molding the kneaded components into an arbitrary shape so as to facilitate the use of the kneaded components in the subsequent steps. Next, the masterbatch and a diluted resin (for example, the thermoplastic resin used for the masterbatch) are melted and kneaded, and a compact having a desired shape can be molded. Examples of the shape of the masterbatch include a pellet shape, a powder shape, a plate shape, and the like. In order to prevent the aggregation of the pigment composition, the masterbatch is preferably manufactured by manufacturing a dispersion element in which the pigment composition and the wax have been melted and kneaded in advance and then melting and kneading the dispersion element together with the thermoplastic resin. A device that is used for the dispersion element is preferably, for example, a blend mixer, a triple roll mill, or the like.

In the case of manufacturing a resin composition for molding as the masterbatch, the amount of isoindoline compound (1) and isoindoline compound (2) blended with 100 parts by mass of the thermoplastic resin is preferably 1 to 200 parts by mass and more preferably 5 to 700 parts by mass. The mass ratio (X/Y) of the masterbatch (X) to the diluted resin (Y), which serves as a base material resin for a compact, is preferably 1/1 to 1/100 and more preferably 1/3 to 2/100. When the mass ratio is within this range, it is easy to uniformly disperse isoindoline compound (1) and isoindoline compound (2) in a compact and to obtain favorable coloring.

As the diluted resin (Y), the thermoplastic resin that is used in the masterbatch is preferably used, and a different thermoplastic resin may be used as long as there is no problem with compatibility.

Examples of the melting and kneading include a single screw kneading extruder, a twin screw kneading extruder, a tandem-type twin screw kneading extruder, and the like. The melting and kneading temperature varies with the kind of the thermoplastic resin, but is normally approximately 150° C. to 300° C.

Examples of the uses of the composition for molding include plastic compacts, sheets, films, and the like.

<Toner>

A toner of the present specification contains the coloring composition (the pigment composition and the resin). In the toner, the resin is referred to as a binding resin and is preferably a thermoplastic resin. Examples of the toner include a dry toner and a wet toner, and a dry toner is preferable. The dry toner can be produced by, for example, melting and kneading the pigment composition and the binding resin, cooling the kneaded components, then, pulverizing and classifying the kneaded components, and performing a post treatment step for blending and mixing an additive therewith.

Examples of the binding resin include a styrene-p-chlorostyrene copolymer, a styrene-vinyltoluene copolymer, a styrene-vinylnaphthalene copolymer, a styrene-(meth) acrylic acid ester copolymer, a styrene-α-chloromethyl methacrylate copolymer, a styrene-acrylonitrile copolymer, a styrene-vinyl methyl ether copolymer, a styrene-vinyl ethyl ether copolymer, a styrene-vinyl methyl ketone copolymer, a styrene-butadiene copolymer, a styrene-isoprene copolymer, a styrene-acrylonitrile-indene copolymer, a polyvinyl chloride, a phenol resin, a natural modified phenol resin, a natural resin-modified maleic acid resin, a (meth) acrylic resin, polyvinyl acetate, a silicone resin, a polyester resin, polyurethane, a polyamide resin, a furan resin, an epoxy resin, a xylene resin, polyvinyl butyral, a terpene resin, a coumarone-indene resin, a petroleum-based resin, and the like.

Among these, a polyester resin and a styrene-based copolymer are preferable, and a polyester resin is more preferable. Since the pigment composition of the present specification has particularly outstanding compatibility with polyester resins, isoindoline compound (1) and isoindoline compound (2) are uniformly and finely dispersed in the toner, and thus high-quality toners can be obtained.

The weight-average molecular weight (Mw) of the polyester resin is preferably 5,000 or more, more preferably 10,000 to 1,000,000 and still more preferably 20,000 to 100,000. The use of the polyester resin with an appropriate Mw makes it possible to obtain toners having favorable offset resistance and low-temperature fixability.

The acid value of the polyester resin is preferably 10 to 60 mgKOH/g and more preferably 15 to 55 mgKOH/g. The use of the polyester resin with an appropriate acid value makes it easy to minimize the liberation of a mold release agent and makes it unlikely for image density to decrease in highly humid environments.

The hydroxyl value of the polyester resin is preferably 20 mgKOH/g or less and more preferably 15 mgKOH/g or less. The use of the polyester resin with an appropriate hydroxyl value makes it unlikely for image density to decrease in highly humid environments.

The glass transition temperature (Tg) of the polyester resin is preferably 50° C. to 70° C. and more preferably 50° C. to 65° C. An appropriate Tg makes it possible to minimize the aggregation of the toner. Tg can be measured with a differential scanning calorimeter (device: DSC-6, manufactured by Shimadzu Corporation).

The toner may further contain a charge control agent. The use of the charge control agent makes it easy to obtain toners with a stable charge amount. As the charge control agent, a positive or negative charge control agent can be appropriately selected and used.

In a case where the toner is a positively chargeable toner, examples of the positive charge control agent include nigrosine-based dyes, triphenylmethane-based dyes, organic tin oxides, quaternary ammonium salt compounds, styrene-acrylic polymers obtained by copolymerizing a quaternary ammonium salt as a functional group with a styrene-acrylic resin, and the like. Among these, quaternary ammonium salt compounds are preferable. Examples of the quaternary ammonium salt compounds include salt-forming compounds of a quaternary ammonium salt and organic sulfonic acid or molybdic acid. The organic sulfonic acid is preferably naphthalenesulfonic acid.

In a case where the toner is a negatively chargeable toner, examples of the negative charge control agent include metal complexes of a monoazo dye, styrene-acrylic polymers obtained by copolymerizing sulfonic acid as a functional group with a styrene-acrylic resin, metal salt compounds of an aromatic hydroxycarboxylic acid, metal complexes of an aromatic hydroxycarboxylic acid, phenolic condensates, phosphonium-based compounds, and the like. The aromatic hydroxycarboxylic acid is preferably salicylic acid, 3,5-di-tert-butylsalicylic acid, 3-hydroxy-2-naphthoic acid, or 3-phenylsalicylic acid. In addition, examples of metals that are used in the metal salt compounds include zinc, calcium, magnesium, chromium, aluminum, and the like.

The toner may contain a mold release agent. Examples of the mold release agent include hydrocarbon-based waxes such as polypropylene wax, polyethylene wax, and Fischer-Tropsch wax, synthetic ester waxes, natural ester waxes such as carnauba wax and rice wax, and the like.

To the toner, it is possible to add a lubricant, a fluidizer, an abrasive, a conductivity-imparting agent, an image-peeling prevention agent, or the like as necessary.

Examples of the lubricant include polyvinylidene fluoride, zinc stearate, and the like. Examples of the fluidizer include silica, aluminum oxide, titanium oxide, silicon-aluminum co-oxides, silicon-titanium co-oxide, which are manufactured by a dry method or a wet method, hydrophobized products thereof, and the like. Among these, fine powders of hydrophobized silica, silicon-aluminum co-oxides, and silicon-titanium co-oxide are preferable. Examples of the hydrophobic treatment method for these fine powders include treatments for which silicon oil or a silane coupling agent such as tetramethyldisilazane, dimethyldichlorosilane, or dimethyldimethoxysilane is used and the like.

Examples of the abrasive include silicon nitride, cerium oxide, silicon carbide, strontium titanate, tungsten carbide, calcium carbonate, hydrophobized products thereof, and the like. Examples of the conductivity-imparting agent include tin oxide and the like.

In addition, in the present specification, the toner can be used as a one-component developer or a two-component developer. The two-component developer may further contain a carrier.

Examples of the carrier include magnetic powders such as iron powder, ferrite powder, and nickel powder and coating-treated powders obtained by coating the surface of the powder with a resin or the like. Examples of the resin that coats the carrier surface include a styrene-(meth)acrylic acid ester copolymer, a (meth)acrylic acid ester copolymer, a fluorine-containing resin, a silicone-containing resin, a polyamide resin, an ionomer resin, a polyphenylene sulfide resin, and the like. Among these, a silicone-containing resin, which forms a small amount of spent toner, is preferable. The weight-average particle size of the carrier is preferably 30 to 100 μm.

The mixing ratio (mass ratio) between the toner and the carrier in the two-component developer is preferably 1:100 to 30:100 (toner:carrier).

<Paint>

A paint of the present specification contains the coloring composition (the pigment composition, the resin, and the solvent).

Examples of the resin include a thermosetting resin and a thermoplastic resin. As the thermosetting resin, a resin having a glass transition temperature of 10° C. or higher is preferable. Examples of the kind of the thermosetting resin include an acrylic resin, polyester, polyurethane, and the like. In addition, the thermosetting resin preferably has a functional group capable of reacting with a curing agent. Examples of the functional group include a carboxyl group, a hydroxyl group, and the like. Examples of the curing agent include an isocyanate curing agent, an epoxy curing agent, an aziridine curing agent, an amine curing agent, and the like.

As the thermoplastic resin, a resin having a glass transition temperature of 30° C. or higher is preferable. Examples of the thermoplastic resin include nitrocellulose, polyester, and the like. The thermosetting resin and the thermoplastic resin can be jointly used.

Examples of a water-insoluble solvent in the solvent include toluene, xylene, butyl acetate, methyl acetate, methyl ethyl ketone, methyl isobutyl ketone, butyl alcohol, aliphatic hydrocarbons, and the like.

Examples of a water-soluble solvent in the solvent include water, a monovalent alcohol, a divalent alcohol, and glycol. Examples of the water-soluble solvent include ethanol, n-propanol, isopropanol, isobutanol, ethylene glycol, diethylene glycol, triethylene glycol, propylene glycol, and glycerin. In addition, examples thereof also include water-reducible monoethers derived from a polyvalent alcohol. Specific examples thereof include methoxypropanol and methoxybutanol. In addition, examples thereof also include water-reducible glycol ethers such as butyl glycol and butyl diglycol. In the case of containing water as the solvent as described above, the paint is referred to as aqueous paint.

The paint may further contain a well-known additive.

Examples of the use of the paint include paint for metal, paint for plastic, and the like.

<Printing Ink>

A printing ink of the present specification contains the coloring composition (the pigment composition, the resin, and the solvent). The printing ink is ink other than inkjet ink, and examples thereof include ink for offset printing, ink for flexographic printing, ink for gravure printing, silk screen printing ink, ink for a color filter, and the like. In the case of containing water as the solvent as described above, the printing ink is referred to as aqueous printing ink.

Examples of the resin include a rosin resin, a rosin-modified phenolic resin, polyurethane, nitrocellulose, an acrylic resin, a styrene-acrylic resin, a petroleum resin, and the like.

Examples of a water-insoluble solvent in the solvent include toluene, xylene, butyl acetate, methyl acetate, methyl ethyl ketone, methyl isobutyl ketone, butyl alcohol, aliphatic hydrocarbons, and the like.

Examples of a water-soluble solvent in the solvent include ethanol, n-propanol, isopropanol, isobutanol, ethylene glycol, diethylene glycol, triethylene glycol, propylene glycol, and glycerin. In addition, examples thereof also include water-reducible monoethers derived from a polyvalent alcohol. Examples thereof include methoxypropanol and methoxybutanol. In addition, examples thereof also include water-reducible glycol ethers such as butyl glycol and butyl diglycol.

The printing ink may further contain a glitter material. The glitter material is particles having an average thickness of 0.5 to 10 μm and an average particle size of 5 to 50 μm, and examples thereof metal flakes, mica, coated glass flakes, and the like. Examples of the metal flakes include aluminum flakes, gold powder, and the like. Examples of the mica include normal mica, coated mica, and the like. Examples of the coated glass flakes include glass flakes coated with a metal oxide such as titanium oxide and the like.

The content of the glitter material is preferably 0.1 to 10 mass % in 100 mass % of the printing ink. In addition, additionally, other coloring pigments that are normally used in the technical field and a variety of additives may also be blended as necessary. A manufacturing method or coating method and drying method of the printing ink are not particularly limited, and methods that are well-known in the technical field can be used.

The printing ink may further contain a well-known additive.

<Inkjet Ink>

An inkjet ink of the present invention contains the pigment composition and the resin and preferably contains the solvent. Inkjet ink can be roughly classified into (solvent-based) inkjet ink, aqueous inkjet ink, and solventless inkjet ink depending on the presence or absence of a solvent or the kind of the solvent. In the present specification, aqueous inkjet ink where favorable dispersion characteristics of isoindoline compound (1) and isoindoline compound (2) are generated is preferable. Hereinafter, aqueous inkjet ink will be mainly described.

The content of the pigment composition is preferably 0.5 to 30 mass % and more preferably 1 to 15 mass % in 100 mass % of the aqueous inkjet ink.

A resin that is used in the aqueous inkjet ink is important in order to obtain the fixability of the ink to articles to be printed (base material).

Examples of the kind of the resin include an acrylic resin, a styrene-acrylic resin, a polyester-based resin, a polyamide-based resin, a polyurethane resin, and the like. In addition, examples of the form of the resin include a water-soluble resin, emulsion particles, and the like. Among these, emulsion particles are preferable. Examples of the emulsion particles include single-composition particles, core-shell particles, and the like, and the emulsion particles can be arbitrarily selected therefrom and used. The use of the emulsion particles makes it easy to decrease the viscosity of the aqueous inkjet ink and makes it possible to easily obtain recorded articles having outstanding water resistance. The resin can be used after an acidic functional group is neutralized with a pH adjuster such as ammonia, a variety of amines, or a variety of inorganic alkalis as necessary.

The content of the resin is preferably 2 to 30 mass % and more preferably 3 to 20 mass % in 100 mass % of a non-volatile component of the inkjet ink. When the resin is appropriately contained, the discharge stability improves, and the fixability also improves.

Examples of the solvent include a water-insoluble solvent, water, and a water-soluble solvent. Examples of the water-soluble solvent include glycol ethers and diols, and these solvents penetrate base materials extremely fast and also penetrate poorly liquid-absorbable or liquid-inabsorbable base materials, such as coated paper, art paper, vinyl chloride sheets, films, and fabrics, fast. Therefore, the water-soluble solvent dries fast at the time of printing and makes accurate printing possible. In addition, the water-soluble solvent has a high boiling point and thus also acts as a lubricant.

The water-soluble solvent is important in order to prevent the drying and solidification of the aqueous inkjet ink at nozzle parts in printer heads and to obtain the discharge stability of the ink. Examples of the water-soluble solvent include ethylene glycol, diethylene glycol, propylene glycol, triethylene glycol, polyethylene glycol, glycerin, tetraethylene glycol, dipropylene glycol, ketone alcohol, diethylene glycol monobutyl ether, ethylene glycol monobutyl ether, ethylene glycol monoethyl ether, 1,2-hexanediol, N-methyl-2-pyrrolidone, substituted pyrrolidone, 2,4,6-hexanetriol, tetrafurfuryl alcohol, 4-methoxy-4 methylpentanone, and the like.

The content of the water-soluble solvent containing water is preferably 15 to 50 mass % in 100 mass % of the inkjet ink.

The inkjet ink may further contain an additive. Examples of the additive include a drying accelerator, a penetrant, a preservative, a chelating agent, a pH adjuster, and the like.

The drying accelerator is used to speed up the drying of the aqueous inkjet ink after printing. Examples of the drying accelerator include alcohols such as methanol, ethanol, and isopropyl alcohol. The content of the drying accelerator is preferably 15 to 50 mass % in 100 mass % of the aqueous inkjet ink.

The penetrant is used to accelerate the penetration of the ink into a base material and to speed up the apparent drying properties in a case where the base material is a permeable material such as paper. Examples of the penetrant include not only water-soluble solvents but also surfactants such as polyethylene glycol monolauryl ether, sodium lauryl sulfate, sodium dodecylbenzenesulfonate, sodium oleate, and sodium dioctylsulfosuccinate and the like. The amount of the penetrant used is preferably 0.1 to 5 mass % in 100 mass % of the aqueous inkjet ink. The use of an appropriate amount of the drying accelerator makes it unlikely for a disadvantage of the bleeding of print or paper penetration of the ink to occur.

Examples of the preservative include amine salts of sodium dehydroacetate, sodium benzoate, sodium pyridinethione-1-oxide, zinc pyridinethione-1-oxide, 1,2-benzisothiazolin-3-one, and 1-benzisothiazolin-3-one and the like. The amount of the preservative used is preferably 0.05 to 1.0 mass % in 100 mass % of the aqueous inkjet ink.

The chelating agent is used to trap metal ions that are contained in the aqueous inkjet ink and to prevent the precipitation of an insoluble matter at nozzle parts or in the ink. Examples of the chelating agent include ethylenediaminetetraacetic acid, sodium salts of ethylenediaminetetraacetic acid, diammonium salts of ethylenediaminetetraacetic acid, tetraammonium salts of ethylenediaminetetraacetic acid, and the like. The amount of the chelating agent used is preferably 0.005 to 0.5 mass % in 100 mass % of the aqueous inkjet ink.

Examples of the pH adjuster include a variety of amines, an inorganic salt, ammonia, a variety of buffers, and the like.

The inkjet ink is produced by blending and mixing the individual materials. Examples of the mixing include a stirrer, a variety of dispersers, an emulsifiers, and the like in which a blade is used. The addition order and mixing method of the individual materials are arbitrary.

For the inkjet ink, it is preferable that the materials are mixed and filtered or centrifugally separated and coarse particles are removed. This makes the discharge properties from inkjet printers favorable. For the filtration or centrifugation, a well-known method can be used.

For the inkjet ink of the present specification, a variety of inkjet methods can be used. Examples of the inkjet method include continuous injection type methods such as a charge control type method and spray type method, a piezo method, a thermal method, an electrostatic attraction method, and the like.

[Dye Derivative]

To a pigment, the coloring composition, and a coloring-curable composition that are used in the present invention, a dye derivative can be added as necessary.

As the dye derivative, a well-known dye derivative having an acidic group, a basic group, a neutral group, or the like in an organic dye residue can be used. Examples thereof include compounds having an acidic substituent such as a sulfo group, a carboxy group, or a phosphoric acid group and amine salts thereof, compounds having a sulfoamide group or a basic substituent, such as a tertiary amino group, at the terminal, and compounds having a neutral substituent such as a phenyl group or a phthalimidoalkyl group.

Examples of an organic dye include diketopyrrolopyrrole-based pigments, anthraquinone-based pigments, quinacridone-based pigments, dioxazine-based pigments, perinone-based pigments, perylene-based pigments, thiazine indigo-based pigments, triazine-based pigments, benzimidazolone-based pigments, indole-based pigments such as benzoisoindole, isoindoline-based pigments, isoindolinone-based pigments, quinophthalone-based pigments, naphthol-based pigments, threne-based pigments, metal complex-based pigments, azo-based pigments such as azo, disazo, and polyazo, and the like. Specifically, examples of diketopyrrolopyrrole-based dye derivatives include well-known dye derivatives described in Japanese Patent Laid-Open No. 2001-220520, the pamphlet of WO 2009/081930, the pamphlet of WO 2011/052617, the pamphlet of WO 2012/102399, and Japanese Patent Laid-Open No. 2017-156397, examples of phthalocyanine-based dye derivatives include well-known dye derivatives described in Japanese Patent Laid-Open No. 2007-226161, the pamphlet of WO 2016/163351, Japanese Patent Laid-Open No. 2017-165820, and Japanese Patent No. 5753266, examples of anthraquinone-based dye derivatives include well-known dye derivatives described in Japanese Patent Laid-Open No. S63-264674, Japanese Patent Laid-Open No. H09-272812, Japanese Patent Laid-Open No. H10-245501, Japanese Patent Laid-Open No. H10-265697, Japanese Patent Laid-Open No. 2007-079094, and the pamphlet of WO 2009/025325, examples of quinacridone-based dye derivatives include well-known dye derivatives described in Japanese Patent Laid-Open No. S48-54128, Japanese Patent Laid-Open No. H03-9961, and Japanese Patent Laid-Open No. 2000-273383, examples of dioxazine-based dye derivatives include well-known dye derivatives described in Japanese Patent Laid-Open No. 2011-162662, examples of thiazine indigo-based dye derivatives include well-known dye derivatives described in Japanese Patent Laid-Open No. 2007-314785, examples of triazine-based dye derivatives include well-known dye derivatives described in Japanese Patent Laid-Open No. S61-246261, Japanese Patent Laid-Open No. H11-199796, Japanese Patent Laid-Open No. 2003-165922, Japanese Patent Laid-Open No. 2003-168208, Japanese Patent Laid-Open No. 2004-217842, and Japanese Patent Laid-Open No. 2007-314681, examples of benzoisoindoline-based dye derivatives include well-known dye derivatives described in Japanese Patent Laid-Open No. 2009-57478, examples of quinophthalone-based dye derivatives include well-known dye derivatives described in Japanese Patent Laid-Open No. 2003-167112, Japanese Patent Laid-Open No. 2006-291194, Japanese Patent Laid-Open No. 2008-31281, and Japanese Patent Laid-Open No. 2012-226110, examples of naphthol-based dye derivatives include well-known dye derivatives described in Japanese Patent Laid-Open No. 2012-208329 and Japanese Patent Laid-Open No. 2014-5439, examples of azo-based dye derivatives include well-known dye derivatives described in Japanese Patent Laid-Open No. 2001-172520 and Japanese Patent Laid-Open No. 2012-172092, examples of acidic substituents include well-known dye derivatives described in Japanese Patent Laid-Open No. 2004-307854, and examples of basic substituents include well-known dye derivatives described in Japanese Patent Laid-Open No. 2002-201377, Japanese Patent Laid-Open No. 2003-171594, Japanese Patent Laid-Open No. 2005-181383, Japanese Patent Laid-Open No. 2005-213404, and the like. In these publications, there are cases where dye derivatives are expressed as derivatives, pigment derivatives, dispersants, pigment dispersants, simply, compounds, and the like, but compounds having a substituent, such as an acidic group, a basic group, or a neutral group, in the organic dye residue are the same as dye derivatives.

The dye derivative can be used singly or two or more kinds of dye derivatives can be mixed and used.

<Ink Set>

An ink set of the present invention is an ink set containing at least yellow ink, cyan ink, and magenta ink, and the yellow ink preferably contains ink containing the coloring composition.

The ink set of the present invention may further contain other inks such as black ink, white ink, and special ink.

The ink set of the present invention can be used as printing ink sets for offset printing ink, flexographic printing ink, gravure printing ink, and screen printing ink and ink sets for inkjet ink. Among these, a gravure printing ink set and an ink jet ink set that are used for packaging materials are preferable, and a gravure printing ink set is more preferable.

<Yellow Ink>

The yellow ink in the present invention contains the pigment composition and a binder resin.

When the yellow ink contains two kinds of isoindoline compounds as described above, dispersion characteristics and storage stability, which were weak points of conventional isoindoline compounds, improve.

<Binder Resin>

Examples of the binder resin include a polyurethane resin, an ethylene-vinyl acetate copolymer resin, a vinyl acetate resin, a nitrocellulose resin, a polyamide resin, a polyvinyl acetal resin, a cellulose ester resin, a polystyrene resin, an acrylic resin, a polyester resin, an alkyd resin, a rosin-based resin, a rosin-modified maleic acid resin, a ketone resin, cyclized rubber, butyral, a petroleum resin, and a chlorinated polyolefin resin.

The content of the binder resin is preferably 4 to 25 mass % and more preferably 6 to 20 mass % in the yellow ink.

The yellow ink may further contain a different pigment, a resin, an organic solvent, and, as necessary, other additives such as a pigment dispersant, a leveling agent, a defoamer, wax, a plasticizer, an infrared absorber, and an ultraviolet absorber.

<Cyan Ink>

The cyan ink in the present invention is ink from which the cyan color can be obtained and contains a pigment and a binder resin. As the binder resin, the resins described previously can be used.

<Magenta Ink>

The magenta ink in the present invention is ink from which the magenta color can be obtained and contains a pigment and a binder resin. As the binder resin, the resins described previously can be used.

<Pigment>

Examples of pigments include organic pigments and inorganic pigments. In the present specification, for example, pigments below can be used.

[Organic Pigment]

The pigment is preferably an organic pigment. Examples of the organic pigment include a soluble azo-based pigment, an insoluble azo-based pigment, an azo-based pigment, a phthalocyanine-based pigment, a halogenated phthalocyanine-based pigment, an anthraquinone-based pigment, an anthanthrone-based pigment, a dianthraquinonyl-based pigment, an anthrapyrimidine-based pigment, a perylene-based pigment, a perinone-based pigment, a quinacridone-based pigment, a thioindigo-based pigment, a dioxazine-based pigment, an isoindolinone-based pigment, a quinophthalone-based pigment, an azomethinazo-based pigment, a flavanthrone-based pigment, a diketopyrrolopyrrole-based pigment, an isoindoline-based pigment, an indanthrone-based pigment, and the like.

Examples of the pigment will be shown by C.I. Pigment numbers.

Examples of an indigo pigment include C.I. Pigment Blue 15, C.I. Pigment Blue 15:1, C.I. Pigment Blue 15:2, C.I. Pigment Blue 15:3, C.I. Pigment Blue 15:4, C.I. Pigment Blue 15:6, C.I. Pigment Blue 16, C.I. Pigment blue 60, and the like. In addition, examples thereof also include phthalocyanine pigments such as aluminum phthalocyanine (compound (30)) or titanyl phthalocyanine (compound (31)).

The cyan ink preferably contains the indigo pigment. Among these, C.I. Pigment Blue 15:3, C.I. Pigment Blue 15:4, and C.I. Pigment Blue 16 are more preferable.

[Chem. 14]

(30)

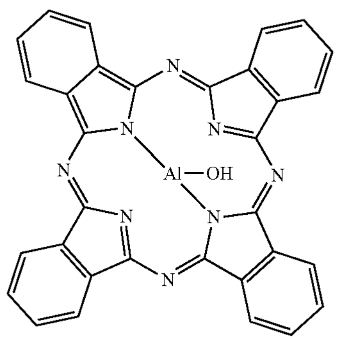

(31)

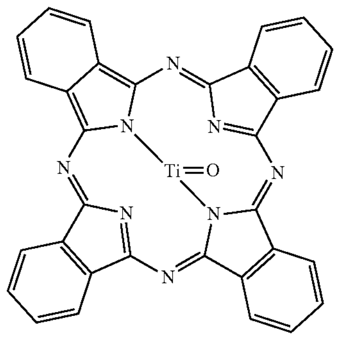

Examples of a red pigment include C.I. Pigment Red 2, C.I. Pigment Red 32, C.I. Pigment Red 48:1, C.I. Pigment Red 48:2, C.I. Pigment Red 48:3, C.I. Pigment Red 53:1, C.I. Pigment Red 57:1, C.I. Pigment Red 63:1, C.I. Pigment Red 81, C.I. Pigment Red 122, C.I. Pigment Red 144, C.I. Pigment Red 146, C.I. Pigment Red 149, C.I. Pigment Red 150, C.I. Pigment Red 166, C.I. Pigment Red 170, C.I. Pigment Red 174, C.I. Pigment Red 178, C.I. Pigment Red 179, C.I. Pigment Red 184, C.I. Pigment Red 185, C.I. Pigment Red 188, C.I. Pigment Red 190, C.I. Pigment Red 202, C.I. Pigment Red 207, C.I. Pigment Red 208, C.I. Pigment Red 209, C.I. Pigment Red 214, C.I. Pigment Red 220, C.I. Pigment Red 221, C.I. Pigment Red 224, C.I. Pigment Red 238, C.I. Pigment Red 242, C.I. Pigment Red 254, C.I. Pigment Red 255, C.I. Pigment Red 260, C.I. Pigment Red 264, C.I. Pigment Red 269, C.I. Pigment Red 272, C.I. Pigment Violet 19, and the like.

The magenta ink preferably contains the red pigment. Among these, C.I. Pigment Red 48:3, C.I. Pigment Red 57:1, C.I. Pigment Red 122, C.I. Pigment Red 146, C.I. Pigment Red 185, and C.I. Pigment Violet 19 are more preferable.

Examples of a yellow pigment include C.I. Pigment Yellow 12, C.I. Pigment Yellow 13, C.I. Pigment Yellow 14, C.I. Pigment Yellow 17, C.I. Pigment Yellow 83, C.I. Pigment Yellow 93, C.I. Pigment Yellow 95, C.I. Pigment Yellow 109, C.I. Pigment Yellow 110, C.I. Pigment Yellow 120, C.I. Pigment Yellow 138, C.I. Pigment Yellow 139, C.I. Pigment Yellow 151, C.I. Pigment Yellow 155, C.I. Pigment Yellow 174, C.I. Pigment Yellow 180, C.I. Pigment Yellow 185, C.I. Pigment yellow 234, and the like.

The yellow pigment may be contained in the case of being used as the yellow ink that configures the ink set of the present invention.

Examples of a purple pigment include C.I. Pigment Violet 23, C.I. Pigment Violet 32, C.I. Pigment violet 37, and the like.

Examples of a green pigment include C.I. Pigment Green 7 and the like.

Examples of an orange pigment include C.I. Pigment Orange 13, C.I. Pigment Orange 34, C.I. Pigment Orange 38, C.I. Pigment Orange 43, C.I. Pigment Orange 64, and the like.

Examples of the special ink include purple, grass, vermillion, and other inks other than cyan, magenta, and yellow inks, and the purple pigment, the green pigment, the orange pigment, and the like are preferably contained.

The ink set of the present invention preferably contains, for example, C.I. Pigment Blue 16 as the cyan ink and one or more of C.I. Pigment Violet 19 and C.I. Pigment Red 122 as the magenta ink. When the ink set contains the above-described pigments, it is possible to improve the environmental compatibility and safety and health of ink.

[Inorganic Pigment]

Examples of the inorganic pigment include white inorganic pigments such as titanium oxide, zinc oxide, zinc sulfide, barium sulfate, calcium carbonate, chromium oxide, silica, lithopone, antimony white, and gypsum; black inorganic pigments such as carbon black, iron black, and copper/chromium composite oxide; aluminum particles, mica, bronze powder, chrome vermillion, yellow lead, cadmium yellow, cadmium red, ultramarine, dark blue, red iron oxide, yellow iron oxide, zircon, and the like.

For black ink, carbon black is preferably used from the viewpoint of outstanding coloring power, hiding power, chemical resistance, and weather resistance, and examples thereof include C.I. Pigment Black 7 and the like. For white ink, titanium oxide is preferably used from the viewpoint of outstanding coloring power, hiding power, chemical resistance, and weather resistance. The titanium oxide is preferably titanium oxide that has been surface-treated with silica and/or alumina from the viewpoint of printing performance.

In each ink, the pigment can be used singly or two or more pigments can be jointly used in order to obtain an intended tone.

The average primary particle size of the pigment is preferably within a range of 10 to 200 nm and more preferably within a range of 50 to 150 nm.

The content of the pigment in the ink is preferably within a range of 1 to 60 mass % based on the mass of the ink and is preferably within a range of 10 to 90 mass % based on the mass of a non-volatile component of the ink in order to secure the density and coloring power of the ink.

<Gravure Printing Ink Set>

A gravure printing ink set of the present invention preferably contains the ink set.

[Polyurethane Resin]

A binder resin that is used in the gravure printing ink set of the present invention is preferably a polyurethane resin. The polyurethane resin contains a polyurethane urea resin.

Examples of the synthesis of the polyurethane resin include (1) a two-stage method in which a urethane prepolymer having an isocyanate group at a terminal that is obtained by reacting a polyol and a diisocyanate compound at fractions where the isocyanate group becomes excessive is synthesized, and then a chain extender and/or terminal-sequestering agent having an amino group is reacted with the urethane prepolymer having an isocyanate group in a solvent to synthesize the polyurethane resin, (2) a one-stage method in which polypropylene glycol, a polyol, a diisocyanate compound, and a chain extender and/or terminal-sequestering agent having an amino group are reacted in an appropriate solvent at once, and the like.

Examples of the solvent that is used in the synthesis include ester-based solvents such as ethyl acetate, propyl acetate, and butyl acetate; ketone-based solvents such as acetone, methyl ethyl ketone, and methyl isobutyl ketone; alcohol-based solvents such as methanol, ethanol, isopropyl alcohol, and n-butanol; hydrocarbon-based solvent such as methylcyclohexane and ethylcyclohexane; and solvent mixtures thereof.

Among these methods, the two-stage method is preferable from the viewpoint of obtaining a more uniform polyurethane resin. In a case where the polyurethane resin is manufactured by the two-stage method, the equivalent ratio (the mole of the isocyanate group/the mole of the amino group) between the isocyanate group in the urethane prepolymer and the amino group in the chain extender and terminal-sequestering agent is preferably 1/1.3 to 1/0.9. When the equivalent ratio between the isocyanate group and the amino group is 1/1.3 or more, the chain extender and/or terminal-sequestering agent remaining unreacted decreases, and it is possible to minimize the yellowing of the polyurethane resin and a bad smell after printing. When the equivalent ratio between the isocyanate group and the amino group is 1/0.9 or less, the molecular weight of the polyurethane resin to be obtained becomes appropriate, and it is possible to obtain a resin that brings a suitable film strength after printing.

The weight-average molecular weight of the polyurethane resin is preferably within a range of 15,000 to 100,000. When the weight-average molecular weight of the polyurethane resin is 15,000 or more, the blocking resistance of the ink, the strength of a printed coating, and the oil resistance are outstanding, and, when the weight-average molecular weight is 100,000 or less, the viscosity of ink to be obtained is in an appropriate range, and the gloss of the printed coating is outstanding.

In addition, the polyurethane resin preferably has an amine value from the viewpoint of printability and laminate strength. The amine value is preferably 0.5 to 20 mgKOH/g and more preferably 1 to 15 mgKOH/g.

The content of the binder resin in each color ink is preferably 4 to 25 mass % and more preferably within a range of 6 to 20 mass % in each ink.

[Organic Solvent]

Examples of an organic solvent that is used in the gravure printing ink set of the present invention include aromatic organic solvents such as toluene and xylene; ketone-based organic solvents such as acetone, methyl ethyl ketone and methyl isobutyl ketone; ester-based organic solvents such as ethyl acetate, n-propyl acetate, butyl acetate, and propylene glycol monomethyl ether acetate; alcohol-based organic solvents such as methanol, ethanol, n-propanol, isopropanol, and n-butanol; and glycol ether-based solvents such as ethylene glycol monopropyl ether and propylene glycol monomethyl ether. Two or more kinds of these organic solvents are preferably mixed and used.

In the gravure printing ink set, a solvent mixture of an ester-based organic solvent and an alcohol-based organic solvent is preferably used. The mass ratio (the mass of the ester-based organic solvent and the mass of the alcohol-based organic solvent) between the ester-based organic solvent and the alcohol-based organic solvent is preferably 95:5 to 40:60 and more preferably 90:10 to 50:50.

The content rate of the organic solvent in each color ink is preferably 60 to 90 mass % and more preferably within a range of 70 to 85 mass % based on the mass of the ink.

The viscosity of each color ink is preferably 10 mPa-s or higher from the viewpoint of preventing the sedimentation of the pigment and appropriately dispersing the pigment and is preferably 1,000 mPa-s or lower from the viewpoint of workability efficiency at the time of ink manufacturing or at the time of printing. The viscosity is a value measured at 25° C. with a B-type viscometer manufactured by Tokyo Keiki.

[Water]

The gravure printing ink set of the present invention may further contain water. When the gravure printing ink set contains a predetermined amount of water, the pigment dispersion characteristics by the polyurethane resin improve, and the printability, such as highlight-transferring properties, fogging properties, and trapping properties, improves.

The content rate of water is preferably 0.1 to 10 mass %, more preferably 0.5 to 7 mass %, still more preferably 0.5 to 5 mass %, and particularly preferably 0.5 to 4 mass % based on the mass of the gravure printing ink.

[Silica Particles]

The gravure printing ink set of the present invention may further contain silica particles. When the gravure printing ink set contains silica particles, the wetting and spreading of ink during overprint are accelerated, the trapping properties improve, and the highlight-transferring properties are also maintained.

Examples of the silica particles include natural silica particles, synthetic silica particles, crystalline silica particles, amorphous silica particles, hydrophobic silica particles, and hydrophilic silica particles. As a method for synthesizing the silica particles, there are a dry method and a wet method, a combustion method and an are method are known as the dry method, a sedimentation method and a gel method are known as the wet method, and the silica particles may be synthesized by any method. In addition, the silica particles may be hydrophilic silica having a hydrophilic functional group on the surface or hydrophobic silica hydrophobized by modifying the hydrophilic functional group with alkylsilane or the like. Hydrophilic silica is preferable.

Examples of such silica particles include NIPGEL Series and NIPSIL Series manufactured by Tosoh Silica Corporation and MIZUKASIL Series manufactured by Mizusawa Industrial Chemicals, Ltd.

The average particle size of the silica particles is preferably 1 to 10 μm in order to make unevenness on the surface of an ink layer. The average particle size is more preferably 1 to 8 μm and still more preferably 1 to 6 μm. The average particle size of the silica particles means the particle size at a cumulative value of 50% (D50) in the particle size distribution and can be obtained by the coulter counter method.

The specific surface area of the silica particles is preferably 50 to 600 $m^2/g$ by the BET method. The specific surface area is more preferably 100 to 450 $m^2/g$. As the silica particles that are used in the gravure printing ink of the present invention, two or more kinds of silica particles having different average particle sizes or BET method specific surface areas can be used in combination.

The content rate of the silica particles is preferably 0.1 to 3 mass %, more preferably 0.2 to 2.5 mass %, still more preferably 0.2 to 2 mass %, and particularly preferably 0.2 to 1.5 mass % based on the mass of the gravure printing ink.

[Other Additives]

The gravure printing ink set of the present invention may contain other additives such as an extender pigment, a pigment dispersant, a leveling agent, a defoamer, wax, a plasticizer, an infrared absorber, an ultraviolet absorber, an air freshener, and a flame retardant as necessary.

<Clear Ink>

The gravure printing ink set of the present invention may further contain clear ink. A desorption layer formed of the clear ink has a function of peeling from base materials by being neutralized in an alkali aqueous solution and dissolved or swollen.

Examples of a basic compound that is used in the alkali aqueous solution include sodium hydroxide (NaOH), potassium hydroxide (KOH), calcium hydroxide ($Ca(OH)_2$), ammonia, barium hydroxide ($Ba(OH)_2$), and sodium carbonate ($Na_2CO_3$). At least one selected from the group consisting of sodium hydroxide and potassium hydroxide is more preferable.

In the present specification, there are cases where a step of neutralizing the desorption layer in the alkali aqueous solution and dissolving or swelling the desorption layer is referred to as "alkali treatment". In addition, there are cases where a layer having desorption properties by the alkali treatment is referred to as "desorption layer". That is, a printed layer that is formed of the clear ink corresponds to the layer having desorption properties (desorption layer).

[Carboxy Group-Containing Resin]

The clear ink preferably contains a carboxy group-containing resin. The clear ink functions as, for example, a primer composition that is printed on base materials earlier than color ink.

Examples of the carboxy group-containing resin include an acrylic resin, a urethane resin, a polyester resin, an amino resin, a phenolic resin, an epoxy resin, and cellulose. Among these, a urethane resin is preferable since the suitability for lamination is favorable.

The hydroxyl value of the carboxy group-containing urethane resin is preferably 1 to 35 mgKOH/g and more preferably 10 to 30 mgKOH/g. When the hydroxyl value is 1 mgKOH/g or more, the desorption properties by the alkali aqueous solution become favorable, which is preferable, and, when the hydroxyl value is 35 mgKOH/g or less, the base material adhesion becomes favorable, which is preferable.

The acid value of the carboxy group-containing urethane resin is preferably 15 mgKOH/g or more, more preferably 15 to 70 mgKOH/g, and still more preferably 20 to 50 mgKOH/g. When the acid value is 15 mgKOH/g or more, the desorption properties by the alkali aqueous solution become favorable, which is preferable, and, when the acid value is 70 mgKOH/g or less, the base material adhesion improves, and the retort resistance when the carboxy group-containing urethane resin is made into packaging materials becomes favorable. The hydroxyl value and the acid value are both values measured according to JIS K 0070.

The weight-average molecular weight of the carboxy group-containing urethane resin is preferably 10,000 to 100,000, more preferably 15,000 to 70,000, and still more preferably 15,000 to 50,000.

The molecular weight distribution (Mw/Mn) of the carboxy group-containing urethane resin is preferably 6 or less. In a case where the molecular weight distribution is 6 or less, it is possible to avoid influences attributed to excessive high-molecular-weight component, unreacted component, side reaction component, and other low-molecular-weight component, and the desorption properties and the drying properties and retort resistance of the primer composition become favorable.

In addition, as the molecular weight distribution is smaller, that is, the molecular weight distribution is sharper, the dissolution and peeling action by the alkali aqueous solution occurs more uniformly, and the desorption properties further improve, which is preferable. The molecular weight distribution is more preferably 5 or less and still more preferably 4 or less. In addition, the molecular weight distribution is preferably 1.5 or more and more preferably 1.2 or more.

The carboxy group-containing urethane resin may have an amine value. In a case where the carboxy group-containing urethane resin has an amine value, the amine value is preferably 0.1 to 20 mgKOH/g and more preferably 1 to 10 mgKOH/g.

The carboxy group-containing urethane resin is not particularly limited and is preferably, for example, a resin formed by reacting a polyol, hydroxy acid, and a polyisocyanate. The use of hydroxy acid makes it possible to impart an acid value to the urethane resin and makes it possible to improve the desorption properties. The carboxy group-containing urethane resin is more preferably a resin formed by further reacting a polyamine with the resin formed by reacting a polyol, hydroxy acid, and a polyisocyanate.

The clear ink may further contain a polyisocyanate as a curing component. The polyisocyanate is not particularly limited and can be selected from well-known conventional polyisocyanates, and examples thereof include aliphatic polyisocyanates and aromatic-aliphatic polyisocyanates.

In addition, the clear ink may contain a different component other than the carboxy group-containing resin and the polyisocyanate, and, similar to each color ink described above such as cyan, yellow, and magenta, an additive such as an organic solvent or an anti-blocking agent can be blended with the clear ink.

<Inkjet Ink Set>

An inkjet ink set of the present invention preferably contains the ink set. Inkjet ink that configures the inkjet ink set of the present invention is as described above.

<Printed Article>

A printed article of the present invention includes a printed layer formed of a base material and a gravure printing ink set. The printed layer is formed by printing cyan ink, yellow ink, and magenta ink on the base material.

A method for gravure printing is not particularly limited and can be appropriately selected from well-known methods. The method for gravure printing is roughly classified into surface printing and reverse printing, and, for example, in a case where a base material is white paper or a white film in surface printing, a printed article can be obtained by performing printing on the base material in the order of yellow ink, magenta ink, cyan ink, and black ink.

In addition, for example, in a case where a base material is a transparent film in reverse printing, a printed article is preferably produced by performing printing on the base material in the order of black ink, cyan ink, magenta ink, yellow ink, and white ink.

In a case where the ink set of the present invention contains the clear ink, the clear ink is preferably printed on the base material earlier than color ink.

The thickness of the printed layer can be appropriately selected depending on the use, the kind and number of ink to be used, and the number of times of overprint and is normally within a range of 0.5 to 10 μm.

[Base Material]

Examples of the base material include polyolefin base materials such as polyethylene and polypropylene; polycarbonate base materials; polyester base materials such as polyethylene terephthalate and polylactic acid; polystyrene base materials; polystyrene-based resins such as AS and ABS; polyamide base materials such as nylon; polyvinyl chloride base materials; cellophane base materials; paper base materials; aluminum foil base materials; and composite base materials composed of a composite material thereof. The base material may be any of a film-like base material or a sheet-like base material. Among these, a polyester base material and a polyamide base material, which have a high glass transition temperature, are suitably used.

A metal oxide or the like may be deposited on the surface of the base material or the surface of the base material may be coated with polyvinyl alcohol or the like. Examples of such a surface-treated base material include GL-AE manufactured by Toppan Inc. and IB-PET-PXB manufactured by Dai Nippon Printing Co., Ltd., in which aluminum oxide is deposited on the surface. The base material may be treated with an additive such as an antistatic agent or an ultraviolet inhibitor as necessary, and a corona treatment or a low-temperature plasma treatment may be performed on the base material.

[Desorption Layer]

The printed article of the present invention may include a desorption layer. Here, the "desorption layer" refers to a layer having a property of peeling from the base material by being neutralized in an alkali aqueous solution and dissolved or swollen. The layer having desorption properties is preferably a layer that is formed of the clear ink, but the desorption layer may be a different layer.

The thickness of the desorption layer is not particularly limited and is normally within a range of 0.5 to 5 μm.

<Packaging Material>

A packaging material of the present invention contains a printed article in at least a part thereof. Examples of the packaging material include a configuration in which the printed article, an adhesive layer, and a sealant base material are sequentially laminated. The packaging material can be suitably used for four-side seal packages, three-side seal packages, pillow packages, stick bags, gusset bags, square bottom bags, standing pouches, deep draw containers, vacuum packages, skin packs, zipper bags, spout pouches, twist packaging, wrap packaging, shrink packaging, and packages having a variety of shapes such as labels, liquid paper packs, and paper trays.

Examples of articles to be packed by the packaging material include foodstuffs (for example, rice, sweets, seasoning products, edible oils and fats, cooked foods, and the like), beverages (for example, alcoholic beverages, soft drinks, mineral water, and the like), life and cultural goods (for example, pharmaceuticals, cosmetic products, stationery, and the like), electronic components, and the like.

[Adhesive Layer]

Examples of adhesive components that can be used to form the adhesive layer include not only laminating adhesives and hot melt adhesives but also thermoplastic resins. Among the adhesive components, examples of the laminating adhesives and the hot melt adhesives include polyether-based adhesives; polyurethane-based adhesives; epoxy-based adhesives; polyvinyl acetate-based adhesives; cellulose-based adhesives; and (meth)acrylic adhesive. Among these adhesive components, a polyurethane-based adhesive is preferably used.

The adhesive component can be used singly or two or more kinds of adhesive components can be jointly used.

The polyurethane-based adhesive is a reactive adhesive containing a polyol and a polyisocyanate and may have desorption properties. Examples of polyurethane adhesives having desorption properties include laminating adhesives described in Japanese Patent Laid-Open No. 2020-084130.

Such polyurethane adhesives having desorption properties preferably have an acid value of 5 to 45 mgKOH/g. In addition, it is preferable that the polyol that configures the polyurethane-based adhesive contains a polyester polyol and the polyisocyanate contains one selected from the group consisting of aliphatic polyisocyanates and aromatic-aliphatic polyisocyanates.

The thickness of the adhesive layer is normally within a range of 1 to 6 μm.

[Sealant Base Material]

The sealant base material is a base material that configures the innermost layer of a laminated film, and a resin material that becomes fusible to each other by heat (having heat-sealing properties) is used. Examples of the sealant base material include unstretched polypropylene (CPP), a vapor-deposited unstretched polypropylene film (VMCPP), low density polyethylene (LDPE), linear low density polyethylene (LLDPE), an ethylene vinyl acetate copolymer (EVA), and the like.

The thickness of the sealant base material is not particularly limited, but is preferably within a range of 10 to 200 μm and more preferably within a range of 15 to 150 μm in consideration of workability into packaging materials, heat-sealing properties, or the like. In addition, when the sealant base material is provided with unevenness with a difference in elevation of 5 to 20 μm, it is possible to impart slipperiness or the tearability of packaging materials to the sealant base material.

In addition, a method for laminating the sealant base material is not particularly limited. Examples thereof include a method in which the adhesive layer and a sealant base material film are laminated by heat (heat lamination or dry lamination), a method in which a sealant base material resin is laminated by being melted, extruded onto the adhesive layer, cooled and solidified (extrusion lamination method), and the like.

EXAMPLES

Hereinafter, the present invention will be described in detail using examples, but the present invention is not limited to the examples. "Parts" means "parts by mass", and "%" means "mass %".

<Manufacturing of Isoindoline Compound>

Example 1-1

800 Parts of water, 60 parts of 1,3-diiminoisoindoline, and 120 parts of 28% ammonia water were sequentially added to a four-neck flask equipped with a reflux condense tube, a dropping funnel, and a stirrer and stirred. A solution containing 42.58 parts of 2-cyano-N-methylacetamide dissolved in 160 parts of water was added dropwise thereto using the dropping funnel for 30 minutes. The components were heated and stirred at 30° C. until 1,3-diiminoisoindoline, which was a raw material, disappeared. This reaction slurry was filtered using a Buchner funnel, thereby obtaining a non-volatile component. The disappearance of the raw material was confirmed by ultra-performance liquid chromatography (UPLC manufactured by Waters Corporation)

Equivalent to 60 parts of the non-volatile component, 480 parts of water, and 162 parts of 80% acetic acid were added to the four-neck flask equipped with a reflux condense tube, a dropping funnel, and a stirrer and stirred. Incidentally, 461 parts of water and 194 parts of 80% acetic acid were added to a glass flask, and 36.69 parts of barbituric acid and 4.97 parts of 1,3-dimethylbarbituric acid were added thereto and stirred at 65° C. A heated solution of this mixture was injected into a stirred liquid of the non-volatile component, and, furthermore, the liquid mixture was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2400 parts of water three times, thereby obtaining a non-volatile component. This non-volatile component was dried at 80° C. with a hot air dryer, and 87.50 parts of isoindoline compound 1-1 was obtained.

Example 1-2

Reaction operations were all performed in the same manner as in Example 1-1 except that 36.69 parts of barbituric acid was changed to 40.36 parts and 4.97 parts of 1,3-dimethylbarbituric acid was changed to 0.50 parts in Example 1-1, and 86.40 parts of isoindoline compound 1-2 was obtained.

Example 1-3

Reaction operations were all performed in the same manner as in Example 1-1 except that 36.69 parts of barbituric acid was changed to 28.54 parts and 4.97 parts of 1,3-dimethylbarbituric acid was changed to 14.91 parts in Example 1-1, and 88.30 parts of isoindoline compound 1-3 was obtained.

Example 1-4

800 Parts of water, 60 parts of 1,3-diiminoisoindoline, and 120 parts of 28% ammonia water were sequentially added to a four-neck flask equipped with a reflux condense tube, a dropping funnel, and a stirrer and stirred. A solution containing 42.58 parts of 2-cyano-N-methylacetamide dissolved in 160 parts of water was added dropwise thereto using the dropping funnel for 30 minutes. The components were heated and stirred at 30° C. until 1,3-diiminoisoindoline, which was a raw material, disappeared. This reaction slurry was filtered using a Buchner funnel, thereby obtaining a non-volatile component. The disappearance of the raw material was confirmed by UPLC. Equivalent to 60 parts of the non-volatile component obtained by the previous preparation as a raw material, 480 parts of water, and 162 parts of 80% acetic acid were added to the four-neck flask equipped with a reflux condense tube, a dropping funnel, and a stirrer and stirred. Incidentally, 480 parts of water and 162 parts of 80% acetic acid were added to a glass flask, and 30.57 parts of barbituric acid was added thereto and stirred at 65° C. A heated solution of this mixture was injected into a stirred liquid of the non-volatile component and stirred at 30° C. for three hours. Furthermore, 48 parts of water and 16 parts of 80% acetic acid were added to a glass flask prepared separately, and 8.28 parts of 1,3-dimethylbarbituric acid was added thereto and stirred at 65° C. A heated solution of this mixture was injected into the previous reaction stirred liquid, and, furthermore, the liquid mixture was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2400 parts of water three times, thereby obtaining a non-volatile component. This non-volatile component was dried at 80° C. with a hot air dryer, and 86.10 parts of isoindoline compound 1-4 was obtained.

Example 1-5

800 Parts of water, 60 parts of 1,3-diiminoisoindoline, and 120 parts of 28% ammonia water were sequentially added to a four-neck flask equipped with a reflux condense tube, a dropping funnel, and a stirrer and stirred. A solution containing 42.58 parts of 2-cyano-N-methylacetamide dissolved in 160 parts of water was added dropwise thereto using the dropping funnel for 30 minutes. The components were heated and stirred at 30° C. until 1,3-diiminoisoindoline, which was a raw material, disappeared. This reaction slurry was filtered using a Buchner funnel, thereby obtaining a non-volatile component. The disappearance of the raw material was confirmed by UPLC.

Equivalent to 60 parts of the non-volatile component obtained by the previous preparation as a raw material, 480 parts of water, and 162 parts of 80% acetic acid were added to the four-neck flask equipped with a reflux condense tube, a dropping funnel, and a stirrer and stirred. Incidentally, 326 parts of water and 138 parts of 80% acetic acid were added to a glass flask, and 27.18 parts of barbituric acid and 2.07 parts of 1,3-dimethylbarbituric acid were added thereto and stirred at 65° C. A heated solution of this mixture was injected into a stirred liquid of the non-volatile component and stirred at 30° C. for three hours. Furthermore, 134 parts of water and 57 parts of 80% acetic acid were added to a glass flask prepared separately, and 14.49 parts of 1,3-dimethylbarbituric acid was added thereto and stirred at 65° C. A heated solution of this mixture was injected into the previous reaction stirred liquid, and, furthermore, the liquid mixture was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2400 parts of water three times, thereby obtaining a non-volatile component. This non-volatile component was dried at 80° C. with a hot air dryer, and 88.10 parts of isoindoline compound 1-5 was obtained.

Example 1-6

Reaction operations were all performed in the same manner as in Example 1-4 except that 8.28 parts of 1,3-dimethylbarbituric acid in Example 1-4 was changed to 9.77 parts of 1,3-diethylbarbituric acid, and 86.60 parts of isoindoline compound 1-6 was obtained.

Example 1-7

Reaction operations were all performed in the same manner as in Example 1-1 except that 36.69 parts of barbituric acid was changed to 38.73 parts and 4.97 parts of 1,3-dimethylbarbituric acid was changed to 4.65 parts of 1,3-dicyclohexylbarbituric acid in Example 1-1, and 89.60 parts of isoindoline compound 1-7 was obtained.

Manufacturing Example 1-1

Reaction operations were all performed in the same manner as in Example 1-1 except that 36.69 parts of barbituric acid and 4.97 parts of 1,3-dimethylbarbituric acid were changed to 40.77 parts of barbituric acid in Example 1-1, and 85.80 parts of isoindoline compound 1-8 was obtained.

Manufacturing Example 1-2

Reaction operations were all performed in the same manner as in Example 1-1 except that 36.69 parts of barbituric acid and 4.97 parts of 1,3-dimethylbarbituric acid was changed to 49.69 parts of 1,3-dimethylbarbituric acid in Example 1-1, and 94.20 parts of isoindoline compound 1-9 was obtained.

Structures that were included in the isoindoline compounds obtained in Examples 1-1 to 1-7 and Manufacturing Examples 1-1 and 1-2 are shown in Table 1. In the table, (1) indicates isoindoline compound (1) and (2) indicates isoindoline compound (2). In the table, H indicates hydrogen, Me indicates a methyl group, Et indicates an ethyl group, and CH indicates a cyclohexyl group.

TABLE 1

| | | (1) | | | | | | | | | |
|---|---|---|---|---|---|---|---|---|---|---|---|
| | Isoindoline compound | $R_1$, $R_4$ | | $R_2$, $R_3$ | | $R_7$ | X | Theoretical molecular weight | Measurement value | Content |
| Example 1-1 | (1-1) | H | H | H | H | Me | NH | 337 | 336 | 90% |
| Example 1-2 | (1-2) | H | H | H | H | Me | NH | 337 | 336 | 99% |
| Example 1-3 | (1-3) | H | H | H | H | Me | NH | 337 | 336 | 70% |
| Example 1-4 | (1-4) | H | H | H | H | Me | NH | 337 | 336 | 90% |
| Example 1-5 | (1-5) | H | H | H | H | Me | NH | 337 | 336 | 80% |
| Example 1-6 | (1-6) | H | H | H | H | Me | NH | 337 | 336 | 90% |
| Example 1-7 | (1-7) | H | H | H | H | Me | NH | 337 | 336 | 95% |
| Manufacturing Example 1-1 | (1-8) | — | — | — | — | — | — | — | — | — |
| Manufacturing Example 1-2 | (1-9) | — | — | — | — | — | — | — | — | — |

| | (2) | | | | | | | | | | |
|---|---|---|---|---|---|---|---|---|---|---|---|
| | $R_1$, $R_4$ | | $R_2$, $R_3$ | | $R_5$, $R_6$ | | $R_7$ | X | Theoretical molecular weight | Measurement value | Content |
| Example 1-1 | H | H | H | H | Me | Me | Me | NH | 365 | 364 | 10% |
| Example 1-2 | H | H | H | H | Me | Me | Me | NH | 365 | 364 | 1% |

TABLE 1-continued

| | | | | | | | | | | | |
|---|---|---|---|---|---|---|---|---|---|---|---|
| Example 1-3 | H | H | H | H | Me | Me | Me | NH | 365 | 364 | 30% |
| Example 1-4 | H | H | H | H | Me | Me | Me | NH | 365 | 364 | 10% |
| Example 1-5 | H | H | H | H | Me | Me | Me | NH | 365 | 364 | 20% |
| Example 1-6 | H | H | H | H | Et | Et | Me | NH | 393 | 392 | 10% |
| Example 1-7 | H | H | H | H | CH | CH | Me | NH | 637 | 636 | 5% |
| Manufacturing Example 1-1 | H | H | H | H | H | H | Me | NH | 337 | 336 | 100% |
| Manufacturing Example 1-2 | H | H | H | H | Me | Me | Me | NH | 365 | 364 | 100% |

The obtained isoindoline compounds were identified by comparing the molecular ion peak in the mass spectrum and the mass number (theoretical value) that was obtained by calculation. The molecular ion peak in the mass spectrum was measured using ACQUITY UPLS H-Class (column used: ACQUITY UPLC BEH C18 Column 130 Å, 1.7 μm, 2.1 mm×50 mm)/Ms TAP XEVO TQD manufactured by Waters Corporation. For the isoindoline compounds (Examples 1-1 to 1-7 and Manufacturing Examples 1-1 and 1-2), the theoretical molecular weights and the measurement values for which the masses were analyzed, respectively, are shown in Table 1. Due to the properties of the measurement, H (proton) of the compound is desorbed, and thus, when the measurement value is a value of the mass number of the theoretical molecular weight −1, the compound is considered to match.

Example 2-1

800 parts of water and 800 parts of 80% acetic acid were added to the four-neck flask equipped with a reflux condense tube, a dropping funnel, and a stirrer and stirred. 83.39 Parts of barbituric acid and 11.29 parts of 1,3-dimethylbarbituric acid were added thereto and stirred at 65° C., and barbituric acid and 1,3-dimethylbarbituric acid were dissolved. Incidentally, 800 parts of water and 50.00 parts of 1,3-diiminoisoindoline were added to a glass flask and stirred at 30° C. This stirred liquid was injected into the heated solution, and, furthermore, the stirred liquid was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2000 parts of water three times, thereby obtaining a non-volatile component. This non-volatile component was dried at 80° C. with a hot air dryer, and 124.90 parts of isoindoline compound 2-1 was obtained.

Example 2-2

800 parts of water and 800 parts of 80% acetic acid were added to the four-neck flask equipped with a reflux condense tube, a dropping funnel, and a stirrer and stirred. 83.39 Parts of barbituric acid was added thereto and stirred at 65° C., and barbituric acid was dissolved. Incidentally, 720 parts of water and 45.00 parts of 1,3-diiminoisoindoline were added to a glass flask and stirred at 30° C. This stirred solution was injected into the heated solution and stirred for one hour. 11.29 Parts of 1,3-dimethylbarbituric acid was added to this reaction solution. Incidentally, 80 parts of water and 5.00 parts of 1,3-diiminoisoindoline were added to a glass flask and stirred at 30° C. This stirred liquid was injected into the reaction solution, and, furthermore, the stirred liquid was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2000 parts of water three times, thereby obtaining a non-volatile component. This non-volatile component was dried at 80° C. with a hot air dryer, and 123.00 parts of isoindoline compound 2-2 was obtained.

Manufacturing Example 2-1

Reaction operations were all performed in the same manner as in Example 2-1 except that 83.39 parts of barbituric acid and 11.29 parts of 1,3-dimethylbarbituric acid were changed to 92.65 parts of barbituric acid in Example 2-1, and 122.90 parts of isoindoline compound 2-3 was obtained.

Manufacturing Example 2-2

Reaction operations were all performed in the same manner as in Example 2-1 except that 83.39 parts of barbituric acid and 11.29 parts of 1,3-dimethylbarbituric acid were changed to 112.94 parts of 1,3-dimethylbarbituric acid in Example 2-1, and 141.10 parts of isoindoline compound 2-4 was obtained.

The structures of the isoindoline compounds obtained in Examples 2-1 and 2-2 and Manufacturing Examples 2-1 and 2-2 are shown in Table 2.

The obtained isoindoline compounds were identified in the same manner as described above by comparing the molecular ion peak in the mass spectrum and the mass number (theoretical value) that was obtained by calculation.

TABLE 2

| | | (1) | | | | | | | | |
|---|---|---|---|---|---|---|---|---|---|---|
| | Isoindoline compound | $R_1$, $R_4$ | | $R_2$, $R_3$ | | $R_8$, $R_9$ | | Theoretical molecular weight | Measurement value | Content |
| Example 2-1 | (2-1) | H | H | H | H | H | H | 367 | 366 | 90% |
| Example 2-2 | (2-2) | H | H | H | H | H | H | 367 | 366 | 90% |

TABLE 2-continued

| | | | | | | | | | | |
|---|---|---|---|---|---|---|---|---|---|---|
| Manufacturing Example 2-1 | (2-3) | — | — | — | — | — | — | — | — | — |
| Manufacturing Example 2-2 | (2-4) | — | — | — | — | — | — | — | — | — |

| | (2) | | | | | | | | | | |
|---|---|---|---|---|---|---|---|---|---|---|---|
| | $R_1$, $R_4$ | | $R_2$, $R_3$ | | $R_5$, $R_6$ | | $R_8$, $R_9$ | | Theoretical molecular weight | Measurement value | Content |
| Example 2-1 | H | H | H | H | Me | Me | Me | Me | 423 | 422 | 10% |
| | H | H | H | H | Me | Me | H | H | 395 | 394 | |
| Example 2-2 | H | H | H | H | Me | Me | Me | Me | 423 | 422 | 10% |
| Manufacturing Example 2-1 | H | H | H | H | H | H | H | H | 367 | 366 | 100% |
| Manufacturing Example 2-2 | H | H | H | H | Me | Me | Me | Me | 423 | 422 | 100% |

Example 3-1

800 Parts of water, 60 parts of 1,3-diiminoisoindoline, and 120 parts of 28% ammonia water were sequentially added to a four-neck flask equipped with a reflux condense tube, a dropping funnel, and a stirrer and stirred. A solution containing 80.37 parts of 2-(4-oxo-3,4-dihydroquinazoline-2-yl)acetonitrile dissolved in 160 parts of water was added dropwise thereto using the dropping funnel for 30 minutes. The components were heated and stirred at 30° C. until 1,3-diiminoisoindoline, which was a raw material, disappeared. This reaction slurry was filtered using a Buchner funnel, thereby obtaining a non-volatile component. The disappearance of the raw material was confirmed by UPLC.

Equivalent to 60 parts of the non-volatile component obtained by the previous preparation as a raw material, 480 parts of water, and 162 parts of 80% acetic acid were added to the four-neck flask equipped with a reflux condense tube, a dropping funnel, and a stirrer and stirred. Incidentally, 461 parts of water and 194 parts of 80% acetic acid were added to a glass flask, and 26.49 parts of barbituric acid and 3.59 parts of 1,3-dimethylbarbituric acid were added thereto and stirred at 65° C. A heated solution of this mixture was injected into a stirred liquid of the non-volatile component, and, furthermore, the liquid mixture was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2400 parts of water three times, thereby obtaining a non-volatile component. This non-volatile component was dried at 80° C. with a hot air dryer, and 73.50 parts of isoindoline compound 3-1 was obtained.

Example 3-2

800 Parts of water, 60 parts of 1,3-diiminoisoindoline, and 120 parts of 28% ammonia water were sequentially added to a four-neck flask equipped with a reflux condense tube, a dropping funnel, and a stirrer and stirred. A solution containing 80.38 parts of 2-(4-oxo-3,4-dihydroquinazoline-2-yl)acetonitrile dissolved in 160 parts of water was added dropwise thereto using the dropping funnel for 30 minutes. The components were heated and stirred at 30° C. until 1,3-diiminoisoindoline, which was a raw material, disappeared. This reaction slurry was filtered using a Buchner funnel, thereby obtaining a non-volatile component. The disappearance of the raw material was confirmed by UPLC.

Equivalent to 60 parts of the non-volatile component obtained by the previous preparation as a raw material, 480 parts of water, and 162 parts of 80% acetic acid were added to the four-neck flask equipped with a reflux condense tube, a dropping funnel, and a stirrer and stirred. Incidentally, 480 parts of water and 162 parts of 80% acetic acid were added to a glass flask, and 22.08 parts of barbituric acid was added thereto and stirred at 65° C. A heated solution of this mixture was injected into a stirred liquid of the non-volatile component and stirred at 30° C. for three hours. Furthermore, 48 parts of water and 16 parts of 80% acetic acid were added to a glass flask prepared separately, and 5.98 parts of 1,3-dimethylbarbituric acid was added thereto and stirred at 65° C. A heated solution of this mixture was injected into the previous reaction stirred liquid, and, furthermore, the liquid mixture was heated up to 85° C. and stirred in order to complete a reaction. The heating and stirring were performed until the non-volatile component used as a raw material disappeared. The disappearance of the raw material was confirmed by UPLC.

After that, the liquid mixture was cooled to room temperature and then washed with 2400 parts of water three times, thereby obtaining a non-volatile component. This non-volatile component was dried at 80° C. with a hot air dryer, and 74.10 parts of isoindoline compound 3-2 was obtained.

Manufacturing Example 3-1

Reaction operations were all performed in the same manner as in Example 3-1 except that 26.49 parts of barbituric acid and 3.59 parts of 1,3-dimethylbarbituric acid were changed to 29.44 parts of barbituric acid in Example 3-1, and 75.20 parts of isoindoline compound 3-3 was obtained.

Manufacturing Example 3-2

Reaction operations were all performed in the same manner as in Example 3-1 except that 26.49 parts of barbituric acid and 3.59 parts of 1,3-dimethylbarbituric acid were changed to 35.88 parts of 1,3-dimethylbarbituric acid in Example 3-1, and 79.70 parts of isoindoline compound 3-4 was obtained.

The structures of the isoindoline compounds obtained in Examples 3-1 and 3-2 and Manufacturing Examples 3-1 and 3-2 are shown in Table 3.

The obtained isoindoline compounds were identified in the same manner as described above by comparing the molecular ion peak in the mass spectrum and the mass number (theoretical value) that was obtained by calculation.

TABLE 3

| | | (1) | | | | | | | | | | | |
|---|---|---|---|---|---|---|---|---|---|---|---|---|---|
| | Isoindoline compound | $R_1$, $R_4$ | | $R_2$, $R_3$ | | $R_{10}$ | $R_{11}$ | $R_{12}$ | $R_{13}$ | $R_{14}$ | Theoretical molecular weight | Measurement value | Content |
| Example 3-1 | (3-1) | H | H | H | H | H | H | H | H | H | 424 | 423 | 90% |
| Example 3-2 | (3-2) | H | H | H | H | H | H | H | H | H | 424 | 423 | 90% |
| Manufacturing Example 3-1 | (3-3) | — | — | — | — | — | — | — | — | — | — | — | — |
| Manufacturing Example 3-2 | (3-4) | — | — | — | — | — | — | — | — | — | — | — | — |

| | (2) | | | | | | | | | | | | | |
|---|---|---|---|---|---|---|---|---|---|---|---|---|---|---|
| | $R_1$, $R_4$ | | $R_2$, $R_3$ | | $R_5$, $R_6$ | | $R_{10}$ | $R_{11}$ | $R_{12}$ | $R_{13}$ | $R_{14}$ | Theoretical molecular weight | Measurement value | Content |
| Example 3-1 | H | H | H | H | Me | Me | H | H | H | H | H | 452 | 451 | 10% |
| Example 3-2 | H | H | H | H | Me | Me | H | H | H | H | H | 452 | 451 | 10% |
| Manufacturing Example 3-1 | H | H | H | H | H | H | H | H | H | H | H | 424 | 423 | 100% |
| Manufacturing Example 3-2 | H | H | H | H | Me | Me | H | H | H | H | H | 452 | 451 | 100% |

Example 1-8

90 Parts of the isoindoline compound obtained in Manufacturing Example 1-1 (1-8), 10 parts of the isoindoline compound obtained in Manufacturing Example 1-2 (1-9), 1000 parts of sodium chloride, and 150 parts of diethylene glycol were charged into a one-gallon stainless steel kneader (manufactured by Inoue MGF., Inc.) and kneaded at 60° C. for eight hours (h). Next, the kneaded mixture was injected into warm water of approximately 70° C. and stirred for one hour to produce a slurry, the slurry was filtered and washed with water to remove salt and diethylene glycol, then, dried at 80° C. all day and night, and pulverized, thereby obtaining 95.5 parts of refined isoindoline compound (1-10).

Example 1-9

100 Parts of isoindoline compound obtained in Example 1-3 (1-3), 500 parts of sodium chloride, and 150 parts of diethylene glycol were charged into a one-gallon stainless steel kneader (manufactured by Inoue MGF., Inc.) and kneaded at 75° C. for six hours (h). Next, the kneaded mixture was injected into warm water of approximately 70° C. and stirred for one hour to produce a slurry, the slurry was filtered and washed with water to remove salt and diethylene glycol, then, dried at 80° C. all day and night, and pulverized, thereby obtaining 96.2 parts of refined isoindoline compound (1-11).

Example 1-10

95 Parts of the isoindoline compound obtained in Manufacturing Example 1-1 (1-8), 5 parts of the isoindoline compound obtained in Manufacturing Example 2-2 (2-4), 1000 parts of sodium chloride, and 150 parts of diethylene glycol were charged into a one-gallon stainless steel kneader (manufactured by Inoue MGF., Inc.) and kneaded at 60° C. for eight hours (h). Next, the kneaded mixture was injected into warm water of approximately 70° C. and stirred for one hour to produce a slurry, the slurry was filtered and washed with water to remove salt and diethylene glycol, then, dried at 80° C. all day and night, and pulverized, thereby obtaining 96.0 parts of refined isoindoline compound (1-12).

Example 1-11

37.0 Parts of isoindoline compound obtained in Manufacturing Example 1-1 (1-8) and 3.0 parts of isoindoline compound obtained in Manufacturing Example 1-2 (1-9) were slowly added under stirring to 1000 parts of 98% sulfuric acid and stirred and dissolved for four hours. Next, the solution was slowly added dropwise to 8000 parts of water of 10° C. for 30 minutes under stirring, filtered, washed with warm water, and dried at 80° C., thereby obtaining 38.5 parts of refined isoindoline compound (1-13).

Example 2-3

95 Parts of the isoindoline compound obtained in Manufacturing Example 2-1 (2-3), 5 parts of the isoindoline compound obtained in Manufacturing Example 2-2 (2-4), 1000 parts of sodium chloride, and 150 parts of diethylene glycol were charged into a one-gallon stainless steel kneader (manufactured by Inoue MGF., Inc.) and kneaded at 60° C. for eight hours (h). Next, the kneaded mixture was injected into warm water of approximately 70° C. and stirred for one hour to produce a slurry, the slurry was filtered and washed with water to remove salt and diethylene glycol, then, dried at 80° C. all day and night, and pulverized, thereby obtaining 96.7 parts of refined isoindoline compound (2-5).

Example 3-3

90 Parts of the isoindoline compound obtained in Manufacturing Example 3-1 (3-3), 10 parts of the isoindoline compound obtained in Manufacturing Example 3-2 (3-4), 1000 parts of sodium chloride, and 150 parts of diethylene glycol were charged into a one-gallon stainless steel kneader (manufactured by Inoue MGF., Inc.) and kneaded at 60° C. for eight hours (h). Next, the kneaded mixture was injected into warm water of approximately 70° C. and stirred for one hour to produce a slurry, the slurry was filtered and washed with water to remove salt and diethylene glycol, then, dried at 80° C. all day and night, and pulverized, thereby obtaining 94.7 parts of refined isoindoline compound (3-5).

Figure 2:
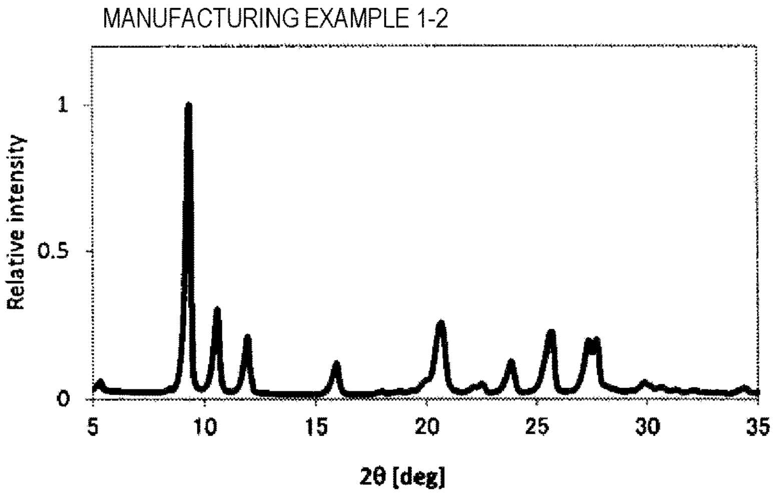
FIG. 2 is an X-ray diffraction spectrum of an isoindoline compound obtained in Manufacturing Example 1-2.
Figure 3:
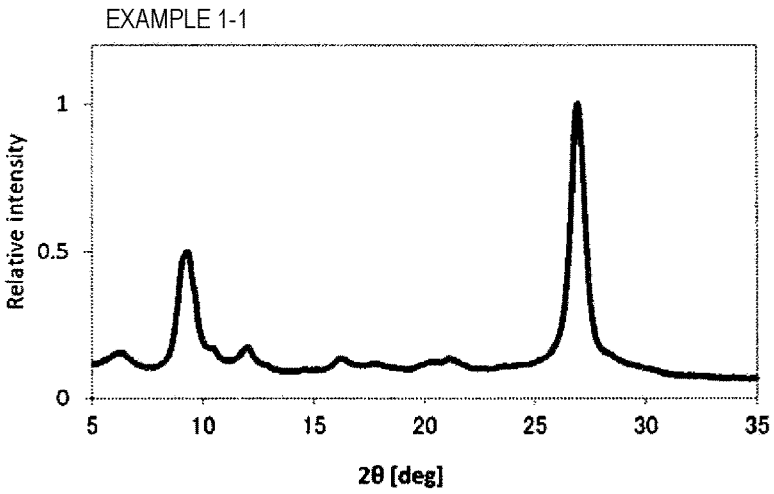
FIG. 3 is an X-ray diffraction spectrum of an isoindoline compound obtained in Example 1-3.
Figure 4:
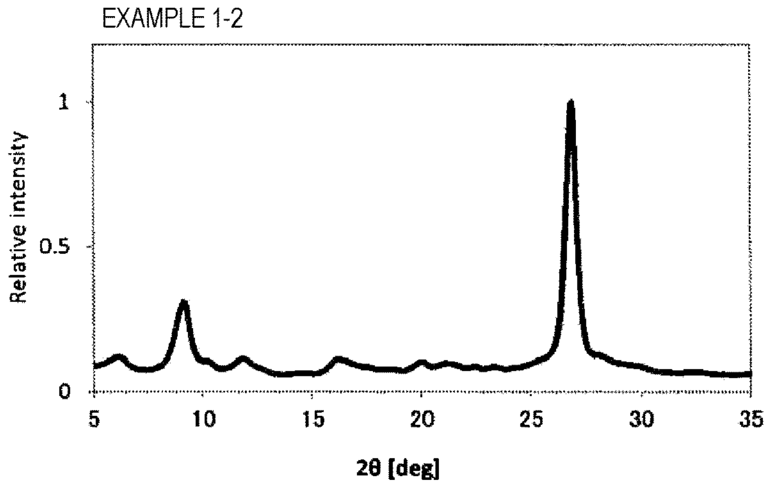
FIG. 4 is an X-ray diffraction spectrum of an isoindoline compound obtained in Example 1-2.
Figure 5:
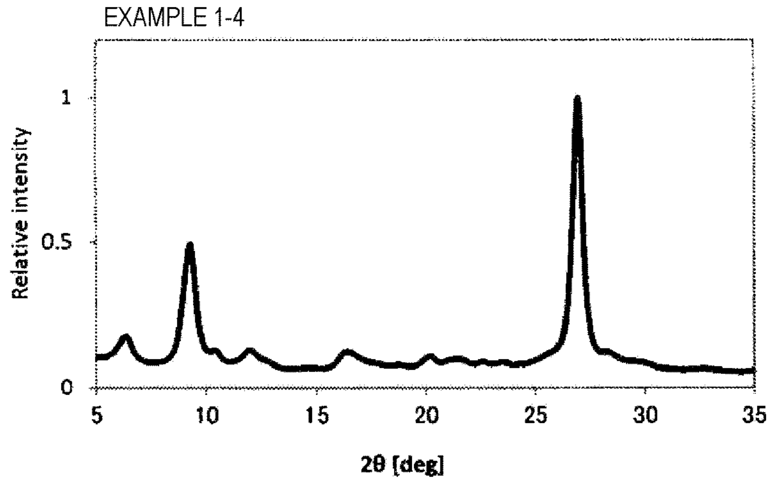
FIG. 5 is an X-ray diffraction spectrum of an isoindoline compound obtained in Example 1-4.
Figure 6:
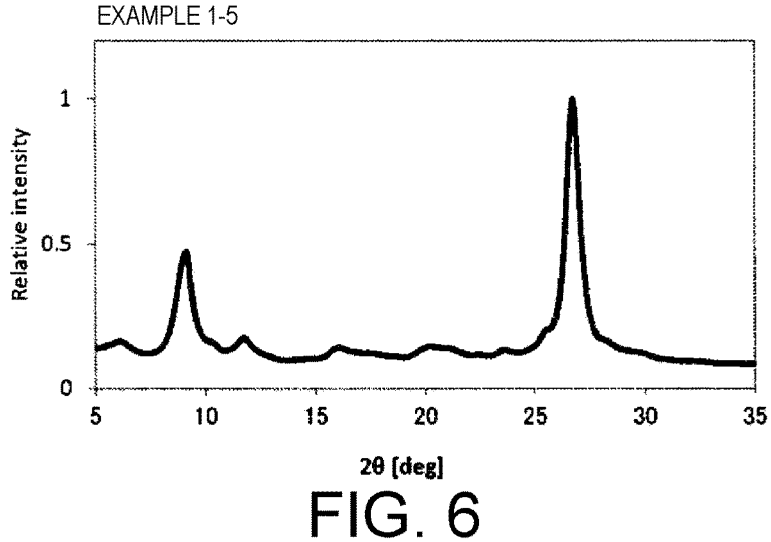
FIG. 6 is an X-ray diffraction spectrum of an isoindoline compound obtained in Example 1-5.
Figure 7:
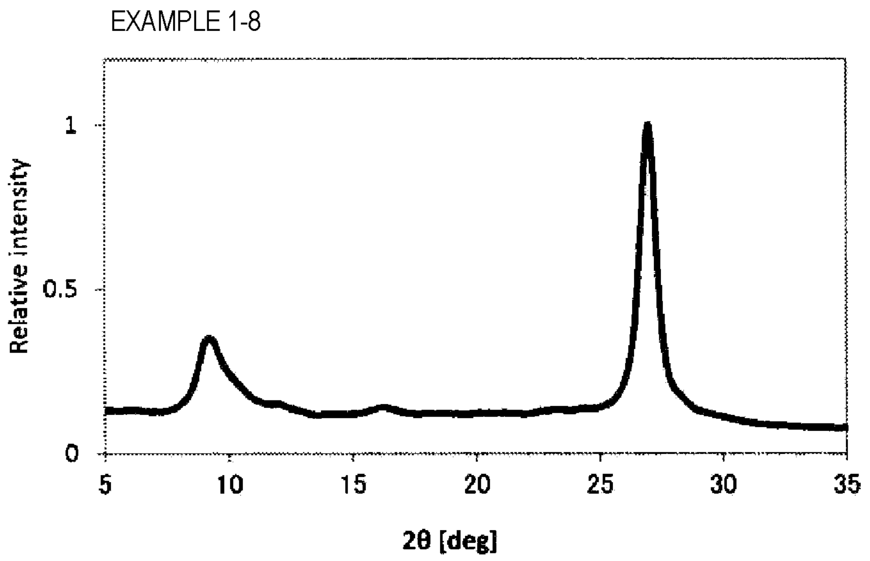
FIG. 7 is an X-ray diffraction spectrum of an isoindoline compound obtained in Example 1-8.
Figure 8:
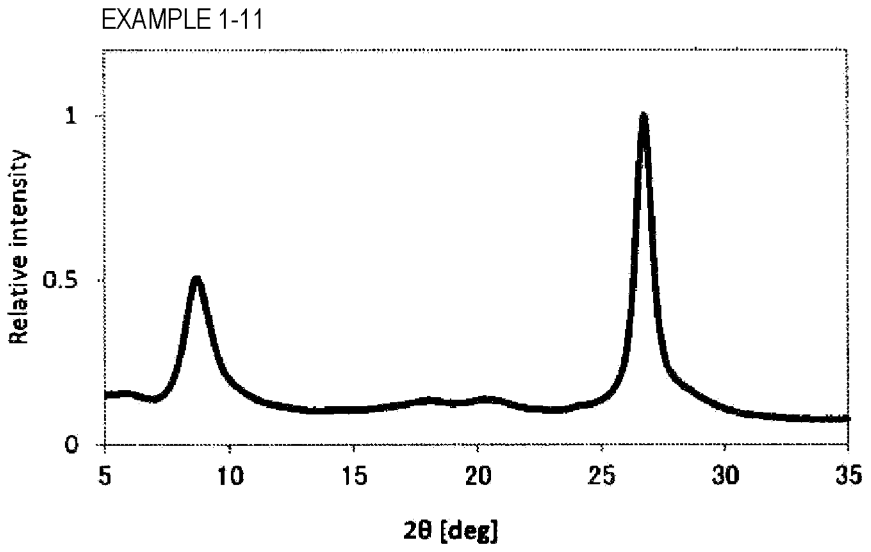
FIG. 8 is an X-ray diffraction spectrum of an isoindoline compound obtained in Example 1-11.

Regarding the obtained isoindoline compounds, X-ray diffraction spectra measured as described below with Cu-Kα rays will be shown in FIG. 1 for Manufacturing Example 1-1, in FIG. 2 for Manufacturing Example 1-2, in FIG. 3 for Example 1-1, in FIG. 4 for Example 1-2, in FIG. 5 for Example 1-4, in FIG. 6 for Example 1-5, in FIG. 7 for Example 1-8, and in FIG. 8 for Example 1-11.

(Powder X-Ray Diffraction Measurement Method of Isoindoline Compositions (1) and (2))

Powder X-ray diffraction measurement was measured within a diffraction angle (2θ) range of 3° to 35° according to Japanese Industrial Standards JIS K 0131 (General rules for X-ray diffractometric analysis).

Measurement conditions were set as described below.

X-ray diffraction device: RINT2100 manufactured by Rigaku Corporation

Sampling width: 0.02°

Scanning speed: 2.0°/min

Divergence slit: 1°

Divergence longitudinal limiting slit: 10 mm

Scattering slit: 2°

Light receiving slit: 0.3 mm

Tube: Cu

Tube voltage: 40 kV

Tube current: 40 mA

<Coloring Composition and Characteristic Evaluation>

Coloring compositions for a variety of uses were prepared using the obtained isoindoline compounds, and the physical properties were evaluated.

<1> Evaluation of Composition for Molding

<Heat Resistance Test>

Examples A-1 to A-17 and Comparative Examples A-1 to A-3

Heat resistance tests were performed based on German Industry Standard DIN 12877-1.

The obtained isoindoline compound and a high density polyethylene resin (product name: HI-ZEX 2208J, manufactured by Prime Polymer Co., Ltd.) were used, melting and kneading were performed in a twin screw extruder, injection molding was performed under conditions where the temperature in the barrel became 200° C., adjustment was performed such that the coloring power became a density of SD1/3, and 11 colored plates having a thickness of 3 mm were produced. The injection molding was performed under conditions where the residence time of a composition in the barrel became as short as possible. The isoindoline compounds used are shown in Table 4. In order to detect the average color difference of the colored plates, the colors of six colored plates, that is, the sixth to eleventh colored plates, were each measured using a calorimeter capable of total luminous flux measurement (CM-700d manufactured by Konica Minolta Japan, Inc.). The average value of the obtained colorimetric values was used as control (reference value).

Next, molding conditions were adjusted such that the residence time in the barrel became five minutes, and the 11 colored plates were each molded at 300° C. For the obtained colored plates, the colors of the six colored plates, that is, the sixth to eleventh colored plates, were each measured, and the average value of the colorimetric values was calculated. Color differences (ΔE*) between the control and the measurement values of the plates molded at 300° C. were obtained and evaluated according to references below. The results are shown in Table 4. As the color difference becomes smaller, the heat resistance becomes more favorable.

(Evaluation References)

4. ΔE* is less than 3.0. Extremely favorable
3. ΔE* is 3.0 or more and less than 6.0. Favorable
2. ΔE* is 6.0 or more and less than 10.0. Practically available
1. ΔE* is 10.0 or more. Practically unavailable

TABLE 4

| | Isoindoline compound | ΔE |
|---|---|---|
| Example A-1 | (1-1) | 3 |
| Example A-2 | (1-2) | 2 |
| Example A-3 | (1-3) | 3 |
| Example A-4 | (1-4) | 4 |
| Example A-5 | (1-5) | 4 |
| Example A-6 | (1-6) | 4 |
| Example A-7 | (1-7) | 3 |
| Example A-8 | (1-10) | 4 |
| Example A-9 | (1-11) | 4 |
| Example A-10 | (1-12) | 4 |
| Example A-11 | (1-13) | 4 |
| Comparative Example A-1 | (1-8) | 1 |
| Example A-12 | (2-1) | 3 |
| Example A-13 | (2-2) | 3 |
| Example A-14 | (2-5) | 4 |
| Comparative Example A-2 | (2-3) | 1 |
| Example A-15 | (3-1) | 2 |
| Example A-16 | (3-2) | 3 |
| Example A-17 | (3-5) | 4 |
| Comparative Example A-3 | (3-3) | 1 |

(Example A-18) Production of Compact

One part of isoindoline compound 1-4 and 1000 parts of a polypropylene resin (product name: PRIME POLYPRO J105, manufactured by Prime Polymer Co., Ltd.) were melted and kneaded at 220° C. in a twin screw extruder and then cut with a pelletizer to obtain a pellet-like composition for molding. Next, the obtained composition for molding was injection-molded using an injection molding machine in which the molding temperature was set to 220° C. and the mold temperature was set to 40° C. while being melted and kneaded, thereby obtaining a compact (plate) having a thickness of 1 mm. As a result of visually observing the compact, coarse grains or the like were not recognized even in watermarks, and a yellow plate having a favorable coloring degree was obtained.

(Example A-19) Production of Compact 0.5 Parts of isoindoline compound 1-4 and 1000 parts of a polyethylene terephthalate resin (product name: VYLOPET EMC-307, manufactured by Toyobo Co., Ltd.) preliminarily dried in advance were melted and kneaded at 275° C. in a twin screw extruder and then cut with a pelletizer to obtain a pellet-like composition for molding. Next, the obtained composition for molding was injection-molded using an injection molding machine in which the molding temperature was set to 275° C. and the mold temperature was set to 85° C. while being melted and kneaded, thereby obtaining a compact (plate) having a thickness of 3 mm. As a result of visually observing the compact, coarse grains or the like were not recognized even in watermarks, and a yellow plate having a favorable coloring degree was obtained.

<2> Evaluation of Toner

Negative charge toners were produced and evaluated.

Example A-20

2500 Parts of isoindoline compound 1-4 and 2500 parts of a polyester resin (product name: M-325, manufactured by Sanyo Chemical Industries, Ltd.) were kneaded at 120° C. for 15 minutes using a pressure kneader. Next, the obtained kneaded product was removed from the pressure kneader and further kneaded using three rolls having a roll temperature of 95° C. The obtained kneaded product was cooled and then coarsely pulverized to 10 mm or smaller, thereby obtaining a coloring composition.

500 Parts of the obtained coloring composition, 4375 parts of a polyester resin, 50 parts of a calcium salt compound of 3,5-di-tert-butysalicylic acid (charge control agent), and 75 parts of an ethylene homopolymer (mold release agent, molecular weight of 850, Mw/Mn=1.08, melting point of 107° C.) were mixed (at 3000 rpm for three minutes) using a Henschel mixer having a capacity of 20 L, furthermore, melted and kneaded at a discharge temperature of 120° C. using a twin screw kneading extruder. Next, the kneaded product was cooled, solidified, and then coarsely pulverized with a hammer mill. Next, the obtained coarsely pulverized product was finely pulverized using an I-type jet mill (IDS-2 type) and then classified, thereby obtaining toner mother particles.

Next, 2500 parts of the toner mother particles obtained above and 12.5 parts of hydrophobic titanium oxide (STT-30A, manufactured by Titan Kogyo, Ltd.) were mixed with a Henschel mixer having a capacity of 10 L, thereby obtaining negative charge toner 1.

On the other hand, as a comparison target, negative charge toner 2 was obtained all in the same manner as in Example A-20 except that isoindoline compound 1-4 of Examples A-20 was changed to isoindoline compound 1-8.

The obtained negative charge toner 1 and negative charge toner 2 were each sliced to a thickness of 0.9 μm using a microtome, thereby forming samples. Next, the dispersion state of the pigment in each sample was observed using a transmission electron microscope. As a result, it could be confirmed that the pigment was more uniformly dispersed and the dispersion characteristics were more favorable in negative charge toner 1, for which the compound of isoindoline compound 1-4 was used, than negative charge toner 2, for which the compound of isoindoline compound 1-8 was used.

<3> Evaluation of Paint

<3-1> Preparation of Solvent-Based Paint

1. Preparation of Base Paint (Example B-1) Method for Preparing Base Paint 1

First, raw materials below and 230 parts of steel beads were charged into a 225 ml glass bottle and dispersed using a paint shaker manufactured by Red Devil, Inc. for 60 minutes, thereby obtaining a mixture.

Isoindoline compound (1-1): 19 parts

Acrylic resin (ACRYDIC 47-712 manufactured by DIC Corporation): 7.7 parts

Dispersion solvent (solvent mixture of toluene, xylene, butyl acetate, and T-SOL 150 FLUID manufactured by ENEOS Corporation in mass fractions of 3:3:2:2): 40.7 parts Next, 75.4 parts of ACRYDIC 47-712 and 17.2 parts of a melamine resin (AMIDIR L-117-60 manufactured by DIC Corporation) were added to the mixture and further dispersed for 10 minutes, thereby obtaining a dispersion liquid.

Next, the steel beads were removed from the dispersion liquid, and base paint 1 of isoindoline compound (1-1) was obtained.

(Examples B-2 to B-17 and Comparative Examples B-1 to B-3) Preparation of Base Paints 2 to 20

Base paints 2 to 20 were obtained all in the same manner as in Example B-1 except that, in the method for preparing base paint 1 described in Example B-1, isoindoline compound 1-1 was changed to isoindoline compounds 1-2 to 1-8, 1-10 to 1-13, 2-1 to 2-3, 2-5, 3-1 to 3-3, and 3-5, respectively.

TABLE 5

| | Base paint | Isoindoline compound |
|---|---|---|
| Example B-1 | Base paint 1 | (1-1) |
| Example B-2 | Base paint 2 | (1-2) |
| Example B-3 | Base paint 3 | (1-3) |
| Example B-4 | Base paint 4 | (1-4) |
| Example B-5 | Base paint 5 | (1-5) |
| Example B-6 | Base paint 6 | (1-6) |
| Example B-7 | Base paint 7 | (1-7) |
| Example B-8 | Base paint 8 | (1-10) |
| Example B-9 | Base paint 9 | (1-11) |
| Example B-10 | Base paint 10 | (1-12) |
| Example B-11 | Base paint 11 | (1-13) |
| Comparative Example B-1 | Base paint 12 | (1-8) |
| Example B-12 | Base paint 13 | (2-1) |
| Example B-13 | Base paint 14 | (2-2) |
| Example B-14 | Base paint 15 | (2-5) |
| Comparative Example B-2 | Base paint 16 | (2-3) |
| Example B-15 | Base paint 17 | (3-1) |
| Example B-16 | Base paint 18 | (3-2) |
| Example B-17 | Base paint 19 | (3-5) |
| Comparative Example B-3 | Base paint 20 | (3-3) |

2. Preparation of White Paint

The following relates to a preparation example of white paint that was used for solid base paint.

First, raw materials below and 900 parts of steel beads were charged into a 900 ml glass bottle and dispersed with a paint shaker manufactured by Red Devil, Inc. for 60 minutes, thereby obtaining a dispersion liquid.

Titanium oxide (titanium oxide TIPAQUE CR90 manufactured by Ishihara Sangyo Kaisha, Ltd.): 66.6 parts Acrylic resin (ACRYDIC 47-712 manufactured by DIC Corporation): 101.7 parts Melamine resin (AMIDIR L-117-60 manufactured by DIC Corporation): 21.3 parts Dispersion solvent (solvent mixture of toluene, xylene, butyl acetate, and T-SOL 150 FLUID manufactured by ENEOS Corporation in mass fractions of 3:3:2:2): 20.9 parts Next, the steel beads were removed from the dispersion liquid, and white paint was obtained.

3. Preparation of Solid Base Paint (Example C-1)—Preparation of Solid Base Paint 1

Components below were stirred using a high-speed stirrer, and solid base paint 1 was obtained.

Base paint 1 produced in Example B-1: 10 parts

White paint: 31.9 parts (Examples C-2 to C-17 and Comparative Examples C-1 to C-3)—Preparation of Solid Base Paints 2 to 20

Solid base paints 2 to 20 were obtained all in the same manner as in Example C-1 except that base paint 1 of Example C-1 was changed to base paints 2 to 20, respectively.

The isoindoline compounds in the base paints used for the solid base paints prepared in the individual examples and the individual comparative examples are as shown in Table 6.

TABLE 6

| | Solid paint | Base paint | Isoindoline compound |
|---|---|---|---|
| Example C-1 | Solid base paint 1 | Base paint 1 | (1-1) |
| Example C-2 | Solid base paint 2 | Base paint 2 | (1-2) |
| Example C-3 | Solid base paint 3 | Base paint 3 | (1-3) |
| Example C-4 | Solid base paint 4 | Base paint 4 | (1-4) |
| Example C-5 | Solid base paint 5 | Base paint 5 | (1-5) |
| Example C-6 | Solid base paint 7 | Base paint 6 | (1-6) |
| Example C-7 | Solid base paint 8 | Base paint 7 | (1-7) |
| Example C-8 | Solid base paint 9 | Base paint 8 | (1-10) |
| Example C-9 | Solid base paint 0 | Base paint 9 | (1-11) |
| Example C-10 | Solid base paint 10 | Base paint 10 | (1-12) |
| Example C-11 | Solid base paint 11 | Base paint 11 | (1-13) |
| Comparative Example C-1 | Solid base paint 12 | Base paint 12 | (1-8) |
| Example C-12 | Solid base paint 13 | Base paint 13 | (2-1) |
| Example C-13 | Solid base paint 14 | Base paint 14 | (2-2) |
| Example C-14 | Solid base paint 15 | Base paint 15 | (2-5) |
| Comparative Example C-2 | Solid base paint 16 | Base paint 16 | (2-3) |
| Example C-15 | Solid base paint 17 | Base paint 17 | (3-1) |
| Example C-16 | Solid base paint 18 | Base paint 18 | (3-2) |
| Example C-17 | Solid base paint 19 | Base paint 19 | (3-5) |
| Comparative Example C-3 | Solid base paint 20 | Base paint 20 | (3-3) |

4. Preparation of Top Coat Clear Paint

Raw materials below were stirred using a high-speed stirrer, and top coat clear paints were obtained.

Acrylic resin (ACRYDIC 44-179 manufactured by DIC Corporation): 120 parts

Melamine resin (AMIDIR L117-60 manufactured by DIC Corporation): 30 parts

Dilution solvent (solvent mixture of toluene, xylene, T-SOL 150 FLUID manufactured by ENEOS Corporation, ethyl 3-ethoxypropionate, and ethyl acetate in mass fractions of 3:2:2:1:2): 50 parts 5. Production of Solid Base Painted Plate and Evaluation of Weather Resistance (Example D-1) Preparation of Solid Base Painted Plate 1

Solid base paint 1 was sprayed with a spray gun to paint a steel plate polished with sandpaper #1000. In order to adjust the viscosity so as to facilitate the spraying, the same mass, as a standard, of the dilution solvent (solvent mixture of toluene, xylene, T-SOL 150 FLUID manufactured by ENEOS Corporation, ethyl 3-ethoxypropionate, and ethyl acetate in mass fractions of 3:2:2:1:2) was appropriately mixed with the solid base paint.

The painting was performed nine times separately, and then the top coat clear paint was sprayed six times separately. Next, the paint was dried at 25° C. for eight hours and then dried at 140° C. for 30 minutes, thereby obtaining solid base painted plate 1.

(Examples D-2 to D-17 and Comparative Examples D-1 to D-3) Production of Solid Base Painted Plates 2 to 20

Solid base painted plates 2 to 20 were obtained all in the same manner as in Example D-1 except that solid base paint 1 of Example D-1 was changed to solid base paints 2 to 20, respectively.

(Evaluation of Weather Resistance)

Weather resistance tests were performed on the obtained solid base painted plates 1 to 20 according to the following.

The weather resistance test was performed using an ultra-accelerated weather resistance tester (EYE SUPER Xenon tester SUV-W151 manufactured by Iwasaki Electric Co., Ltd.) under conditions where the illuminance was 90 mW/cm$^2$, a procedure of irradiation (daytime) under conditions: 12 hours, temperature of 63° C., humidity of 70% and pause of irradiation (night) under conditions: 12 hours, temperature of 70° C., humidity of 99% was regarded as one cycle, and the times were 48 hours (two cycles of 12 hours of daytime operation and 12 hours of night operation) and 96 hours (four cycles of 12 hours of daytime operation and 12 hours of night operation). The painted plates were visually observed before and after the weather resistance test, and the weather resistance was evaluated according to references below. The results are shown in Table 7. It is considered that, as the change in color becomes smaller, the weather resistance becomes more outstanding, and the evaluation references "4", "3", and "2" below are practically available levels.

(Evaluation References)

4. ΔE* is less than 5.0. Extremely favorable
3. ΔE* is 5.0 or more and less than 7.5. Favorable
2. ΔE* is 7.5 or more and less than 10.0. Practically available
1. ΔE* is 10.0 or more. Practically unavailable

TABLE 7

| | Solid base painted plate | 48 hours | 96 hours |
|---|---|---|---|
| Example D-1 | Solid base painted plate 1 | 3 | 3 |
| Example D-2 | Solid base painted plate 2 | 3 | 2 |
| Example D-3 | Solid base painted plate 3 | 4 | 3 |
| Example D-4 | Solid base painted plate 4 | 4 | 4 |
| Example D-5 | Solid base painted plate 5 | 4 | 4 |
| Example D-6 | Solid base painted plate 6 | 4 | 3 |
| Example D-7 | Solid base painted plate 7 | 3 | 3 |
| Example D-8 | Solid base painted plate 8 | 4 | 4 |
| Example D-9 | Solid base painted plate 9 | 4 | 4 |
| Example D-10 | Solid base painted plate 10 | 4 | 3 |
| Example D-11 | Solid base painted plate 11 | 4 | 4 |
| Comparative Example D-1 | Solid base painted plate 12 | 1 | 1 |
| Example D-12 | Solid base painted plate 13 | 3 | 3 |
| Example D-13 | Solid base painted plate 14 | 3 | 3 |
| Example D-14 | Solid base painted plate 15 | 4 | 4 |
| Comparative Example D-2 | Solid base painted plate 16 | 1 | 1 |
| Example D-15 | Solid base painted plate 17 | 3 | 3 |
| Example D-16 | Solid base painted plate 18 | 4 | 3 |
| Example D-17 | Solid base painted plate 19 | 4 | 4 |
| Comparative Example D-3 | Solid base painted plate 20 | 1 | 1 |

<4> Evaluation of Water-Based Coloring Composition

1. Preparation of Water-Based Coloring Composition (Example E-1) Preparation of Water-Based Coloring Composition E-1

Raw materials below and 70 parts of zirconia beads having a diameter of 1.25 mm were charged into a 70 ml glass bottle and dispersed using a paint shaker manufactured by Red Devil, Inc. for 60 minutes, thereby obtaining a dispersion liquid.

Isoindoline compound (1-1): 3.15 parts

Polyester-modified acrylic acid polymer (ADDITOL XW 6528 manufactured by Allnex GMBH): 5.25 parts Wetting agent (ADDITOL XW 6374 manufactured by Allnex GMBH): 0.95 parts Defoamer (ADDITOL XW 6211 manufactured by Allnex GMBH): 0.63 parts Ion exchange water: 21.52 parts Next, the zirconia beads were removed from the dispersion liquid, and water-based coloring composition E-1 was obtained.

(Examples E-2 to E-17 and Comparative Examples E-1 to E-3) Preparation of Water-Based Coloring Compositions E-2 to 20

Water-based coloring compositions E-2 to 20 were obtained in the same manner as in Example E-1 except that isoindoline pigment 1-1 in Example E-1 was changed as shown in Table 8.

(Example E-18) Preparation of Water-Based Coloring Composition E-21

Water-based coloring composition E-21 was obtained all in the same manner as in Example E-1 except that isoindoline compound 1-1: 3.15 parts in Example E-1 was changed to isoindoline compound 1-8: 2.84 parts and isoindoline compound 1-9: 0.32 parts.

2. Evaluation of Dispersion Stability (Evaluation of Initial Viscosity and Viscosity Stability)

For the obtained water-based coloring compositions, the initial viscosities at 25° C. were measured using an E-type viscometer ("ELD-type viscometer" manufactured by Toki Sangyo Co., Ltd.). The viscosities after an elapse of one week at 25° C. and after an elapse acceleration of one week at 50° C. were measured, respectively, in the same manner. Viscosity increase rates with respect to the initial viscosities were calculated based on the obtained measurement values and used as one of the indexes for viscosity stability, and the viscosity stability was evaluated according to evaluation references below. The results are shown in Table 8. As the initial viscosity becomes lower, the dispersion characteristics become more outstanding. In addition, as the viscosity increase rate becomes smaller, the dispersion stability becomes more outstanding. The evaluation references "4", "3", and "2" below are practically available levels.

(Evaluation References of Initial Viscosity)

4. The initial viscosity is lower than 5.0 mPa-s. Extremely favorable
3. The initial viscosity is 5.0 mPa-s or higher and lower than 7.5 mPa-s. Favorable
2. The initial viscosity is 7.5 mPa-s or higher and lower than 10.0 mPa-s. Practically available
1. The initial viscosity is 10.0 mPa-s or higher. Practically unavailable (Evaluation References of Viscosity Stability)

4. The viscosity increase rate is less than 20%. Extremely favorable
3. The viscosity increase rate is 20% or more and less than 30%. Favorable
2. The viscosity increase rate is 30% or more and less than 40%. Practically available
1. The viscosity increase rate is 40% or more. Practically unavailable

TABLE 8

| | Isoindoline compound | Initial viscosity | After one week at 25° C. | After one week at 50° C. |
|---|---|---|---|---|
| Example E-1 | (1-1) | 3 | 4 | 4 |
| Example E-2 | (1-2) | 3 | 3 | 2 |
| Example E-3 | (1-3) | 2 | 3 | 2 |
| Example E-4 | (1-4) | 4 | 4 | 4 |

TABLE 8-continued

| | Isoindoline compound | Initial viscosity | After one week at 25° C. | After one week at 50° C. |
|---|---|---|---|---|
| Example E-5 | (1-5) | 4 | 4 | 4 |
| Example E-6 | (1-6) | 4 | 4 | 3 |
| Example E-7 | (1-7) | 3 | 3 | 2 |
| Example E-8 | (1-10) | 4 | 4 | 4 |
| Example E-9 | (1-11) | 3 | 4 | 4 |
| Example E-10 | (1-12) | 4 | 4 | 3 |
| Example E-11 | (1-13) | 4 | 4 | 3 |
| Comparative Example E-1 | (1-8) | 1 | 2 | 1 |
| Example E-12 | (2-1) | 3 | 4 | 3 |
| Example E-13 | (2-2) | 4 | 4 | 4 |
| Example E-14 | (2-5) | 4 | 4 | 4 |
| Comparative Example E-2 | (2-3) | 1 | 3 | 1 |
| Example E-15 | (3-1) | 3 | 4 | 3 |
| Example E-16 | (3-2) | 4 | 4 | 4 |
| Example E-17 | (3-5) | 4 | 4 | 3 |
| Comparative Example E-3 | (3-3) | 1 | 1 | 1 |
| Example E-18 | (1-8) + (1-9) | 2 | 3 | 2 |

<5> Evaluation of Aqueous Paint

Water-based paints were produced using the water-based coloring compositions produced above and evaluated.

<5-1> Preparation of Aqueous Paint

Example F-1

(1) Preparation of Aqueous Paint 1-1

Raw materials below were stirred using a high-speed stirrer, and aqueous paint 1-1 (stored at 25° C. for one week) obtained.

Water-based coloring composition E-1 (stored at 25° C. for one week): 1.4 parts
Acrylic resin (acid value of 65.0, OH value of 50, Mn=15,000, non-volatile component of 35%): 13.6 parts
Melamine resin (CYMEL 325 manufactured by Allnex GMBH): 3.4 parts (2) Preparation of Aqueous Paint 1-2

Raw materials below were stirred using a high-speed stirrer, and aqueous paint 1-2 (stored at 50° C. for one week) obtained.

Water-based coloring composition E-1 (stored at 50° C. for one week): 1.4 parts
Acrylic resin (acid value of 65.0, OH value of 50, Mn=15,000, non-volatile component of 35%): 13.6 parts
Melamine resin (CYMEL 325 manufactured by Allnex GMBH): 3.4 parts Examples F-2 to F-18 and Comparative Examples F-1 to F-3

Aqueous paints 2-1 to 21-1 were obtained all in the same manner as in Example F-1 except that water-based coloring composition E-1 (stored at 25° C. for one week) in Example F-1 was sequentially changed to water-based coloring compositions E-2 to 21 (each stored at 25° C. for one week).

In addition, aqueous paints 2-2 to 21-2 were obtained all in the same manner as in Example F-1 except that water-based coloring composition E-1 (stored at 50° C. for one week) in Example F-1 was sequentially changed to water-based coloring compositions E-2 to 21 (each stored at 50° C. for one week).

TABLE 9

| | Water-based coloring composition | Aqueous paint | Isoindoline compound |
|---|---|---|---|
| Example F-1 | E-1 | Aqueous paint 1-1<br>Aqueous paint 1-2 | (1-1) |
| Example F-2 | E-2 | Aqueous paint 2-1<br>Aqueous paint 2-2 | (1-2) |
| Example F-3 | E-3 | Aqueous paint 3-1<br>Aqueous paint 3-2 | (1-3) |
| Example F-4 | E-4 | Aqueous paint 4-1<br>Aqueous paint 4-2 | (1-4) |
| Example F-5 | E-5 | Aqueous paint 5-1<br>Aqueous paint 5-2 | (1-5) |
| Example F-6 | E-6 | Aqueous paint 6-1<br>Aqueous paint 6-2 | (1-6) |
| Example F-7 | E-7 | Aqueous paint 7-1<br>Aqueous paint 7-2 | (1-7) |
| Example F-8 | E-8 | Aqueous paint 8-1<br>Aqueous paint 8-2 | (1-10) |
| Example F-9 | E-9 | Aqueous paint 9-1<br>Aqueous paint 9-2 | (1-11) |
| Example F-10 | E-10 | Aqueous paint 10-1<br>Aqueous paint 10-2 | (1-12) |
| Example F-11 | E-11 | Aqueous paint 11-1<br>Aqueous paint 11-2 | (1-13) |
| Comparative Example F-1 | E-12 | Aqueous paint 12-1<br>Aqueous paint 12-2 | (1-8) |
| Example F-12 | E-13 | Aqueous paint 13-1<br>Aqueous paint 13-2 | (2-1) |
| Example F-13 | E-14 | Aqueous paint 14-1<br>Aqueous paint 14-2 | (2-2) |
| Example F-14 | E-15 | Aqueous paint 15-1<br>Aqueous paint 15-2 | (2-5) |
| Comparative Example F-2 | E-16 | Aqueous paint 16-1<br>Aqueous paint 16-2 | (2-3) |
| Example F-15 | E-17 | Aqueous paint 17-1<br>Aqueous paint 17-2 | (3-1) |
| Example F-16 | E-18 | Aqueous paint 18-1<br>Aqueous paint 18-2 | (3-2) |
| Example F-17 | E-19 | Aqueous paint 19-1<br>Aqueous paint 19-2 | (3-5) |
| Comparative Example F-3 | E-20 | Aqueous paint 20-1<br>Aqueous paint 20-2 | (3-3) |
| Example F-18 | E-21 | Aqueous paint 21-1<br>Aqueous paint 21-2 | (1-8) + (1-9) |

<5-2> Production of PET Film Painting (Example G-1) Production of PET Film Painting 1

LUMIRROR 100T60 (PET film, 100 μm thick) was painted with aqueous paint 1-1 and aqueous paint 1-2 using a six-mil applicator. After this painting, the PET film was dried at room temperature for 18 hours. After that, the PET film was dried at 60° C. for five minutes and dried at 140° C. for 20 minutes, thereby obtaining PET film painting 1 having a coating with a film thickness of 70 μm.

(Examples G-2 to G-18 and Comparative Examples G-1 to G-3) Production of PET Film Paintings 2 to 21

PET film paintings 2 to 21 were obtained all in the same manner as in Example G-1 except that aqueous paint 1-1 and aqueous paint 1-2 in Example G-1 were changed to aqueous paint 2-1 to 21-1 and aqueous paint 2-2 to 21-2.

<5-3> Evaluation of PET Film Painting

For each of the PET film paintings obtained in Examples G-1 to G-16 and Comparative Examples G-1 to G-3, the stability of the hue was evaluated according to a method below.

(Method for Evaluating Stability of Hue)

The colors of the PET films painted with the paint of the water-based coloring composition stored at 25° C. for one week and the paint of the water-based coloring composition stored at 50° C. for one week were measured using a colorimeter (CM-700d manufactured by Konica Minolta Japan, Inc.), a color difference (ΔE*) was obtained and determined based on references below. The results are shown in Table 10. It is considered that, as the color difference becomes smaller, the color material has more outstanding dispersion stability, and the evaluation references "4", "3", and "2" below are practically available levels.

(Evaluation References)

4. ΔE* is less than 1.0.
3. ΔE* is 1.0 or more and less than 2.0.
2. ΔE* is 2.0 or more and less than 3.0.
1. ΔE* is 3.0 or more.

TABLE 10

| | Isoindoline compound | ΔE* |
|---|---|---|
| Example G-1 | (1-1) | 3 |
| Example G-2 | (1-2) | 2 |
| Example G-3 | (1-3) | 2 |
| Example G-4 | (1-4) | 4 |
| Example G-5 | (1-5) | 4 |
| Example G-6 | (1-6) | 4 |
| Example G-7 | (1-7) | 3 |
| Example G-8 | (1-10) | 4 |
| Example G-9 | (1-11) | 4 |
| Example G-10 | (1-12) | 3 |
| Example G-11 | (1-13) | 4 |
| Comparative Example G-1 | (1-8) | 1 |
| Example G-12 | (2-1) | 3 |
| Example G-13 | (2-2) | 3 |
| Example G-14 | (2-5) | 3 |
| Comparative Example G-2 | (2-3) | 1 |
| Example G-15 | (3-1) | 4 |
| Example G-16 | (3-2) | 4 |
| Example G-17 | (3-5) | 3 |
| Comparative Example G-3 | (3-3) | 1 |
| Example G-18 | (1-8) + (1-9) | 3 |

<6> Evaluation of Gravure Ink

First, a method for measuring a resin will be described below.

(Hydroxyl Value)

The hydroxyl value was obtained according to JIS K 0070.

(Acid Value)

The acid value was obtained according to JIS K 0070.

(Amine Value)

The amine value was obtained according to a method below based on JIS K 0070 as the mg value of the same amount of potassium hydroxide as the equivalent of hydrochloric acid necessary to neutralize an amino group that was contained in 1 g of the resin.

0.5 to 2 g of a specimen was precisely weighed (specimen non-volatile component: Sg). 50 mL of a solution mixture of methanol and methyl ethyl ketone (mass ratio=60:40) was added to and dissolved in the precisely-weighed specimen. Bromophenol blue was added to the obtained solution as an indicator, and the obtained solution was titrated with a 0.2 mol/L ethanolic hydrochloric acid solution (titer: f). A point in time where the color of the solution changed from green to yellow was regarded as an end point, and the amine value was obtained by equation below using the titration amount (AmL) at this time.

$$\text{Amine value}=(A\times f\times 0.2\times 56.108)/S[\text{mgKOH/g}]$$

(Weight-Average Molecular Weight)

The weight-average molecular weight was obtained as an equivalent molecular weight for which polystyrene was used as a standard substance from a molecular weight distribution measured using gel permeation chromatography (GPC) device (HLC-8220 manufactured by Tosoh Corporation). Measurement conditions are as described below.

Columns: Columns below connected in series were used.

Guard column HXL-H manufactured by Tosoh Corporation

TSKgel G5000HXL manufactured by Tosoh Corporation

TSKgel G4000HXL manufactured by Tosoh Corporation

TSKgel G3000HXL manufactured by Tosoh Corporation

TSKgel G2000HXL manufactured by Tosoh Corporation

Detector: Differential refractometer (RI)

Measurement conditions: Column temperature of 40° C.

Eluent: Tetrahydrofuran

Flow rate: 1.0 ml/minute (Glass Transition Temperature)

The glass transition temperature (Tg) was obtained by differential scanning calorimetry (DSC). DSC8231 manufactured by Rigaku Corporation was used as a measuring instrument, the measurement temperature range was −70° C. to 250° C., the heating rate was 10° C./minute, and the middle point between the heat absorption start temperature and the end temperature based on glass transition in the DSC curve was regarded as the glass transition temperature.

(Synthesis Example 1) Polyurethane Resin [PU1]

200 Parts of polypropylene glycol having a number-average molecular weight of 700 (hereinafter, "PPG700"), 127 parts of isophorone diisocyanate (hereinafter, "IPDI"), and 81.8 parts of ethyl acetate were reacted at 80° C. for four hours under a nitrogen stream, thereby obtaining a resin solution of a terminated isocyanate urethane prepolymer. Next, the obtained resin solution of a terminated isocyanate urethane prepolymer was slowly added at 40° C. to a mixture of 49.5 parts of isophoronediamine (hereinafter, "IPDA"), 3 parts of 2-ethanolamine, and 803.9 parts of a solvent mixture of ethyl acetate and isopropanol (hereinafter, "IPA") in a mass ratio of 50:50 and then reacted at 80° C. for one hour, thereby obtaining a polyurethane resin solution [PU1] containing 30% of a non-volatile component and having an amine value of 3.5 mgKOH/g, a hydroxyl value of 7.3 mgKOH/g, and a weight-average molecular weight of 40,000. The glass transition temperature was −32° C.

(Example H-1) [Production of Gravure Printing Ink 1]

Parts of the polyurethane resin solution [PU1] (30% of non-volatile component), as a binder resin, 0.8 parts in terms of non-volatile component of polyethylene wax (A-C 400A manufactured by Honeywell International Inc.) as hydrocarbon-based wax, 0.5 parts in terms of non-volatile component of a chlorinated polypropylene resin (product name: 370 M manufactured by Nippon Paper Industries Co., Ltd., chlorine content rate of 30%, 50% of non-volatile component), 10 parts of isoindoline compound (1-1), and 58.7 parts of a solution of methyl ethyl ketone (hereinafter, "MEK"), n-propyl acetate (hereinafter, "NPAC"), and IPA in mass fractions of 40/40/20 were mixed and dispersed with an Eiger mill for 15 minutes, thereby obtaining gravure printing ink 1.

(Examples H-2 to 17 and Comparative Examples H-1 to 3) [Production of Gravure Printing Inks 2 to 20]

Gravure printing inks 2 to 20 were obtained in the same manner as in Example H-1 except that, in the method for preparing gravure printing ink 1 described in Example H-1, isoindoline compound (1-1) was changed as shown in Table 11.

(Example I-1)<Printing of Gravure Printing Ink>

Gravure printing ink 1 obtained above was diluted with a solvent mixture of MEK/NPAC/IPA=40/40/20 (mass ratio) such that the viscosity became 16 seconds (25° C., Zahn cup No. 3), and printing was performed at a printing rate of 80 m/minute on a base material below (corona discharge-treated surface in the case of OPP) with a gravure printer including a Helio 175-line gradation plate (printing process compressed gradation 100% to 3%), thereby obtaining printed articles I1-1 (OPP) and I1-2 (CPP).

<Base Material>

OPP: Biaxially stretched polypropylene (OPP) film with a single corona discharge-treated surface (FOR manufactured by Futamura Chemical Co., Ltd., thickness of 25 μm)

CPP: Unstretched polypropylene (CPP) film that is not corona-treated (CP-S manufactured by Mitsui Chemicals Tohcello, Inc., thickness of 30 μm)

Examples I-2 to 17 and Comparative Examples I-1 to 3

Printing was performed in printing configurations shown in Table 12 with gravure inks 2 to 20 shown in Table 11, thereby obtaining printed articles I2-1 to I20-1 (OPP) and I2-2 to I20-2 (CPP).

<Evaluation>

Evaluations below were performed using gravure inks 1 to 20 and printed articles I1-1 to I20-1 (OPP) and printed articles I1-2 to I20-2 (CPP).

<Stability of Ink Over Time>

Gravure printing inks 1 to 20 were each put into a closed container and stored at 40° C. for 10 days. After that, the viscosities were measured, and changes in viscosities from those before the storage were evaluated. The viscosities were measured by the outflow seconds of a Zahn cup No. 4 at 25° C. In all of the inks, the viscosities in a B-type viscometer before the storage were within a range of 40 to 500 cps (25° C.).

(Evaluation References)

5. The viscosity change is shorter than two seconds (favorable).
4. The viscosity change is two seconds or longer and shorter than five seconds (practically available).
3. The viscosity change is five seconds or longer and shorter than ten seconds (slightly poor).
2. The viscosity change is 10 seconds or longer and shorter than 15 seconds (poor).
1. The viscosity change is 15 seconds or longer (extremely poor).

5 to 4 is a range where there is no practical problem.

<Transparency Evaluation>

Regarding transparency, colors were exhibited on color exhibition paper with a black belt, and the transmission condition on the black belt at the time of comparing each of the colors with a comparative example having a similar hue was visually determined.

(Evaluation References)

5. Extremely transparent
4. Transparent
3. Same
2. Opaque
1. Extremely opaque

TABLE 11

| | Gravure ink | Isoindoline compound | Stability over time | Transparency |
|---|---|---|---|---|
| Example H-1 | Gravure ink 1 | (1-1) | 4 | 5 |
| Example H-2 | Gravure ink 2 | (1-2) | 4 | 3 |
| Example H-3 | Gravure ink 3 | (1-3) | 3 | 5 |
| Example H-4 | Gravure ink 4 | (1-4) | 5 | 4 |
| Example H-5 | Gravure ink 5 | (1-5) | 5 | 5 |
| Example H-6 | Gravure ink 6 | (1-6) | 5 | 4 |
| Example H-7 | Gravure ink 7 | (1-7) | 4 | 5 |
| Example H-8 | Gravure ink 8 | (1-10) | 5 | 5 |
| Example H-9 | Gravure ink 9 | (1-11) | 5 | 5 |
| Example H-10 | Gravure ink 10 | (1-12) | 5 | 5 |
| Example H-11 | Gravure ink 11 | (1-13) | 5 | 4 |
| Comparative Example H-1 | Gravure ink 12 | (1-8) | 2 | 3 |
| Example H-12 | Gravure ink 13 | (2-1) | 4 | 5 |
| Example H-13 | Gravure ink 14 | (2-2) | 5 | 4 |
| Example H-14 | Gravure ink 15 | (2-5) | 5 | 5 |
| Comparative Example H-2 | Gravure ink 16 | (2-3) | 2 | 3 |
| Example H-15 | Gravure ink 17 | (3-1) | 4 | 5 |
| Example H-16 | Gravure ink 18 | (3-2) | 4 | 4 |
| Example H-17 | Gravure ink 19 | (3-5) | 5 | 5 |
| Comparative Example H-3 | Gravure ink 20 | (3-3) | 1 | 3 |

<Scratch Resistance>

Three sites on the surface of a printed layer were scratched with a nail using printed articles I1-1 to I20-1 (OPP) and printed articles I1-2 to I20-2 (CPP), and the degrees of damage of the printed layer were evaluated.

(Evaluation References)

5. The printed layer is not damaged (favorable).
4. The printed layer is not damaged, but a nail mark slightly remains (practically available).
3. The printed layer is damaged, and the surface of the printed layer is slightly concaved (slightly poor).
2. The printed layer is damaged, and the base material is slightly visible (poor).
1. The printed layer is damaged, and the base material is clearly visible (extremely poor).

5 to 4 is a range where there is no practical problem.

<Adhesiveness>

For each of printed articles I1-1 to I20-1 (OPP) and printed articles I1-2 to I20-2 (CPP), 12 mm-wide pressure-sensitive adhesive tape (cellophane tape manufactured by Nichiban Co., Ltd.) was stuck to the printed surface after three hours from printing and rapidly peeled off, and the appearance state of the printed surface at that time was visually determined. Determination references were as described below.

(Evaluation References)

5. The ink coating on the printed surface does not peel off (favorable).
4. The peel area of the ink coating is 1% or more and less than 5% (practically available).
3. The peel area of the ink coating is 5% or more and less than 20% (slightly poor).
2. The peel area of the ink coating is 20% or more and less than 50% (poor).
1. 50% or more of the ink coating peels off (extremely poor).

5 to 4 is a range where there is no practical problem.

TABLE 12

| | Printed article | Film | Scratch resistance | Adhesiveness |
|---|---|---|---|---|
| Example I-1 | Printed article I1-1 | OPP | 5 | 5 |
| | Printed article I1-2 | CPP | 5 | 4 |
| Example I-2 | Printed article I2-1 | OPP | 4 | 3 |
| | Printed article I2-2 | CPP | 4 | 4 |
| Example I-3 | Printed article I3-1 | OPP | 4 | 4 |
| | Printed article I3-2 | CPP | 4 | 4 |
| Example I-4 | Printed article I4-1 | OPP | 5 | 5 |
| | Printed article I4-2 | CPP | 5 | 5 |
| Example I-5 | Printed article I5-1 | OPP | 5 | 5 |
| | Printed article I5-2 | CPP | 5 | 5 |
| Example I-6 | Printed article I6-1 | OPP | 5 | 5 |
| | Printed article I6-2 | CPP | 5 | 4 |
| Example I-7 | Printed article I7-1 | OPP | 4 | 4 |
| | Printed article I7-2 | CPP | 4 | 4 |
| Example I-8 | Printed article I8-1 | OPP | 5 | 5 |
| | Printed article I8-2 | CPP | 5 | 5 |
| Example I-9 | Printed article I9-1 | OPP | 5 | 5 |
| | Printed article I9-2 | CPP | 5 | 5 |
| Example I-10 | Printed article I10-1 | OPP | 5 | 5 |
| | Printed article I10-2 | CPP | 5 | 4 |
| Example I-11 | Printed article I11-1 | OPP | 5 | 4 |
| | Printed article I11-2 | CPP | 5 | 4 |
| Comparative | Printed article I12-1 | OPP | 3 | 3 |
| Example I-1 | Printed article I12-2 | CPP | 3 | 3 |
| Example I-12 | Printed article I13-1 | OPP | 4 | 4 |
| | Printed article I13-2 | CPP | 4 | 4 |
| Example I-13 | Printed article I14-1 | OPP | 5 | 5 |
| | Printed article I14-2 | CPP | 5 | 5 |
| Example I-14 | Printed article I15-1 | OPP | 5 | 5 |
| | Printed article I15-2 | CPP | 5 | 5 |
| Comparative | Printed article I16-1 | OPP | 3 | 3 |
| Example I-2 | Printed article I16-2 | CPP | 3 | 3 |
| Example I-15 | Printed article I17-1 | OPP | 4 | 4 |
| | Printed article I17-2 | CPP | 4 | 4 |
| Example I-16 | Printed article I18-1 | OPP | 5 | 5 |
| | Printed article I18-2 | CPP | 5 | 4 |
| Example I-17 | Printed article I19-1 | OPP | 5 | 5 |
| | Printed article I19-2 | CPP | 4 | 5 |
| Comparative | Printed article I20-1 | OPP | 2 | 2 |
| Example I-3 | Printed article I20-2 | CPP | 3 | 2 |

<7> Evaluation of Aqueous Inkjet Ink

<7-1> Preparation of Aqueous Coloring Composition for Inkjet (Hereinafter, "Aqueous Coloring Composition for IJ")

(Example J-1) Preparation of Aqueous Coloring Composition for IJ 1

Isoindoline compound (1-1): 19.0 parts

Styrene-acrylic acid copolymer (JONCRYL 61J manufactured by BASF Japan Ltd.): 16.4 parts Surfactant (EMULGEN 420 manufactured by Kao Corporation): 5.0 parts Ion exchange water: 59.6 parts and 200 parts of zirconia beads having a diameter of 1.25 mm were charged into a 200 ml glass bottle and dispersed with a paint shaker manufactured by Red Devil, Inc. for six hours. The obtained liquid was diluted with ion exchange water, zirconia beads for dispersion were filtered and separated, and the liquid was diluted with ion exchange water such that the coloring agent content became 15%, thereby obtaining aqueous coloring composition for IJ 1 of isoindoline compound (1-1).

Examples J-2 to J-17 and Comparative Examples J-1 to J-3) Preparation of Aqueous Coloring Compositions for IJ 2 to 20

Aqueous coloring compositions for IJ 2 to 20 were obtained in the same manner as in Example J-1 except that, in the method for preparing aqueous coloring compositions for IJ 1 described in Example J-1, isoindoline compound 1-1 was changed as shown in Table 13, respectively.

(Example J-18) Preparation of Aqueous Coloring Composition for IJ 21

Aqueous coloring compositions for IJ 21 was obtained in the same manner as in Example J-1 except that, in the method for preparing aqueous coloring compositions for IJ 1 described in Example J-1, isoindoline compound 1-1: 19 parts was changed to isoindoline compound 1-8: 17.1 parts and isoindoline compound 1-9: 1.9 parts.

(Synthesis Example 2) Styrene-Acrylic Acid Ester-Methacrylic Acid Ester Copolymer Having Carboxyl Group and Hydroxyl Group [PA1]

1,000 Parts of methyl ethyl ketone was charged into a 3-liter four-neck flask including a dropping funnel, a thermometer, a nitrogen gas introduction tube, a stirrer, and a reflux condense tube and heated up to 78° C., then, a liquid mixture composed of 100 parts of styrene, 538 parts of n-butyl methacrylate, 104 parts of n-butyl acrylate, 150 parts of 2-hydroxyethyl methacrylate, 108 parts of methacrylic acid, and 80 parts of tertiary-butyl peroxy-2-ethylhexanoate was added dropwise for four hours and reacted at the same temperature for eight hours. After the end of the reaction, methyl ethyl ketone was further added thereto, and adjustment was made such that a non-volatile component became 50%, thereby obtaining styrene-acrylic acid ester-methacrylic acid ester copolymer [PA1] solution having an acid value of 70 mgKOH/g and a number-average molecular weight of 6,000. The acid value is a value measured by the same method as for the resin in the gravure printing ink, and the number-average molecular weight is a polystyrene-equivalent value measured with the same device and by the same method as in the case of the weight-average molecular weight of the resin in the gravure printing ink.

(Example J-19) Preparation of Aqueous Coloring Composition for IJ 22

12.8 Parts of a styrene-acrylic acid ester-methacrylic acid ester copolymer [PA1] solution (50% of non-volatile component) was neutralized using 0.71 parts of dimethylethanolamine and then mixed with 2.29 parts of a methyl etherized melamine resin (NIKALAC MX-041 manufactured by Sanwa Chemical Co. Ltd.) (1.6 parts as the resin). 50 Parts of an aqueous slurry (16% of non-volatile component) of isoindoline compound (1-2) produced in advance was added into this solution mixture under stirring. Next, the solution mixture was charged into a 250 ml glass bottle together with 130 parts of glass beads having a diameter of 1.5 mm and dispersed using a paint shaker manufactured by Red Devil, Inc. for four hours, a dispersion liquid was obtained, and then the same amount of ion exchange water as the mixture was added thereto. After that, a 1 N hydrochloric acid aqueous solution was added thereto under stirring, and copolymer [PA1] was precipitated on and fixed to the surface of isoindoline compound (1-2). After the fixation, the pH of the solution mixture was 3 to 5.

After that, the solution mixture was suction-filtered and washed with ion exchange water until the pH of the washing liquid became higher than six, thereby obtaining isoindoline compound (1-2) to which copolymer [PA1] was fixed.

Next, water was added thereto until isoindoline compound (1-2) to which copolymer [PA1] was fixed became fluid, 0.8 parts of dimethylethanolamine was added thereto under stirring with a stirrer, and the stirring was continued for one hour, thereby obtaining a redispersion element of isoindoline compound (1-2) to which copolymer [PA1] was fixed.

Water was added to this redispersion element such that the non-volatile component was adjusted to 19%, then, 0.5% of an acid crosslinking catalyst (NACURE 2500X manufactured by Kusumoto Chemicals, Ltd.) with respect to the amount of copolymer [PA1] that was contained in the redispersion element was added thereto, and a crosslinking reaction was performed at 95° C. for one hour, thereby obtaining a water-based coloring composition containing pigment composition-containing crosslinked resin particles (aqueous coloring composition for IJ 22).

(Synthesis Example 3) Styrene-Acrylic Acid Ester-Methacrylic Acid Ester Copolymer Having Carboxyl Group and Epoxy Group [PA2]

1,000 Parts of methyl ethyl ketone was charged into a 3-liter four-neck flask including a dropping funnel, a thermometer, a nitrogen gas introduction tube, a stirrer, and a reflux condense tube and heated up to 78° C., then, a liquid mixture composed of 100 parts of styrene, 476 parts of n-butyl methacrylate, 116 parts of n-butyl acrylate, 150 parts of 2-hydroxyethyl methacrylate, 50 parts of glycidyl methacrylate, 108 parts of methacrylic acid, and 80 parts of tertiary-butyl peroxy-2-ethylhexanoate was added dropwise for four hours and reacted at the same temperature for eight hours. After the end of the reaction, methyl ethyl ketone was further added thereto, and adjustment was made such that a non-volatile component became 50%, thereby obtaining styrene-acrylic acid ester-methacrylic acid ester copolymer [PA2] solution having an acid value of 70 mgKOH/g and a number-average molecular weight of 10,500.

(Example J-20) Preparation of Aqueous Coloring Composition for IJ 23

16 Parts of a solution of the obtained styrene-acrylic acid ester-methacrylic acid ester copolymer [PA2] (50% of non-volatile component), 8 parts of isoindoline compound (1-2), and 40 parts of methyl ethyl ketone were charged into a 250 ml glass bottle together with 130 parts of glass beads having a diameter of 1.5 mm and dispersed using a paint shaker manufactured by Red Devil, Inc. for four hours, thereby obtaining a dispersion liquid. Next, 0.8 parts of a hydrophilic epoxy resin (CR-5L manufactured by DIC Corporation) and 24 parts of methyl ethyl ketone were added to and stirred in this dispersion liquid, and then the glass beads were filtered and separated. 87.2 Parts of the dispersion liquid obtained as described above was injected under stirring into a liquid mixture of 1.2 parts of dimethylethanolamine and 100 parts of water, and then the same amount of ion exchange water as the mixture was added. After that, a 1 N phosphoric acid aqueous solution was added thereto under stirring, and copolymer [PA2] was precipitated on and fixed to the surface of isoindoline compound (1-2). After the fixation, the pH of the solution mixture was 5.

After that, the solution mixture was suction-filtered and washed with ion exchange water until the pH of the washing liquid became higher than six, thereby obtaining isoindoline compound (1-2) to which copolymer [PA2] was fixed.

Next, water was added thereto until isoindoline compound (1-2) to which copolymer [PA2] was fixed became fluid, 0.8 parts of dimethylethanolamine was added thereto under stirring with a stirrer, and the stirring was continued for one hour, thereby obtaining a redispersion element of isoindoline compound (1-2) to which copolymer [PA2] was fixed.

Water was added to this redispersion element such that the non-volatile component was adjusted to 19%, then, the redispersion element was heated to 95° C. to perform a crosslinking reaction for one hour, thereby obtaining a water-based coloring composition containing pigment composition-containing crosslinked resin particles (aqueous coloring composition for IJ 23).

(Synthesis Example 4) Styrene-Acrylic Acid Ester Copolymer [PA3]

62 Parts of acrylic acid, 129 parts of styrene, and 9 parts of α-methylstyrene were mixed to prepare a monomer liquid mixture. 20 Parts of methyl ethyl ketone, 0.3 parts of 2-mercaptoethanol (polymerization chain transfer agent), and 10% of the monomer liquid mixture were put and mixed in a reaction container, and nitrogen gas substitution was sufficiently performed. In addition, separately, a liquid mixture of the remaining 90% of the monomer liquid mixture, 0.27 parts of the polymerization chain transfer agent, 60 parts of methyl ethyl ketone, and 2.2 parts of an azo-based radical polymerization initiator (V-65 manufactured by Wako Pure Chemical Industries, Ltd., 2,2'-azobis(2,4-dimethylvaleronitrile)) was charged into a dropping funnel.

The mixture in the reaction container was heated up to 65° C. under stirring in a nitrogen atmosphere, and then the mixture in the dropping funnel was added dropwise for three hours. After the end of the dropwise addition, the mixtures were reacted at 65° C. for one hour, then, furthermore, a solution of 0.3 parts of the polymerization initiator dissolved in 5 parts of methyl ethyl ketone was added thereto, and the reaction was continued at 65° C. for one hour. After the addition of the polymerization initiator solution and the continuation of the reaction were performed two more times, the reaction product was heated to 70° C. and further reacted for one hour, and then 200 parts of methyl ethyl ketone was added thereto, thereby obtaining a styrene-acrylic acid ester copolymer [PA3] solution (non-volatile component concentration of 40.9%) having an acid value of 240 mgKOH/g, a number-average molecular weight of 5,700, and a weight-average molecular weight of 12,500.

This styrene-acrylic acid ester copolymer [PA3] solution was dried under reduced pressure, the solvent was completely removed to obtain 32 parts of a resin, then, the resin was mixed with 204 parts of ion exchange water, furthermore, 11.1 parts of triethanolamine was added thereto, and approximately 55 mol % of carboxy groups in copolymer [PA3] were neutralized. This solution mixture was heated up to 90° C. and then stirred for one hour, thereby obtaining a water dispersion liquid of copolymer [PA3] in which copolymer [PA3] was dispersed in water.

(Example J-21) Preparation of Aqueous Coloring Composition for IJ 24

After the water dispersion liquid of copolymer [PA3] was cooled to room temperature, 100 parts of isoindoline compound (1-2) was added thereto and stirred at 20° C. for three hours using a stirrer. 124 Parts of ion exchange water was added to this solution mixture, and then 15 passes of a dispersion treatment was performed at a pressure of 150 MPa using a microfluidizer. Next, the obtained dispersion liquid was centrifugally separated at a set temperature of 20° C. and 3,660 rpm for 20 minutes using a high-speed centrifuge (HIMAC CR22G manufactured by Hitachi Koki Co., Ltd.), then, only a liquid layer portion was collected, and furthermore, filtration was performed with a membrane filter having a pore diameter of 5 μm, thereby obtaining a water dispersion liquid of isoindoline compound (1-2) (non-volatile component concentration of 25%).

32 Parts of ion exchange water was added to 100 parts of the water dispersion liquid of isoindoline compound (1-2), furthermore, 1.8 parts of trimethylolpropane polyglycidyl ether (DENACOL EX-321 manufactured by Nagase ChemteX Corporation), and the components were heated at 70° C. for five hours under stirring. After that, the components were cooled to room temperature and filtered with the membrane filter having a pore diameter of 5 μm, and furthermore, ion exchange water was added thereto to adjust the non-volatile component to become 19%, thereby obtaining a water-based coloring composition containing pigment composition-containing crosslinked resin particles (aqueous coloring composition for IJ 24).

TABLE 13

| | Aqueous coloring composition for IJ | Isoindoline compound |
|---|---|---|
| Example J-1 | Aqueous coloring composition for IJ 1 | (1-1) |
| Example J-2 | Aqueous coloring composition for IJ 2 | (1-2) |
| Example J-3 | Aqueous coloring composition for IJ 3 | (1-3) |
| Example J-4 | Aqueous coloring composition for IJ 4 | (1-4) |
| Example J-5 | Aqueous coloring composition for IJ 5 | (1-5) |
| Example J-6 | Aqueous coloring composition for IJ 6 | (1-6) |
| Example J-7 | Aqueous coloring composition for IJ 7 | (1-7) |
| Example J-8 | Aqueous coloring composition for IJ 8 | (1-10) |
| Example J-9 | Aqueous coloring composition for IJ 9 | (1-11) |
| Example J-10 | Aqueous coloring composition for IJ 10 | (1-12) |
| Example J-11 | Aqueous coloring composition for IJ 11 | (1-13) |
| Comparative Example J-1 | Aqueous coloring composition for IJ 12 | (1-8) |
| Example J-12 | Aqueous coloring composition for IJ 13 | (2-1) |
| Example J-13 | Aqueous coloring composition for IJ 14 | (2-2) |
| Example J-14 | Aqueous coloring composition for IJ 15 | (2-5) |
| Comparative Example J-2 | Aqueous coloring composition for IJ 16 | (2-3) |
| Example J-15 | Aqueous coloring composition for IJ 17 | (3-1) |
| Example J-16 | Aqueous coloring composition for IJ 18 | (3-2) |
| Example J-17 | Aqueous coloring composition for IJ 19 | (3-5) |
| Comparative Example J-3 | Aqueous coloring composition for IJ 20 | (3-3) |
| Example J-18 | Aqueous coloring composition for IJ 21 | (1-8) + (1-9) |
| Example J-19 | Aqueous coloring composition for IJ 22 | (1-2) |
| Example J-20 | Aqueous coloring composition for IJ 23 | (1-2) |
| Example J-21 | Aqueous coloring composition for IJ 24 | (1-2) |

<7-1> Preparation of Aqueous Inkjet Ink (Hereinafter, "Aqueous IJ Ink")

Individual components shown in Table 14 and Table 15 were stirred and mixed and then filtered with a 3 μm membrane filter, thereby obtaining aqueous IJ inks of Examples K-1 to K-23 and Comparative Examples K-1 to K-5 for evaluation tests. In Table 14 and Table 15, numerical values indicating the amounts of the components are all the number of "parts", and "-" means that the corresponding component is not contained. In addition, as "water", ion exchange water was used. Additionally, abbreviations in the tables indicate meanings below.

PG: Propylene glycol

TEA: Triethanolamine

AMP: 2-Amino-2-methyl-1propanol $NH_3$ 28% aq: 28% ammonia aqueous solution

<Color Change During Long-Term Storage>

The aqueous IJ ink produced in each of the examples and the comparative examples was loaded into a mayonnaise bottle and stored in a 50° C. oven for four weeks. Each ink was applied to an OK top coat in a wet film thickness of 6 μm using a K control coater manufactured by Matsuo Sangyo Co., Ltd. before and after the storage, the coated products were dried in a 70° C. oven for one minute, thereby producing coated products.

Calculation of Color Difference (ΔE Value) Before and After Storage:

The L*, a*, b* values of the ink-coated films before and after long-term storage were measured using the obtained coated products and X-Rite eXact manufactured by X-Rite, Incorporated. Color differences (ΔE values) before and after storage were calculated from the numerical values and evaluated. The evaluation references "4", "3", and "2" below are practically available qualities.

(Evaluation References)

4: The color difference (ΔE value) is less than 2.

3: The color difference (ΔE value) is 2 or more and less than 3.

2: The color difference (ΔE value) is 3 or more and less than 5.

1: The color difference (ΔE value) is 5 or more.

TABLE 14

| | | Example K-1 | Example K-2 | Example K-3 | Example K-4 | Example K-5 | Example K-6 | Example K-7 |
|---|---|---|---|---|---|---|---|---|
| Aqueous | 1 | 26.67 | — | — | — | — | — | — |
| coloring | 2 | — | 26.67 | — | — | — | — | — |
| composition | 3 | — | — | 26.67 | — | — | — | — |
| for IJ | 4 | — | — | — | 26.67 | 26.67 | 26.67 | — |
| | 5 | — | — | — | — | — | — | 26.67 |
| | 6 | — | — | — | — | — | — | — |
| | 7 | — | — | — | — | — | — | — |
| | 8 | — | — | — | — | — | — | — |
| | 9 | — | — | — | — | — | — | — |
| | 10 | — | — | — | — | — | — | — |
| | 11 | — | — | — | — | — | — | — |
| PG | | 25.00 | 25.00 | 25.00 | 25.00 | 25.00 | 25.00 | 25.00 |
| TEA | | — | — | — | 1.00 | — | — | — |
| AMP | | 1.00 | 1.00 | 1.00 | — | 1.00 | — | 1.00 |
| $NH_3$ 28% aq | | — | — | — | — | — | 1.00 | — |
| Water | | Remaining amount | Remaining amount | Remaining amount | Remaining amount | Remaining amount | Remaining amount | Remaining amount |
| Total | | 100 | 100 | 100 | 100 | 100 | 100 | 100 |
| Ink pH value | | 10.5 | 10.5 | 10.5 | 7.8 | 10.5 | 12.1 | 10.5 |
| Color change (ΔE value) | | 3 | 2 | 4 | 4 | 4 | 4 | 4 |

| | | Example K-8 | Example K-9 | Example K-10 | Example K-11 | Example K-12 | Example K-13 |
|---|---|---|---|---|---|---|---|
| Aqueous | 1 | — | — | — | — | — | — |
| coloring | 2 | — | — | — | — | — | — |
| composition | 3 | — | — | — | — | — | — |
| for IJ | 4 | — | — | — | — | — | — |
| | 5 | — | — | — | — | — | — |
| | 6 | 26.67 | — | — | — | — | — |
| | 7 | — | 26.67 | — | — | — | — |
| | 8 | — | — | 26.67 | — | — | — |
| | 9 | — | — | — | 26.67 | — | — |
| | 10 | — | — | — | — | 26.67 | — |
| | 11 | — | — | — | — | — | 26.67 |
| PG | | 25.00 | 25.00 | 25.00 | 25.00 | 25.00 | 25.00 |
| TEA | | — | — | — | — | — | — |
| AMP | | 1.00 | 1.00 | 1.00 | 1.00 | 1.00 | 1.00 |
| $NH_3$ 28% aq | | — | — | — | — | — | — |
| Water | | Remaining amount | Remaining amount | Remaining amount | Remaining amount | Remaining amount | Remaining amount |
| Total | | 100 | 100 | 100 | 100 | 100 | 100 |
| Ink pH value | | 10.5 | 10.5 | 10.5 | 10.5 | 6.5 | 7.8 |
| Color change (ΔE value) | | 4 | 3 | 4 | 4 | 4 | 4 |

| | | Comparative Example K-1 | Comparative Example K-2 | Comparative Example K-3 | Example K-14 | Example K-15 | Example K-16 |
|---|---|---|---|---|---|---|---|
| Aqueous | 12 | 26.67 | 26.67 | 26.67 | — | — | — |
| coloring | 13 | — | — | — | 26.67 | — | — |

TABLE 14-continued

| | | | | | | | |
|---|---|---|---|---|---|---|---|
| composition | 14 | — | — | — | — | 26.67 | — |
| for IJ | 15 | — | — | — | — | — | 26.67 |
| | 16 | — | — | — | — | — | — |
| | 17 | — | — | — | — | — | — |
| | 18 | — | — | — | — | — | — |
| | 19 | — | — | — | — | — | — |
| | 20 | — | — | — | — | — | — |
| | 21 | — | — | — | — | — | — |
| PG | | 25.00 | 25.00 | 25.00 | 25.00 | 25.00 | 25.00 |
| TEA | | 1.00 | — | — | — | — | — |
| AMP | | — | 1.00 | — | 1.00 | 1.00 | 1.00 |
| $NH_3$ 28% aq | | — | — | 1.00 | — | — | — |
| Water | | Remaining amount | Remaining amount | Remaining amount | Remaining amount | Remaining amount | Remaining amount |
| Total | | 100 | 100 | 100 | 100 | 100 | 100 |
| Ink pH value | | 7.8 | 10.5 | 12.1 | 10.5 | 10.5 | 10.5 |
| Color change (ΔE value) | | 1 | 1 | 1 | 3 | 4 | 4 |

| | | Comparative Example K-4 | Example K-17 | Example K-18 | Example K-19 | Comparative Example K-5 | Example K-20 |
|---|---|---|---|---|---|---|---|
| Aqueous | 12 | — | — | — | — | — | — |
| coloring | 13 | — | — | — | — | — | — |
| composition | 14 | — | — | — | — | — | — |
| for IJ | 15 | — | — | — | — | — | — |
| | 16 | 26.67 | — | — | — | — | — |
| | 17 | — | 26.67 | — | — | — | — |
| | 18 | — | — | 26.67 | — | — | — |
| | 19 | — | — | — | 26.67 | — | — |
| | 20 | — | — | — | — | 26.67 | — |
| | 21 | — | — | — | — | — | 26.67 |
| PG | | 25.00 | 25.00 | 25.00 | 25.00 | 25.00 | 25.00 |
| TEA | | — | — | — | — | — | — |
| AMP | | 1.00 | 1.00 | 1.00 | 1.00 | 1.00 | 1.00 |
| $NH_3$ 28% aq | | — | — | — | — | — | — |
| Water | | Remaining amount | Remaining amount | Remaining amount | Remaining amount | Remaining amount | Remaining amount |
| Total | | 100 | 100 | 100 | 100 | 100 | 100 |
| Ink pH value | | 10.5 | 10.5 | 10.5 | 10.5 | 10.5 | 10.5 |
| Color change (ΔE value) | | 1 | 3 | 4 | 4 | 1 | 2 |

TABLE 15

| | | Example K-2 | Example K-21 | Example K-22 | Example K-23 |
|---|---|---|---|---|---|
| Aqueous coloring | 2 | 26.67 | — | — | — |
| composition for IJ | 22 | — | 26.67 | — | — |
| | 23 | — | — | 26.67 | — |
| | 24 | — | — | — | 26.67 |
| PG | | 25.00 | 25.00 | 25.00 | 25.00 |
| TEA | | — | — | — | 1.00 |
| AMP | | 1.00 | 1.00 | 1.00 | — |
| $NH_3$ 28% aq | | — | — | — | — |
| Water | | Remaining amount | Remaining amount | Remaining amount | Remaining amount |
| Total | | 100 | 100 | 100 | 100 |
| Ink pH value | | 10.5 | 10.5 | 10.5 | 10.5 |
| Color change (ΔE value) | | 2 | 4 | 4 | 4 |

From the above results, the effects of the pigment compositions containing isoindoline compound (1) and isoindoline compound (2) are found. For example, from the results of Table 4, compositions for molding enabling the formation of compacts having outstanding heat resistance can be obtained. In addition, from the results of the toners, toners having outstanding pigment dispersion characteristics can be obtained. In addition, from the results of the paints, paints having outstanding weather resistance were obtained. In particular, discoloration can be minimized. In addition, from the results of the gravure printing inks, it is found that printing inks having outstanding viscosity change and transparency and outstanding scratch resistance and adhesiveness even in printed articles can be obtained. In addition, from the results of the water-based coloring compositions, it is found that the initial viscosity and the storage stability can be improved. Furthermore, from the results of the aqueous inkjet inks, improvement in the pH resistance to color materials is confirmed, and it is found that inkjet inks capable of minimizing the color change of ink-coated films during long-term storage can be obtained. Particularly, it is possible to confirm that the use as pigment composition-containing crosslinked resin particles makes it possible to further improve the pH resistance.

<Ink Set and Characteristic Evaluation>

Ink sets were prepared using the obtained isoindoline compounds, and the characteristics were evaluated.

(Synthesis Example 5) Polyurethane Resin Solution [PU2]

54.719 Parts of a polyester diol having a number-average molecular weight of 2,000 that was obtained from adipic acid and 3-methyl-1,5-pentanediol, 3.989 parts of isophorone diisocyanate, and 10.0 parts of n-propyl acetate were reacted at 85° C. in a nitrogen stream for three hours, 10.0 parts of n-propyl acetate was added thereto, and the reaction product was cooled, thereby obtaining 78.718 parts of a solvent solution of a terminated isocyanate prepolymer.

Next, 78.718 parts of the obtained solvent solution of a terminated isocyanate prepolymer was slowly added at room temperature to a mixture of 1.031 parts of isophoronediamine, 0.261 parts of di-n-butylamine, 30.4 parts of n-propyl acetate, and 19.6 parts of isopropyl alcohol and then reacted at 50° C. for one hour, thereby obtaining a polyurethane resin solution [PU2] containing 30% of a non-volatile component and having a weight-average molecular weight of 60,000 and an amine value of 3.0 mgKOH/g.

(Synthesis Example 6) Polyurethane Resin Solution [PU3]

161.9 Parts of PPA (poly(propylene glycol) adipate diol having a number-average molecular weight of 2,000), 27.7 parts of 2,2-dimethylolbutanoic acid (DMBA), 96.4 parts of isophorone diisocyanate (IPDI), and 200 parts of methyl ethyl ketone (MEK) were charged into a reactor including a reflux condense tube, a dropping funnel, a gas introduction tube, a stirring device, and a thermometer under the introduction of nitrogen gas and reacted at 90° C. for five hours, thereby obtaining a resin solution of an urethane prepolymer having a terminated isocyanate group. A mixture of 13.6 parts of 2-(2-aminoethylamino)ethanol (AEA), 0.5 parts of ethanolamine (MEA), and 350 parts of isopropyl alcohol (IPA) was added dropwise at room temperature to the obtained terminated isocyanate group urethane prepolymer resin solution for 60 minutes and further reacted at 70° C. for three hours. Furthermore, the non-volatile component was adjusted using 150 parts of MEK, thereby obtaining a polyurethane resin solution [PU3] containing 30% of a non-volatile component and having a weight-average molecular weight of 35,000, Mw/Mn of 3.0, an acid value of 35.0 mgKOH/g, and a hydroxyl value of 25.7 mgKOH/g.

(Synthesis Example 7) Aluminum Phthalocyanine

1250 Parts of n-amyl alcohol, 225 parts of phthalodinitrile, and 78 parts of anhydrous aluminum chloride were added to a reaction container and mixed and stirred. 266 Parts of DBU (1,8-diazabicyclo[5.4.0]undec-7-ene) was added thereto, heated, and refluxed at 136° C. for five hours. The reaction solution cooled to 30° C. while remaining stirred was injected into a solvent mixture composed of 5000 parts of methanol and 10000 parts of water under stirring, thereby obtaining a blue slurry. This slurry was filtered, washed with a solvent mixture composed of 2000 parts of methanol and 4000 parts of water, and dried, thereby obtaining 135 parts of chloroaluminum phthalocyanine represented by chemical formula (32) below.

[Chem. 15]

(32)

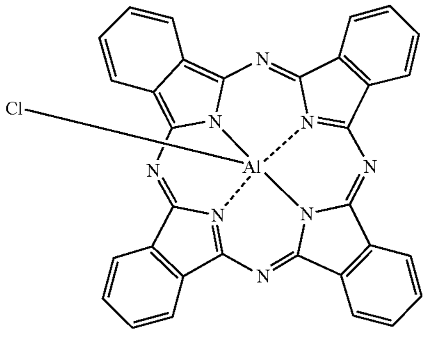

Next, 1500 parts of concentrated sulfuric acid was added to the reaction container, then, 100 parts of the chloroaluminum phthalocyanine was added thereto under an ice bath, and stirring was performed at 25° C. for four hours. Subsequently, this sulfuric acid solution was injected into 9000 parts of ice water (3° C.), and the generated precipitate was sequentially treated by filtration, washing with water, washing with a 10% sodium hydroxide aqueous solution, and washing with water and dried, thereby obtaining 98 parts of aluminum phthalocyanine represented by chemical formula (30) below.

[Chem. 16]

(30)

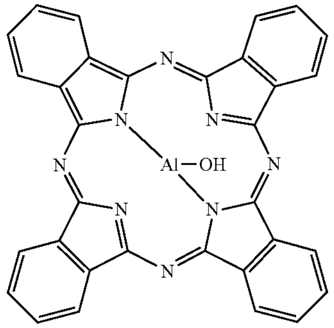

(Synthesis Example 8) 1280 Parts of 1-hexanol, 320 parts of quinoline, 320 parts of 1,3-diimionisoindoline, and 206.3 parts of tetrabutyl orthotitanate were added to a titanyl phthalocyanine reaction container and mixed and stirred. The components were heated up to 155° C. and refluxed for eight hours. n-Butanol generated from the inside of the system was collected so as not to return to the inside of the system. 1000 Parts of methanol was added to the reaction container cooled to 60° C. while remaining stirred, and a slurry was filtered, washed with 1000 parts of methanol, 500 parts of N-methyl pyrrolidone, and 1000 parts of methanol in order and dried, thereby obtaining 250 parts of titanyl phthalocyanine crude represented by chemical formula (31) below.

[Chem. 17]

(31)

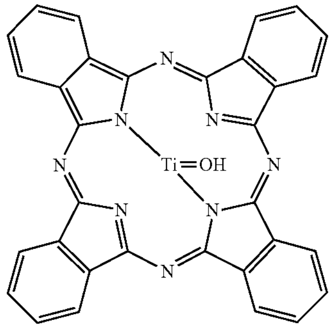

Next, 1500 parts of concentrated sulfuric acid was added to the reaction container, then, 100 parts of the titanyl phthalocyanine crude was added thereto under an ice bath, and stirring was performed at 25° C. for four hours. Subsequently, this sulfuric acid solution was injected into 9000 parts of ice water (3° C.), and the generated precipitate was sequentially treated by filtration, washing with water, washing with a 10% sodium hydroxide aqueous solution, and washing with water, thereby obtaining a cake. Next, 1000 parts of diethylene glycol and the obtained cake were added to the reaction container and stirred to produce a slurry, and stirring was performed at 120° C. for three hours. The slurry cooled to 60° C. was filtered, washed with 5000 parts of water, and dried, thereby obtaining 87 parts of titanyl phthalocyanine.

[Manufacturing of Gravure Printing Ink]

(Example LY-1)

7.0 Parts of isoindoline compound (1-1), 34.5 parts of polyurethane resin solution [PU2], 20 parts of n-propyl acetate, and 5 parts of isopropyl alcohol were stirred, mixed, and milled with a sand mill, and then 20 parts of polyurethane resin solution [PU2], 11 parts of n-propyl acetate, and 3 parts of isopropyl alcohol were added thereto, obtaining yellow ink [LY-1].

Examples LY-2 to LY-15 and Manufacturing Examples LY-1 and LY-2, LC-1 to LC-5, and LM-1 to LM-10

Inks shown in Table 16 were obtained in the same manner as in Example LY-1 except that 7.0 parts of isoindoline compound (1-1) was changed to compounds shown in Table 16 and amounts shown in Table 16.

TABLE 16

| | Pigment | | |
|---|---|---|---|
| | Compound name pigment name | Amount charged [parts] | Obtained ink |
| Example LY-1 | Isoindoline compound (1-1) | 7.00 | Yellow ink [LY-1] |
| Example LY-2 | Isoindoline compound (1-2) | 7.00 | Yellow ink [LY-2] |
| Example LY-3 | Isoindoline compound (1-3) | 7.00 | Yellow ink [LY-3] |
| Example LY-4 | Isoindoline compound (1-4) | 7.00 | Yellow ink [LY-4] |
| Example LY-5 | Isoindoline compound (1-5) | 7.00 | Yellow ink [LY-5] |
| Example LY-6 | Isoindoline compound (1-6) | 7.00 | Yellow ink [LY-6] |
| Example LY-7 | Isoindoline compound (1-7) | 7.00 | Yellow ink [LY-7] |
| Example LY-8 | Isoindoline compound (1-10) | 7.00 | Yellow ink [LY-8] |
| Example LY-9 | Isoindoline compound (1-11) | 7.00 | Yellow ink [LY-9] |
| Example LY-10 | Isoindoline compound (1-12) | 7.00 | Yellow ink [LY-10] |
| Example LY-11 | Isoindoline compound (1-13) | 7.00 | Yellow ink [LY-11] |
| Example LY-12 | Isoindoline compound (1-8) | 6.30 | Yellow ink [LY-12] |
| | Isoindoline compound (1-9) | 0.70 | |
| Manufacturing Example LY-1 | Isoindoline compound (1-8) | 7.00 | Yellow ink [LY-13] |
| Example LY-13 | Isoindoline compound (2-1) | 7.00 | Yellow ink [LY-14] |
| Example LY-14 | Isoindoline compound (2-2) | 7.00 | Yellow ink [LY-15] |
| Example LY-15 | Isoindoline compound (2-5) | 7.00 | Yellow ink [LY-16] |
| Manufacturing Example LY-2 | Isoindoline compound (2-3) | 7.00 | Yellow ink [LY-17] |
| Manufacturing Example LC-1 | PB15:3 | 6.50 | Cyan ink [LC-1] |
| Manufacturing Example LC-2 | PB15:4 | 6.50 | Cyan ink [LC-2] |
| Manufacturing Example LC-3 | PB16 | 7.00 | Cyan ink [LC-3] |
| Manufacturing Example LC-4 | Aluminum phthalocyanine | 7.00 | Cyan ink [LC-4] |
| Manufacturing Example LC-5 | Titanyl phthalocyanine | 7.00 | Cyan ink [LC-5] |
| Manufacturing Example LM-1 | PR122 | 7.40 | Magenta ink [LM-1] |
| Manufacturing Example LM-2 | PV19 | 7.40 | Magenta ink [LM-2] |
| Manufacturing Example LM-3 | PR48:3 | 7.00 | Magenta ink [LM-3] |
| Manufacturing Example LM-4 | PR57:1 | 7.00 | Magenta ink [LM-4] |
| Manufacturing Example LM-5 | PR146 | 7.00 | Magenta ink [LM-5] |
| Manufacturing Example LM-6 | PR185 | 7.00 | Magenta ink [LM-6] |
| Manufacturing Example LM-7 | PR144 | 7.10 | Magenta ink [LM-7] |
| Manufacturing Example LM-8 | PR179 | 7.20 | Magenta ink [LM-8] |
| Manufacturing Example LM-9 | PR255 | 7.00 | Magenta ink [LM-9] |
| Manufacturing Example LM-10 | PR264 | 7.00 | Magenta ink [LM-10] |

Pigments used in the manufacturing of the inks are shown in Table 17.

TABLE 17

| Pigment | Product name |
|---|---|
| PB15:3 | LIONOL BLUE FG-7358-G (manufactured by Toyocolor Co., Ltd.) |
| PB15:4 | LIONOL BLUE FG-7400-G (manufactured by Toyocolor Co., Ltd.) |
| PB16 | Heliogen Blue D7490 (manufactured by BASF Japan Ltd.) |
| Aluminum phthalocyanine | Aluminum phthalocyanine of Synthesis Example 7 |
| Titanyl phthalocyanine | Titanyl phthalocyanine of Synthesis Example 8 |
| PR122 | Hostaperm Pink E 02 (manufactured by Clariant AG) |
| PV19 | Hostaperm Red Violet ER02 (manufactured by Clariant AG) |
| PR48:3 | FUJI Red 5R 763 (manufactured by Fuji Pigment Co., Ltd.) |
| PR57:1 | LIONOL RED 6B FG-4306-G (manufactured by Toyocolor Co., Ltd.) |
| PR146 | LIONOL RED 5620 (manufactured by Toyocolor Co., Ltd.) |
| PR185 | Novoperm Carmine HF4C (manufactured by Clariant AG) |
| PR144 | Cromophtal Red D3890 (manufactured by BASF Japan Ltd.) |
| PR179 | Paliogen Red L3885 (manufactured by BASF Japan Ltd.) |

TABLE 17-continued

| Pigment | Product name |
|---|---|
| PR255 | Irgazin Scarlet L3550HD (manufactured by BASF Japan Ltd.) |
| PR264 | Irgazin Rubine L4025 (manufactured by BASF Japan Ltd.) |

<Evaluation of Viscosity Stability of Ink Over Time>

Yellow inks [LY-1] to [LY-17], cyan inks [LC-1] to [LC-5], and magenta inks [LM-1] to [LM-10] were each put into a closed container and stored at 40° C. for 14 days. After that, the viscosities were measured, and changes in viscosities from those before the storage were compared and evaluated. The viscosities were measured by the outflow seconds of a Zahn cup No. 4 at 25° C. In all of the inks, the viscosities in a B-type viscometer before the storage were within a range of 40 to 500 cps (25° C.). The results are shown in Table 18.

(Evaluation References)

○: The viscosity change is shorter than two seconds (favorable).

Δ: The viscosity change is two seconds or longer and shorter than five seconds (practically available).

X: The viscosity change is five seconds or longer (poor).

<Evaluation of Ink Set> (Examples LS-1 to LS-64 and Comparative Examples LS-1 to LS-15)

The individual inks obtained were combined as shown in Table 18 to produce ink sets 1 to 79.

For the obtained ink sets, the trapping properties and the gamut were evaluated by methods below. The results are shown in Table 18.

[Trapping Properties] (Cyan Ink/Yellow Ink)

The cyan ink and the yellow ink were each diluted with solvent mixture 1 (methyl ethyl ketone:n-propyl acetate: isopropanol=40:40:20) such that the viscosity became 16 seconds (25° C., Zahn cup No. 3).

A corona-discharged surface of a corona-discharged polyester film (E-5100 manufactured by Toyobo Co., Ltd.) having a thickness of 12 μm was overprinted with cyan and yellow in order, thereby obtaining a printed article (initial evaluation of trapping properties).

As the printing conditions, the temperature was set to 25° C., the humidity was set to 60%, the printing rate was set to 100 m/minute, and the printing distance was set to 4000 m. For the cyan ink, a Helio 175-line gradation plate (printing process compressed, 75% of solid pattern and 100% to 3% of gradation pattern) was used, and, for the yellow ink, a Helio 175-line gradation plate (printing process elongated, 75% of solid pattern and 100% to 3% of gradation pattern) was used.

In addition, the cyan ink and the yellow ink were each put into a closed container, stored at 40° C. for 14 days, then, diluted and printed in the same manner as described above, thereby obtaining a printed article (evaluation of trapping properties over time).

(Yellow Ink/Magenta Ink)

The yellow ink and the magenta ink were each diluted with solvent mixture 1 such that the viscosity became 16 seconds (25° C., Zahn cup No. 3).

A corona-discharged surface of a corona-discharged polyester film (E-5100 manufactured by Toyobo Co., Ltd.) having a thickness of 12 μm was overprinted with yellow and magenta in order, thereby obtaining a printed article (initial evaluation of trapping properties).

As the printing conditions, the temperature was set to 25° C., the humidity was set to 60%, the printing rate was set to 100 m/minute, and the printing distance was set to 4000 m. For the yellow ink, a Helio 175-line gradation plate (printing process elongated, 75% of solid pattern and 100% to 3% of gradation pattern) was used, and, for the magenta ink, a Helio 175-line gradation plate (printing process elongated, 75% of solid pattern and 100% to 3% of gradation pattern) was used.

In addition, the yellow ink and the magenta ink were each put into a closed container, stored at 40° C. for 14 days, then, diluted and printed in the same manner as described above, thereby obtaining a printed article (evaluation of trapping properties over time).

For the gradation overprint portions of the obtained printed articles, the trapping properties were observed using a microscope (VHX-5000) manufactured by Keyence Corporation and evaluated by references below.

○: An uneven print is caused at a depth of less than 70% of the plate depth (favorable).

Δ: An uneven print is caused at a depth of 70% or more and less than 80% of the plate depth (available).

X: An uneven print is caused at a depth of 80% or more of the plate depth or layered inks all become halftone dots and do not wet and spread (unavailable).

[Gamut Evaluation] (Initial Evaluation)

The cyan ink, the magenta ink, and the yellow ink were each diluted with solvent mixture 1 such that the viscosity became 16 seconds (25° C., Zahn cup No. 3). Printing was performed in the order of cyan, magenta, and yellow using the respective diluted inks, thereby obtaining a printed article having a single-color solid part (cyan, magenta, or yellow) and a single-color solid overprint part (cyan×magenta, cyan×yellow, or yellow×magenta). Printing conditions are shown below.

(Printing Condition)

Printer: Five-color machine from Fuji Kikai Kogyo Co., Ltd.

Cyan plate: Helio 175 L/inch, stylus angle of 120°, elongated

Magenta plate: Helio 175 L/inch, stylus angle of 120°, compressed

Yellow plate: Helio 175 L/inch, stylus angle of 120°, compressed

Printing rate: 150 m/minute

Base material: Corona-treated biaxially stretched polypropylene (OPP) film (PYLEN P-2161 manufactured by Toyobo Co., Ltd., 20 μm)

Drying temperature: 50° C.

For the obtained printed article, the density value of the single-color solid part (cyan, magenta, or yellow) of the printed article was measured using GretagMacbeth D196. In addition, the colors of the single-color solid part and the overprinted part were measured using SpectroEye manufactured by GretagMacbeth as a measuring instrument under conditions of a D50 light source, a two-degree observation visual field, white back (standard white plate used), and no use of filters.

A hexagon on which the a* vs b* values of a total of six colors of the single-color solid part (yellow, magenta, and cyan) and the single-color solid overprinted part (cyan× magenta, cyan×yellow, and yellow×magenta) plotted in a two-dimensional space where a* was indicated along the horizontal axis and b* was indicated along the vertical axis was produced, and the area was obtained. The area of a comparative example that served as a reference was set to 100%, the area ratio thereto was obtained, and the area ratio was evaluated by criteria below. Specifically, for Examples LS-1 to LS-12, LS-16 to LS-20, and LS-25 to LS-30 and Comparative Examples LS-3 to LS-7 and LS-12, Comparative Example LS-1 was used as a reference. In addition, for Examples LS-13 to LS-15, Comparative Example LS-2 was used as a reference. In addition, for Examples LS-35 to LS-40, Comparative Example LS-13 was used as a reference. "-" indicates that the area ratio is not evaluated.

(Evaluation References)

○: The area ratio is 90% or more (favorable).

Δ: The area ratio is 85% or more and less than 90% (available).

X: The area ratio is less than 85% (unavailable).

(Aging Evaluation)

The cyan ink, the magenta ink, and the yellow ink were each put into a closed container, stored at 40° C. for 14 days, then, diluted and printed in the same manner as for the initial evaluation, thereby obtaining a printed article.

For the obtained printed article, the color was measured in the same manner as in the initial evaluation.

A hexagon on which the a* vs b* values of a total of six colors of the single-color solid part (yellow, magenta, and cyan) and the single-color solid overprinted part (cyan×magenta, cyan×yellow, and yellow×magenta) plotted in a two-dimensional space where a* was indicated along the horizontal axis and b* was indicated along the vertical axis was produced. The area ratio was obtained by dividing the area in the aging evaluation of each of the examples and the comparative examples by the area in the initial evaluation, and the area ratio was evaluated by criteria below. "-" indicates that the area ratio is not evaluated.

(Evaluation References)

○: The area ratio is 98% or more (favorable).

Δ: The area ratio is 95% or more and less than 98% (practically available).

X: The area ratio is less than 95% (poor).

TABLE 18

| | | | | | Aging viscosity stability | | | Trapping properties: Cyan/yellow | | Trapping properties: Yellow/magenta | | Gamut | |
|---|---|---|---|---|---|---|---|---|---|---|---|---|---|
| | Ink set | Yellow ink | Cyan ink | Magenta ink | Yellow ink | Cyan ink | Magenta ink | Initial | Over time | Initial | Over time | Initial | Over time |
| Example LS-1 | Ink set 1 | [LY-1] | [LC-1] | [LM-1] | Δ | ○ | ○ | ○ | ○ | ○ | ○ | ○ | Δ |
| Example LS-2 | Ink set 2 | [LY-2] | [LC-1] | [LM-1] | Δ | ○ | ○ | ○ | Δ | ○ | Δ | ○ | Δ |
| Example LS-3 | Ink set 3 | [LY-3] | [LC-1] | [LM-1] | Δ | ○ | ○ | ○ | Δ | ○ | Δ | ○ | Δ |
| Example LS-4 | Ink set 4 | [LY-4] | [LC-1] | [LM-1] | ○ | ○ | ○ | ○ | ○ | ○ | ○ | ○ | ○ |
| Example LS-5 | Ink set 5 | [LY-5] | [LC-1] | [LM-1] | ○ | ○ | ○ | ○ | ○ | ○ | ○ | ○ | ○ |
| Example LS-6 | Ink set 6 | [LY-6] | [LC-1] | [LM-1] | ○ | ○ | ○ | ○ | Δ | ○ | ○ | ○ | ○ |
| Example LS-7 | Ink set 7 | [LY-7] | [LC-1] | [LM-1] | Δ | ○ | ○ | ○ | ○ | ○ | ○ | ○ | Δ |
| Example LS-8 | Ink set 8 | [LY-8] | [LC-1] | [LM-1] | ○ | ○ | ○ | ○ | ○ | ○ | ○ | ○ | ○ |
| Example LS-9 | Ink set 9 | [LY-9] | [LC-1] | [LM-1] | ○ | ○ | ○ | ○ | ○ | ○ | ○ | ○ | ○ |
| Example LS-10 | Ink set 10 | [LY-10] | [LC-1] | [LM-1] | ○ | ○ | ○ | ○ | ○ | ○ | ○ | ○ | ○ |
| Example LS-11 | Ink set 11 | [LY-11] | [LC-1] | [LM-1] | ○ | ○ | ○ | ○ | Δ | ○ | ○ | ○ | ○ |
| Example LS-12 | Ink set 12 | [LY-12] | [LC-1] | [LM-1] | Δ | ○ | ○ | ○ | Δ | ○ | Δ | ○ | Δ |
| Example LS-13 | Ink set 13 | [LY-14] | [LC-1] | [LM-1] | Δ | ○ | ○ | ○ | ○ | ○ | ○ | ○ | Δ |
| Example LS-14 | Ink set 14 | [LY-15] | [LC-1] | [LM-1] | ○ | ○ | ○ | ○ | Δ | ○ | ○ | ○ | ○ |
| Example LS-15 | Ink set 15 | [LY-16] | [LC-1] | [LM-1] | ○ | ○ | ○ | ○ | ○ | ○ | ○ | ○ | ○ |
| Example LS-16 | Ink set 16 | [LY-4] | [LC-1] | [LM-2] | ○ | ○ | ○ | ○ | ○ | ○ | ○ | ○ | ○ |
| Example LS-17 | Ink set 17 | [LY-4] | [LC-1] | [LM-3] | ○ | ○ | ○ | ○ | ○ | ○ | ○ | ○ | ○ |
| Example LS-18 | Ink set 18 | [LY-4] | [LC-1] | [LM-4] | ○ | ○ | ○ | ○ | ○ | ○ | ○ | ○ | ○ |
| Example LS-19 | Ink set 19 | [LY-4] | [LC-1] | [LM-5] | ○ | ○ | ○ | ○ | ○ | ○ | ○ | ○ | ○ |
| Example LS-20 | Ink set 20 | [LY-4] | [LC-1] | [LM-6] | ○ | ○ | ○ | ○ | ○ | ○ | ○ | ○ | ○ |
| Example LS-21 | Ink set 21 | [LY-4] | [LC-1] | [LM-7] | ○ | ○ | ○ | ○ | ○ | ○ | Δ | — | — |
| Example LS-22 | Ink set 22 | [LY-4] | [LC-1] | [LM-8] | ○ | ○ | ○ | ○ | ○ | ○ | Δ | — | — |
| Example LS-23 | Ink set 23 | [LY-4] | [LC-1] | [LM-9] | ○ | ○ | ○ | ○ | ○ | ○ | Δ | — | — |
| Example LS-24 | Ink set 24 | [LY-4] | [LC-1] | [LM-10] | ○ | ○ | ○ | ○ | ○ | ○ | Δ | — | — |
| Example LS-25 | Ink set 25 | [LY-4] | [LC-2] | [LM-1] | ○ | ○ | ○ | ○ | ○ | ○ | ○ | ○ | ○ |
| Example LS-26 | Ink set 26 | [LY-4] | [LC-2] | [LM-2] | ○ | ○ | ○ | ○ | ○ | ○ | ○ | ○ | ○ |
| Example LS-27 | Ink set 27 | [LY-4] | [LC-2] | [LM-3] | ○ | ○ | ○ | ○ | ○ | ○ | ○ | ○ | ○ |
| Example LS-28 | Ink set 28 | [LY-4] | [LC-2] | [LM-4] | ○ | ○ | ○ | ○ | ○ | ○ | ○ | ○ | ○ |
| Example LS-29 | Ink set 29 | [LY-4] | [LC-2] | [LM-5] | ○ | ○ | ○ | ○ | ○ | ○ | ○ | ○ | ○ |
| Example LS-30 | Ink set 30 | [LY-4] | [LC-2] | [LM-6] | ○ | ○ | ○ | ○ | ○ | ○ | ○ | ○ | ○ |
| Example LS-31 | Ink set 31 | [LY-4] | [LC-2] | [LM-7] | ○ | ○ | ○ | ○ | ○ | ○ | Δ | — | — |
| Example LS-32 | Ink set 32 | [LY-4] | [LC-2] | [LM-8] | ○ | ○ | ○ | ○ | ○ | ○ | Δ | — | — |
| Example LS-33 | Ink set 33 | [LY-4] | [LC-2] | [LM-9] | ○ | ○ | ○ | ○ | ○ | ○ | Δ | — | — |
| Example LS-34 | Ink set 34 | [LY-4] | [LC-2] | [LM-10] | ○ | ○ | ○ | ○ | ○ | ○ | Δ | — | — |
| Example LS-35 | Ink set 35 | [LY-4] | [LC-3] | [LM-1] | ○ | ○ | ○ | ○ | ○ | ○ | ○ | ○ | ○ |
| Example LS-36 | Ink set 36 | [LY-4] | [LC-3] | [LM-2] | ○ | ○ | ○ | ○ | ○ | ○ | ○ | ○ | ○ |
| Example LS-37 | Ink set 37 | [LY-4] | [LC-3] | [LM-3] | ○ | ○ | ○ | ○ | ○ | ○ | ○ | ○ | ○ |
| Example LS-38 | Ink set 38 | [LY-4] | [LC-3] | [LM-4] | ○ | ○ | ○ | ○ | ○ | ○ | ○ | ○ | ○ |
| Example LS-39 | Ink set 39 | [LY-4] | [LC-3] | [LM-5] | ○ | ○ | ○ | ○ | ○ | ○ | ○ | ○ | ○ |
| Example LS-40 | Ink set 40 | [LY-4] | [LC-3] | [LM-6] | ○ | ○ | ○ | ○ | ○ | ○ | ○ | ○ | ○ |
| Example LS-41 | Ink set 41 | [LY-4] | [LC-3] | [LM-7] | ○ | ○ | ○ | ○ | ○ | ○ | Δ | — | — |
| Example LS-42 | Ink set 42 | [LY-4] | [LC-3] | [LM-8] | ○ | ○ | ○ | ○ | ○ | ○ | Δ | — | — |
| Example LS-43 | Ink set 43 | [LY-4] | [LC-3] | [LM-9] | ○ | ○ | ○ | ○ | ○ | ○ | Δ | — | — |
| Example LS-44 | Ink set 44 | [LY-4] | [LC-3] | [LM-10] | ○ | ○ | ○ | ○ | ○ | ○ | Δ | — | — |
| Example LS-45 | Ink set 45 | [LY-4] | [LC-4] | [LM-1] | ○ | ○ | ○ | ○ | ○ | ○ | ○ | — | — |

TABLE 18-continued

| | Ink set | Yellow ink | Cyan ink | Magenta ink | Aging viscosity stability: Yellow ink | Aging viscosity stability: Cyan ink | Aging viscosity stability: Magenta ink | Trapping properties: Cyan/yellow: Initial | Trapping properties: Cyan/yellow: Over time | Trapping properties: Yellow/magenta: Initial | Trapping properties: Yellow/magenta: Over time | Gamut: Initial | Gamut: Over time |
|---|---|---|---|---|---|---|---|---|---|---|---|---|---|
| Example LS-46 | Ink set 46 | [LY-4] | [LC-4] | [LM-2] | ○ | ○ | ○ | ○ | ○ | ○ | ○ | — | — |
| Example LS-47 | Ink set 47 | [LY-4] | [LC-4] | [LM-3] | ○ | ○ | ○ | ○ | ○ | ○ | ○ | — | — |
| Example LS-48 | Ink set 48 | [LY-4] | [LC-4] | [LM-4] | ○ | ○ | ○ | ○ | ○ | ○ | ○ | — | — |
| Example LS-49 | Ink set 49 | [LY-4] | [LC-4] | [LM-5] | ○ | ○ | ○ | ○ | ○ | ○ | ○ | — | — |
| Example LS-50 | Ink set 50 | [LY-4] | [LC-4] | [LM-6] | ○ | ○ | ○ | ○ | ○ | ○ | ○ | — | — |
| Example LS-51 | Ink set 51 | [LY-4] | [LC-4] | [LM-7] | ○ | ○ | ○ | ○ | ○ | ○ | Δ | — | — |
| Example LS-52 | Ink set 52 | [LY-4] | [LC-4] | [LM-8] | ○ | ○ | ○ | ○ | ○ | ○ | Δ | — | — |
| Example LS-53 | Ink set 53 | [LY-4] | [LC-4] | [LM-9] | ○ | ○ | ○ | ○ | ○ | ○ | Δ | — | — |
| Example LS-54 | Ink set 54 | [LY-4] | [LC-4] | [LM-10] | ○ | ○ | ○ | ○ | ○ | ○ | Δ | — | — |
| Example LS-55 | Ink set 55 | [LY-4] | [LC-5] | [LM-1] | ○ | ○ | ○ | ○ | ○ | ○ | ○ | — | — |
| Example LS-56 | Ink set 56 | [LY-4] | [LC-5] | [LM-2] | ○ | ○ | ○ | ○ | ○ | ○ | ○ | — | — |
| Example LS-57 | Ink set 57 | [LY-4] | [LC-5] | [LM-3] | ○ | ○ | ○ | ○ | ○ | ○ | ○ | — | — |
| Example LS-58 | Ink set 58 | [LY-4] | [LC-5] | [LM-4] | ○ | ○ | ○ | ○ | ○ | ○ | ○ | — | — |
| Example LS-59 | Ink set 59 | [LY-4] | [LC-5] | [LM-5] | ○ | ○ | ○ | ○ | ○ | ○ | ○ | — | — |
| Example LS-60 | Ink set 60 | [LY-4] | [LC-5] | [LM-6] | ○ | ○ | ○ | ○ | ○ | ○ | ○ | — | — |
| Example LS-61 | Ink set 61 | [LY-4] | [LC-5] | [LM-7] | ○ | ○ | ○ | ○ | ○ | ○ | Δ | — | — |
| Example LS-62 | Ink set 62 | [LY-4] | [LC-5] | [LM-8] | ○ | ○ | ○ | ○ | ○ | ○ | Δ | — | — |
| Example LS-63 | Ink set 63 | [LY-4] | [LC-5] | [LM-9] | ○ | ○ | ○ | ○ | ○ | ○ | Δ | — | — |
| Example LS-64 | Ink set 64 | [LY-4] | [LC-5] | [LM-10] | ○ | ○ | ○ | ○ | ○ | ○ | Δ | — | — |
| Comparative Example LS-1 | Ink set 65 | [LY-13] | [LC-1] | [LM-1] | X | ○ | ○ | ○ | Δ | ○ | Δ | Reference | X |
| Comparative Example LS-2 | Ink set 66 | [LY-17] | [LC-1] | [LM-1] | X | ○ | ○ | ○ | X | ○ | X | Reference | X |
| Comparative Example LS-3 | Ink set 67 | [LY-13] | [LC-1] | [LM-2] | X | ○ | ○ | ○ | Δ | ○ | Δ | ○ | X |
| Comparative Example LS-4 | Ink set 68 | [LY-13] | [LC-1] | [LM-3] | X | ○ | ○ | ○ | Δ | ○ | Δ | ○ | X |
| Comparative Example LS-5 | Ink set 69 | [LY-13] | [LC-1] | [LM-4] | X | ○ | ○ | ○ | Δ | ○ | Δ | ○ | X |
| Comparative Example LS-6 | Ink set 70 | [LY-13] | [LC-1] | [LM-5] | X | ○ | ○ | ○ | Δ | ○ | Δ | ○ | X |
| Comparative Example LS-7 | Ink set 71 | [LY-13] | [LC-1] | [LM-6] | X | ○ | ○ | ○ | Δ | ○ | Δ | ○ | X |
| Comparative Example LS-8 | Ink set 72 | [LY-13] | [LC-1] | [LM-7] | X | ○ | ○ | ○ | Δ | ○ | X | — | — |
| Comparative Example LS-9 | Ink set 73 | [LY-13] | [LC-1] | [LM-8] | X | ○ | ○ | ○ | Δ | ○ | X | — | — |
| Comparative Example LS-10 | Ink set 74 | [LY-13] | [LC-1] | [LM-9] | X | ○ | ○ | ○ | Δ | ○ | X | — | — |
| Comparative Example LS-11 | Ink set 75 | [LY-13] | [LC-1] | [LM-10] | X | ○ | ○ | ○ | Δ | ○ | X | — | — |
| Comparative Example LS-12 | Ink set 76 | [LY-13] | [LC-2] | [LM-1] | X | ○ | ○ | ○ | Δ | ○ | Δ | ○ | X |
| Comparative Example LS-13 | Ink set 77 | [LY-13] | [LC-3] | [LM-1] | X | ○ | ○ | ○ | Δ | ○ | Δ | Reference | X |
| Comparative Example LS-14 | Ink set 78 | [LY-13] | [LC-4] | [LM-1] | X | ○ | ○ | ○ | X | ○ | Δ | — | — |
| Comparative Example LS-15 | Ink set 79 | [LY-13] | [LC-5] | [LM-1] | X | ○ | ○ | ○ | X | ○ | Δ | — | — |

According to Table 18, the gravure printing ink set of the present invention has the same or higher area ratio of gamut and favorable color reproducibility compared with conventional ink sets. In addition, the viscosity stability of the yellow ink over time improved, and the storage stability as an ink set was favorable. Furthermore, regarding the trapping properties and color reproducibility (gamut) of each color as well, the aging evaluation was favorable, and the storage stability as an ink set was favorable.

On the other hand, in Comparative Examples LS-1 to LS-15, the viscosity stability of the yellow ink over time was poor, and, regarding the trapping properties and color reproducibility (gamut) of each color, the aging evaluation was poor, and thus the storage stability as an ink set was poor, and the problem of the present application cannot be solved.

<Manufacturing of Clear Ink>

(Production of Clear Ink [1])

87 Parts of polyurethane resin solution [PU3] (30% of non-volatile component), 5 parts of ethyl acetate (EA), 5 parts of IPA, and 3 parts of silica ("P-73" manufactured by Mizusawa Industrial Chemicals, Ltd., hydrophilic silica particles having an average particle size of 3.8 μm) were stirred and mixed using a disperser, thereby obtaining clear ink [1].

<Manufacturing of Adhesive Having Desorption Properties>

(Production of Laminating Adhesive Solution [1])

82 Parts of terephthalic acid, 682 parts of isophthalic acid, 236 parts of adipic acid, 236 parts of ethylene glycol, 525 parts of neopentyl glycol, and 405 parts of 1,6-hexanediol were charged into a four-neck separable flask, and an esterification reaction was performed at 220° C. to 260° C. After a predetermined amount of water was distilled away, the pressure was slowly reduced, and a deglycol reaction was performed at 1 mmHg or lower and 240° C. to 260° C. for five hours. After that, 2 parts of isophorone diisocyanate was slowly added thereto, and a reaction was performed at 150° C. for approximately two hours, thereby obtaining a polyester polyurethane polyol. 2.83 Parts of trimellitic anhydride was added to 100 parts of this polyester polyurethane polyol, and a reaction was performed at 180° C. for approximately two hours. Next, the non-volatile component was diluted to 50% with ethyl acetate, thereby obtaining a partially acid-modified polyester polyol solution having a number-average molecular weight of 6,000 and an acid value of 16.5 mgKOH/g.

100 Parts of the obtained polyol solution and 7.94 parts of a non-volatile component 95% ethyl acetate solution of HDI-biuret were mixed, and ethyl acetate was added thereto, thereby obtaining laminating adhesive solution [1] containing 30% of a non-volatile component.

<Manufacturing of Packaging Material>

(Example LP-1) Packaging Material 1

Cyan ink [LC-1], magenta ink [LM-1], and yellow ink [LY-1] were each diluted with solvent mixture 1 such that the viscosity became 16 seconds (25° C., Zahn cup No. 3).

Using each of the diluted inks, a gravure proofing five-color machine including a gravure plate having a plate depth of 20 μm, and ink set 101 containing black ink (LIOALPHA R92 black (manufactured by Toyo Ink Co., Ltd.)), cyan ink [LC-1], magenta ink [LM-1], yellow ink [LY-1], and white ink (LIOALPHA R631 white (manufactured by Toyo Ink Co., Ltd.)), black ink, cyan ink [LC-1], magenta ink [LM-1], yellow ink [LY-1], and white ink were overprinted in order on a 20 μm-thick corona-treated stretched polypropylene film (OPP base material), and, in each unit, each ink was dried at 50° C., thereby obtaining a printed article having a configuration of "OPP base material/black, cyan, magenta, yellow, or white printed layer".

Next, an urethane-based laminating adhesive (TM320/CAT13B manufactured by Toyo-Morton, Ltd., ethyl acetate solution containing 30% of non-volatile component) was applied to and dried on the printed layer of the obtained printed article such that the amount of the adhesive applied after dried became 2.0 g/$m^2$, and a 50 μm-thick unstretched polyethylene (PE) film was stuck onto the adhesive layer, thereby obtaining packaging material 1 having a configuration of "OPP base material/five-color overprinted layer/adhesive layer/PE base material".

(Examples LP-2 to LP-64) Packaging Materials 2 to 64

Packaging materials 2 to 64 having a desorption layer were obtained in the same manner as in Example LP-1 except that ink set 101 used in Example LP-1 was changed to ink sets shown in Table 19.

TABLE 19

| | Packaging material | Ink set | Black ink | Cyan ink | Magenta ink | Yellow ink | White ink |
|---|---|---|---|---|---|---|---|
| Example LP-1 | Packaging material 1 | Ink set 101 | LIOALPHA R92 | [LC-1] | [LM-1] | [LY-1] | LIOALPHA R631 |
| Example LP-2 | Packaging material 2 | Ink set 102 | black | [LC-1] | [LM-1] | [LY-2] | white |
| Example LP-3 | Packaging material 3 | Ink set 103 | | [LC-1] | [LM-1] | [LY-3] | |
| Example LP-4 | Packaging material 4 | Ink set 104 | | [LC-1] | [LM-1] | [LY-4] | |
| Example LP-5 | Packaging material 5 | Ink set 105 | | [LC-1] | [LM-1] | [LY-5] | |
| Example LP-6 | Packaging material 6 | Ink set 106 | | [LC-1] | [LM-1] | [LY-6] | |
| Example LP-7 | Packaging material 7 | Ink set 107 | | [LC-1] | [LM-1] | [LY-7] | |
| Example LP-8 | Packaging material 8 | Ink set 108 | | [LC-1] | [LM-1] | [LY-8] | |
| Example LP-9 | Packaging material 9 | Ink set 109 | | [LC-1] | [LM-1] | [LY-9] | |
| Example LP-10 | Packaging material 10 | Ink set 110 | | [LC-1] | [LM-1] | [LY-10] | |
| Example LP-11 | Packaging material 11 | Ink set 111 | | [LC-1] | [LM-1] | [LY-11] | |
| Example LP-12 | Packaging material 12 | Ink set 112 | | [LC-1] | [LM-1] | [LY-12] | |
| Example LP-13 | Packaging material 13 | Ink set 113 | | [LC-1] | [LM-1] | [LY-14] | |
| Example LP-14 | Packaging material 14 | Ink set 114 | | [LC-1] | [LM-1] | [LY-15] | |
| Example LP-15 | Packaging material 15 | Ink set 115 | | [LC-1] | [LM-1] | [LY-16] | |
| Example LP-16 | Packaging material 16 | Ink set 116 | | [LC-1] | [LM-2] | [LY-4] | |
| Example LP-17 | Packaging material 17 | Ink set 117 | | [LC-1] | [LM-3] | [LY-4] | |
| Example LP-18 | Packaging material 18 | Ink set 118 | | [LC-1] | [LM-4] | [LY-4] | |
| Example LP-19 | Packaging material 19 | Ink set 119 | | [LC-1] | [LM-5] | [LY-4] | |
| Example LP-20 | Packaging material 20 | Ink set 120 | | [LC-1] | [LM-6] | [LY-4] | |
| Example LP-21 | Packaging material 21 | Ink set 121 | | [LC-1] | [LM-7] | [LY-4] | |
| Example LP-22 | Packaging material 22 | Ink set 122 | | [LC-1] | [LM-8] | [LY-4] | |
| Example LP-23 | Packaging material 23 | Ink set 123 | | [LC-1] | [LM-9] | [LY-4] | |
| Example LP-24 | Packaging material 24 | Ink set 124 | | [LC-1] | [LM-10] | [LY-4] | |
| Example LP-25 | Packaging material 25 | Ink set 125 | | [LC-2] | [LM-1] | [LY-4] | |
| Example LP-26 | Packaging material 26 | Ink set 126 | | [LC-2] | [LM-2] | [LY-4] | |
| Example LP-27 | Packaging material 27 | Ink set 127 | | [LC-2] | [LM-3] | [LY-4] | |
| Example LP-28 | Packaging material 28 | Ink set 128 | | [LC-2] | [LM-4] | [LY-4] | |
| Example LP-29 | Packaging material 29 | Ink set 129 | | [LC-2] | [LM-5] | [LY-4] | |
| Example LP-30 | Packaging material 30 | Ink set 130 | | [LC-2] | [LM-6] | [LY-4] | |
| Example LP-31 | Packaging material 31 | Ink set 131 | | [LC-2] | [LM-7] | [LY-4] | |
| Example LP-32 | Packaging material 32 | Ink set 132 | | [LC-2] | [LM-8] | [LY-4] | |
| Example LP-33 | Packaging material 33 | Ink set 133 | | [LC-2] | [LM-9] | [LY-4] | |
| Example LP-34 | Packaging material 34 | Ink set 134 | | [LC-2] | [LM-10] | [LY-4] | |
| Example LP-35 | Packaging material 35 | Ink set 135 | | [LC-3] | [LM-1] | [LY-4] | |
| Example LP-36 | Packaging material 36 | Ink set 136 | | [LC-3] | [LM-2] | [LY-4] | |
| Example LP-37 | Packaging material 37 | Ink set 137 | | [LC-3] | [LM-3] | [LY-4] | |
| Example LP-38 | Packaging material 38 | Ink set 138 | | [LC-3] | [LM-4] | [LY-4] | |
| Example LP-39 | Packaging material 39 | Ink set 139 | | [LC-3] | [LM-5] | [LY-4] | |
| Example LP-40 | Packaging material 40 | Ink set 140 | | [LC-3] | [LM-6] | [LY-4] | |
| Example LP-41 | Packaging material 41 | Ink set 141 | | [LC-3] | [LM-7] | [LY-4] | |
| Example LP-42 | Packaging material 42 | Ink set 142 | | [LC-3] | [LM-8] | [LY-4] | |
| Example LP-43 | Packaging material 43 | Ink set 143 | | [LC-3] | [LM-9] | [LY-4] | |
| Example LP-44 | Packaging material 44 | Ink set 144 | | [LC-3] | [LM-10] | [LY-4] | |
| Example LP-45 | Packaging material 45 | Ink set 145 | | [LC-4] | [LM-1] | [LY-4] | |
| Example LP-46 | Packaging material 46 | Ink set 146 | | [LC-4] | [LM-2] | [LY-4] | |
| Example LP-47 | Packaging material 47 | Ink set 147 | | [LC-4] | [LM-3] | [LY-4] | |
| Example LP-48 | Packaging material 48 | Ink set 148 | | [LC-4] | [LM-4] | [LY-4] | |
| Example LP-49 | Packaging material 49 | Ink set 149 | | [LC-4] | [LM-5] | [LY-4] | |
| Example LP-50 | Packaging material 50 | Ink set 150 | | [LC-4] | [LM-6] | [LY-4] | |
| Example LP-51 | Packaging material 51 | Ink set 151 | | [LC-4] | [LM-7] | [LY-4] | |
| Example LP-52 | Packaging material 52 | Ink set 152 | | [LC-4] | [LM-8] | [LY-4] | |
| Example LP-53 | Packaging material 53 | Ink set 153 | | [LC-4] | [LM-9] | [LY-4] | |
| Example LP-54 | Packaging material 54 | Ink set 154 | | [LC-4] | [LM-10] | [LY-4] | |
| Example LP-55 | Packaging material 55 | Ink set 155 | | [LC-5] | [LM-1] | [LY-4] | |
| Example LP-56 | Packaging material 56 | Ink set 156 | | [LC-5] | [LM-2] | [LY-4] | |
| Example LP-57 | Packaging material 57 | Ink set 157 | | [LC-5] | [LM-3] | [LY-4] | |

TABLE 19-continued

| | Packaging material | Ink set | Black ink | Cyan ink | Magenta ink | Yellow ink | White ink |
|---|---|---|---|---|---|---|---|
| Example LP-58 | Packaging material 58 | Ink set 158 | | [LC-5] | [LM-4] | [LY-4] | |
| Example LP-59 | Packaging material 59 | Ink set 159 | | [LC-5] | [LM-5] | [LY-4] | |
| Example LP-60 | Packaging material 60 | Ink set 160 | | [LC-5] | [LM-6] | [LY-4] | |
| Example LP-61 | Packaging material 61 | Ink set 161 | | [LC-5] | [LM-7] | [LY-4] | |
| Example LP-62 | Packaging material 62 | Ink set 162 | | [LC-5] | [LM-8] | [LY-4] | |
| Example LP-63 | Packaging material 63 | Ink set 163 | | [LC-5] | [LM-9] | [LY-4] | |
| Example LP-64 | Packaging material 64 | Ink set 164 | | [LC-5] | [LM-10] | [LY-4] | |

(Example LP-101) Packaging Material 101 Clear ink [1] was diluted with an EA/IPA solvent mixture (mass ratio of 70/30) such that the viscosity became 15 seconds (25° C., Zahn cup No. 3).

Cyan ink [LC-1], magenta ink [LM-1], and yellow ink [LY-1] were each diluted with solvent mixture 1 such that the viscosity became 16 seconds (25° C., Zahn cup No. 3).

Using each of the diluted inks, a gravure proofing five-color machine including a gravure plate having a plate depth of 20 μm, and ink set 201 containing clear ink [1], cyan ink [LC-1], magenta ink [LM-1], and yellow ink [LY-1], clear ink [1], cyan ink [LC-1], magenta ink [LM-1], and yellow ink [LY-1] were overprinted in order on a 20 μm-thick corona-treated stretched polypropylene film, and, in each unit, each ink was dried at 50° C., thereby obtaining a printed article having a configuration of "OPP base material/desorption layer (clear ink)/cyan, magenta, or yellow printed layer" and having desorption properties.

Next, laminating adhesive solution [1] was applied onto the printed layer of the obtained printed article using a dry lamination machine and stuck to a 25 μm-thick aluminum-deposited unstretched polypropylene (VMCPP) film at a line rate of 40 m/minute, thereby obtaining packaging material 101 having a configuration of "OPP base material/printed layer having desorption properties/three-color overprinted layer/adhesive layer having desorption properties/VMCPP base material" and having desorption properties.

Examples LP-102 to LP-164

Packaging materials 102 to 164 Packaging materials 102 to 164 having a desorption layer were obtained in the same manner as in Example LP-101 except that ink set 201 used in Example LP-101 was changed to ink sets shown in Table 20.

TABLE 20

| | Packaging material | Ink set | Clear ink | Cyan ink | Magenta ink | Yellow ink |
|---|---|---|---|---|---|---|
| Example LP-101 | Packaging material 101 | Ink set 201 | Clear ink | [LC-1] | [LM-1] | [LY-1] |
| Example LP-102 | Packaging material 102 | Ink set 202 | [1] | [LC-1] | [LM-1] | [LY-2] |
| Example LP-103 | Packaging material 103 | Ink set 203 | | [LC-1] | [LM-1] | [LY-3] |
| Example LP-104 | Packaging material 104 | Ink set 204 | | [LC-1] | [LM-1] | [LY-4] |
| Example LP-105 | Packaging material 105 | Ink set 205 | | [LC-1] | [LM-1] | [LY-5] |
| Example LP-106 | Packaging material 106 | Ink set 206 | | [LC-1] | [LM-1] | [LY-6] |
| Example LP-107 | Packaging material 107 | Ink set 207 | | [LC-1] | [LM-1] | [LY-7] |
| Example LP-108 | Packaging material 108 | Ink set 208 | | [LC-1] | [LM-1] | [LY-8] |
| Example LP-109 | Packaging material 109 | Ink set 209 | | [LC-1] | [LM-1] | [LY-9] |
| Example LP-110 | Packaging material 110 | Ink set 210 | | [LC-1] | [LM-1] | [LY-10] |
| Example LP-111 | Packaging material 111 | Ink set 211 | | [LC-1] | [LM-1] | [LY-11] |
| Example LP-112 | Packaging material 112 | Ink set 212 | | [LC-1] | [LM-1] | [LY-12] |
| Example LP-113 | Packaging material 113 | Ink set 213 | | [LC-1] | [LM-1] | [LY-14] |
| Example LP-114 | Packaging material 114 | Ink set 214 | | [LC-1] | [LM-1] | [LY-15] |
| Example LP-115 | Packaging material 115 | Ink set 215 | | [LC-1] | [LM-1] | [LY-16] |
| Example LP-116 | Packaging material 116 | Ink set 216 | | [LC-1] | [LM-2] | [LY-4] |
| Example LP-117 | Packaging material 117 | Ink set 217 | | [LC-1] | [LM-3] | [LY-4] |
| Example LP-118 | Packaging material 118 | Ink set 218 | | [LC-1] | [LM-4] | [LY-4] |
| Example LP-119 | Packaging material 119 | Ink set 219 | | [LC-1] | [LM-5] | [LY-4] |
| Example LP-120 | Packaging material 120 | Ink set 220 | | [LC-1] | [LM-6] | [LY-4] |
| Example LP-121 | Packaging material 121 | Ink set 221 | | [LC-1] | [LM-7] | [LY-4] |
| Example LP-122 | Packaging material 122 | Ink set 222 | | [LC-1] | [LM-8] | [LY-4] |
| Example LP-123 | Packaging material 123 | Ink set 223 | | [LC-1] | [LM-9] | [LY-4] |
| Example LP-124 | Packaging material 124 | Ink set 224 | | [LC-1] | [LM-10] | [LY-4] |
| Example LP-125 | Packaging material 125 | Ink set 225 | | [LC-2] | [LM-1] | [LY-4] |
| Example LP-126 | Packaging material 126 | Ink set 226 | | [LC-2] | [LM-2] | [LY-4] |
| Example LP-127 | Packaging material 127 | Ink set 227 | | [LC-2] | [LM-3] | [LY-4] |
| Example LP-128 | Packaging material 128 | Ink set 228 | | [LC-2] | [LM-4] | [LY-4] |
| Example LP-129 | Packaging material 129 | Ink set 229 | | [LC-2] | [LM-5] | [LY-4] |
| Example LP-130 | Packaging material 130 | Ink set 230 | | [LC-2] | [LM-6] | [LY-4] |
| Example LP-131 | Packaging material 131 | Ink set 231 | | [LC-2] | [LM-7] | [LY-4] |
| Example LP-132 | Packaging material 132 | Ink set 232 | | [LC-2] | [LM-8] | [LY-4] |
| Example LP-133 | Packaging material 133 | Ink set 233 | | [LC-2] | [LM-9] | [LY-4] |
| Example LP-134 | Packaging material 134 | Ink set 234 | | [LC-2] | [LM-10] | [LY-4] |
| Example LP-135 | Packaging material 135 | Ink set 235 | | [LC-3] | [LM-1] | [LY-4] |
| Example LP-136 | Packaging material 136 | Ink set 236 | | [LC-3] | [LM-2] | [LY-4] |
| Example LP-137 | Packaging material 137 | Ink set 237 | | [LC-3] | [LM-3] | [LY-4] |
| Example LP-138 | Packaging material 138 | Ink set 238 | | [LC-3] | [LM-4] | [LY-4] |
| Example LP-139 | Packaging material 139 | Ink set 239 | | [LC-3] | [LM-5] | [LY-4] |
| Example LP-140 | Packaging material 140 | Ink set 240 | | [LC-3] | [LM-6] | [LY-4] |
| Example LP-141 | Packaging material 141 | Ink set 241 | | [LC-3] | [LM-7] | [LY-4] |

TABLE 20-continued

| | Packaging material | Ink set | Clear ink | Cyan ink | Magenta ink | Yellow ink |
|---|---|---|---|---|---|---|
| Example LP-142 | Packaging material 142 | Ink set 242 | | [LC-3] | [LM-8] | [LY-4] |
| Example LP-143 | Packaging material 143 | Ink set 243 | | [LC-3] | [LM-9] | [LY-4] |
| Example LP-144 | Packaging material 144 | Ink set 244 | | [LC-3] | [LM-10] | [LY-4] |
| Example LP-145 | Packaging material 145 | Ink set 245 | | [LC-4] | [LM-1] | [LY-4] |
| Example LP-146 | Packaging material 146 | Ink set 246 | | [LC-4] | [LM-2] | [LY-4] |
| Example LP-147 | Packaging material 147 | Ink set 247 | | [LC-4] | [LM-3] | [LY-4] |
| Example LP-148 | Packaging material 148 | Ink set 248 | | [LC-4] | [LM-4] | [LY-4] |
| Example LP-149 | Packaging material 149 | Ink set 249 | | [LC-4] | [LM-5] | [LY-4] |
| Example LP-150 | Packaging material 150 | Ink set 250 | | [LC-4] | [LM-6] | [LY-4] |
| Example LP-151 | Packaging material 151 | Ink set 251 | | [LC-4] | [LM-7] | [LY-4] |
| Example LP-152 | Packaging material 152 | Ink set 252 | | [LC-4] | [LM-8] | [LY-4] |
| Example LP-153 | Packaging material 153 | Ink set 253 | | [LC-4] | [LM-9] | [LY-4] |
| Example LP-154 | Packaging material 154 | Ink set 254 | | [LC-4] | [LM-10] | [LY-4] |
| Example LP-155 | Packaging material 155 | Ink set 255 | | [LC-5] | [LM-1] | [LY-4] |
| Example LP-156 | Packaging material 156 | Ink set 256 | | [LC-5] | [LM-2] | [LY-4] |
| Example LP-157 | Packaging material 157 | Ink set 257 | | [LC-5] | [LM-3] | [LY-4] |
| Example LP-158 | Packaging material 158 | Ink set 258 | | [LC-5] | [LM-4] | [LY-4] |
| Example LP-159 | Packaging material 159 | Ink set 259 | | [LC-5] | [LM-5] | [LY-4] |
| Example LP-160 | Packaging material 160 | Ink set 260 | | [LC-5] | [LM-6] | [LY-4] |
| Example LP-161 | Packaging material 161 | Ink set 261 | | [LC-5] | [LM-7] | [LY-4] |
| Example LP-162 | Packaging material 162 | Ink set 262 | | [LC-5] | [LM-8] | [LY-4] |
| Example LP-163 | Packaging material 163 | Ink set 263 | | [LC-5] | [LM-9] | [LY-4] |
| Example LP-164 | Packaging material 164 | Ink set 264 | | [LC-5] | [LM-10] | [LY-4] |

The use of the gravure printing ink set of the present invention made it possible to produce packaging materials.

<Manufacturing of Aqueous Inkjet Ink> (Example MY-1)

(Preparation of Aqueous Coloring Composition for Inkjet (Hereinafter, "Aqueous Coloring Composition for IJ") [MY-1])

Raw materials below and 200 parts of zirconia beads having a diameter of 1.25 mm were charged into a 200 ml glass bottle and dispersed with a paint shaker manufactured by Red Devil, Inc. for six hours.

Isoindoline compound (1-1): 19.0 parts

Styrene-acrylic acid copolymer (JONCRYL 61J manufactured by BASF Japan Ltd.): 16.4 parts Surfactant (EMULGEN 420 manufactured by Kao Corporation): 5.0 parts Ion exchange water: 59.6 parts Next, the zirconia beads were removed from the dispersion liquid, and aqueous coloring composition for IJ [MY-1] was obtained.

(Preparation of Aqueous Inkjet Ink (Hereinafter, "Aqueous IJ Ink") [MY-1])

33 Parts of aqueous coloring compositions for IJ 1, 5 parts of butyl diglycol, 15 parts of 1,2-propanediol, 8.8 parts of JONCRYL HPD 96 (manufactured by BASF Japan Ltd., water-soluble resin), 1.25 parts of CHEMIPEARL W400S (manufactured by Mitsui Chemicals, Inc., polyolefin aqueous dispersion), 0.5 parts of SURFYNOL DF110D (manufactured by Nissin Chemical Industry Co., Ltd., defoamer), 1 part of BYK-348 (BYK Japan KK, silicon-based surfactant), 0.1 parts of triethanolamine, 0.15 parts of PROXEL GXL (manufactured by LONZA KK, preservative), and 35.2 parts of ion exchange water were mixed with a high-speed mixer and filtered with the membrane filter having a pore diameter of a 0.5 μm, thereby obtaining aqueous IJ ink [MY-1].

Examples MY-2 to MY-15, Manufacturing Examples MY-1 and MY-2, MC-1 to MC-3, and MM-1 to MM-6

(Preparation of Aqueous Coloring Compositions for IJ [MY-2] to [MY-17], [MC-1] to [MC-3], and [MM-1] to [MM-6] and Aqueous IJ Inks [MY-2] to [MY-17], [MC-1] to [MC-3], and [MM-1] to [MM-6])

Aqueous coloring composition for IJ [MY-2] to [MY-17], [MC-1] to [MC-3], and [MM-1] to [MM-6] and aqueous IJ inks [MY-2] to [MY-17], [MC-1] to [MC-3], and [MM-1] to [MM-6] shown in Table 21 were obtained in the same manner as in Example MY-1 except that 19.0 parts of isoindoline compound (1-1) in Manufacturing Example MY-1 was changed to compounds shown in Table 21 and amounts shown in Table 21.

TABLE 21

| | Pigment | | | |
|---|---|---|---|---|
| | Compound name pigment name | Amount charged [parts] | Obtained aqueous coloring composition for IJ | Obtained aqueous IJ ink |
| Example MY-1 | Isoindoline compound (1-1) | 19.00 | Aqueous coloring composition for IJ [MY-1] | Aqueous IJ ink [MY-1] |
| Example MY-2 | Isoindoline compound (1-2) | 19.00 | Aqueous coloring composition for IJ [MY-2] | Aqueous IJ ink [MY-2] |
| Example MY-3 | Isoindoline compound (1-3) | 19.00 | Aqueous coloring composition for IJ [MY-3] | Aqueous IJ ink [MY-3] |
| Example MY-4 | Isoindoline compound (1-4) | 19.00 | Aqueous coloring composition for IJ [MY-4] | Aqueous IJ ink [MY-4] |
| Example MY-5 | Isoindoline compound (1-5) | 19.00 | Aqueous coloring composition for IJ [MY-5] | Aqueous IJ ink [MY-5] |
| Example MY-6 | Isoindoline compound (1-6) | 19.00 | Aqueous coloring composition for IJ [MY-6] | Aqueous IJ ink [MY-6] |
| Example MY-7 | Isoindoline compound (1-7) | 19.00 | Aqueous coloring composition for IJ [MY-7] | Aqueous IJ ink [MY-7] |
| Example MY-8 | Isoindoline compound (1-10) | 19.00 | Aqueous coloring composition for IJ [MY-8] | Aqueous IJ ink [MY-8] |
| Example MY-9 | Isoindoline compound (1-11) | 19.00 | Aqueous coloring composition for IJ [MY-9] | Aqueous IJ ink [MY-9] |
| Example MY-10 | Isoindoline compound (1-12) | 19.00 | Aqueous coloring composition for IJ [MY-10] | Aqueous IJ ink [MY-10] |

TABLE 21-continued

| | Pigment | | | |
|---|---|---|---|---|
| | Compound name pigment name | Amount charged [parts] | Obtained aqueous coloring composition for IJ | Obtained aqueous IJ ink |
| Example MY-11 | Isoindoline compound (1-13) | 19.00 | Aqueous coloring composition for IJ [MY-11] | Aqueous IJ ink [MY-11] |
| Example MY-12 | Isoindoline compound (1-8) | 17.10 | Aqueous coloring composition for IJ [MY-12] | Aqueous IJ ink [MY-12] |
| | Isoindoline compound (1-9) | 1.90 | | |
| Manufacturing Example MY-1 | Isoindoline compound (1-8) | 19.00 | Aqueous coloring composition for IJ [MY-13] | Aqueous IJ ink [MY-13] |
| Example MY-13 | Isoindoline compound (2-1) | 19.00 | Aqueous coloring composition for IJ [MY-14] | Aqueous IJ ink [MY-14] |
| Example MY-14 | Isoindoline compound (2-2) | 19.00 | Aqueous coloring composition for IJ [MY-15] | Aqueous IJ ink [MY-15] |
| Example MY-15 | Isoindoline compound (2-5) | 19.00 | Aqueous coloring composition for IJ [MY-16] | Aqueous IJ ink [MY-16] |
| Manufacturing Example MY-2 | Isoindoline compound (2-3) | 19.00 | Aqueous coloring composition for IJ [MY-17] | Aqueous IJ ink [MY-17] |
| Manufacturing Example MC-1 | PB15:3 | 17.64 | Aqueous coloring composition for IJ [MC-1] | Aqueous IJ ink [MC-1] |
| Manufacturing Example MC-2 | PB15:4 | 17.64 | Aqueous coloring composition for IJ [MC-2] | Aqueous IJ ink [MC-2] |
| Manufacturing Example MC-3 | PB16 | 19.00 | Aqueous coloring composition for IJ [MC-3] | Aqueous IJ ink [MC-3] |
| Manufacturing Example MM-1 | PR122 | 20.09 | Aqueous coloring composition for IJ [MM-1] | Aqueous IJ ink [MM-1] |
| Manufacturing Example MM-2 | PV19 | 20.09 | Aqueous coloring composition for IJ [MM-2] | Aqueous IJ ink [MM-2] |
| Manufacturing Example MM-3 | PR48:3 | 19.00 | Aqueous coloring composition for IJ [MM-3] | Aqueous IJ ink [MM-3] |
| Manufacturing Example MM-4 | PR57:1 | 19.00 | Aqueous coloring composition for IJ [MM-4] | Aqueous IJ ink [MM-4] |
| Manufacturing Example MM-5 | PR146 | 19.00 | Aqueous coloring composition for IJ [MM-5] | Aqueous IJ ink [MM-5] |
| Manufacturing Example MM-6 | PR185 | 19.00 | Aqueous coloring composition for IJ [MM-6] | Aqueous IJ ink [MM-6] |

Pigments used to produce inks are shown in Table 22.

TABLE 22

| Pigment | Product name |
|---|---|
| PB15:3 | LIONOGEN BLUE 7919 (manufactured by Toyocolor Co., Ltd.) |
| PB15:4 | LIONOL BLUE FG-7412-J (manufactured by Toyocolor Co., Ltd.) |
| PB16 | Heliogen Blue D7490 (manufactured by BASF Japan Ltd.) |
| Aluminum phthalocyanine | Aluminum phthalocyanine of Synthesis Example 7 |
| Titanyl phthalocyanine | Titanyl phthalocyanine of Synthesis Example 8 |
| PR122 | Cinquasia Magenta D4550J (manufactured by BASF Japan Ltd.) |
| PV19 | Cinquasia Magenta E05B (manufactured by BASF Japan Ltd.) |
| PR48:3 | FUJI Red 5R 763 (manufactured by Fuji Pigment Co., Ltd.) |
| PR57:1 | SYMULER Brilliant Carmine 6B 400S (manufactured by DIC Corporation) |
| PR146 | LIONOL RED 5620 (manufactured by Toyocolor Co., Ltd.) |
| PR185 | Novoperm Carmine HF4C (manufactured by Clariant AG) |

<Evaluation of Viscosity Stability of Ink over Time>

For aqueous IJ inks [MY-1] to [MY-17], [MC-1] to [MC-3], and [MM-1] to [MM-6], the initial viscosities at 25° C. were measured using an E-type viscometer ("ELD-type viscometer" manufactured by Toki Sangyo Co., Ltd.). The viscosities after an elapse of four weeks at 25° C. and after an elapse acceleration of four weeks at 50° C. were measured in the same manner. Viscosity increase rates with respect to the initial viscosities were calculated using the individual measurement values and used as one of the indexes for viscosity stability, and the viscosity stability was evaluated according to references below. The results are shown in Table 23. It is considered that, as the viscosity increase rate in color becomes smaller, the viscosity stability becomes more outstanding, and the evaluation references "4", "3", and "2" below are practically available levels.

(Evaluation References of Viscosity Stability)

4: The viscosity increase rate is less than 15%.

3: The viscosity increase rate is 15% or more and less than 25%.

2: The viscosity increase rate is 25% or more and less than 40%.

1: The viscosity increase rate is 40% or more.

<Evaluation of Ink Set>

Examples MS-1 to MS-32 and Comparative Examples MS-1 to MS-9

The individual aqueous IJ inks obtained were combined as shown in Table 23 to produce ink sets 301 to 341.

For the obtained ink sets, the gamut was evaluated by a method below. The results are shown in Table 23.

[Gamut Evaluation]

(Initial Evaluation)

In a line pass-type inkjet printer in which inkjet heads having a width-direction resolution of 600 dpi and a maximum discharge frequency of 30 kHz ("KJ4B Series" manufactured by KYOCERA Corporation) were used, the heads were filled with yellow ink, magenta ink, and cyan ink in each ink set, and a color chart image (chart image for profile maker "TC3.5 CMYK i1_i0" manufactured by X-rite, Incorporated) was printed on coated paper (OK top coat N manufactured by Oji Paper Co., Ltd., basis weight of 104.7 g/$m^2$) in a 600×600 dpi resolution, thereby producing a printed article for evaluation.

The color of a color chart part in the obtained printed article for evaluation was measured using a spectrophotometer (i1 i0 Pro manufactured by X-rite, Incorporated) and a color-measuring tool (Measurement Tool and ProfileMaker manufactured by X-rite, Incorporated), and a color reproduction region in the L*a*b* color space was plotted. As measurement conditions, the color was measured with a light source of D50 at a two-degree visual field and a measurement optics of 45/0°. The area was obtained from each of the obtained plots. The area of a comparative example that served as a reference was set to 100%, the area ratio thereto was obtained, and the area ratio was evaluated by criteria below. Specifically, for Examples MS-1 to MS-12 and MS-16 to MS-26 and Comparative Examples MS-3 to MS-8, Comparative Example MS-1 was used as a reference. In addition, for Examples MS-13 to MS-15, Comparative Example MS-2 was used as a reference. In addition, for Examples MS-27 to MS-32, Comparative Example MS-9 was used as a reference.

(Evaluation References)

○: The area ratio is 98% or more (favorable).

Δ: The area ratio is 95% or more and less than 98% (practically available).

X: The area ratio is less than 95% (poor).

TABLE 23

| | Ink set | Aqueous IJ ink (yellow) | Aqueous IJ ink (cyan ink) | Aqueous IJ ink (magenta ink) | Aging viscosity stability: Four weeks at 25° C. Yellow ink | Cyan ink | Magenta ink | Four weeks at 50° C. Yellow ink | Cyan ink | Magenta ink | Gamut: Initial | Over time |
|---|---|---|---|---|---|---|---|---|---|---|---|---|
| Example MS-1 | Ink set 301 | [MY-1] | [MC-1] | [MM-1] | 4 | 4 | 4 | 3 | 4 | 4 | ○ | Δ |
| Example MS-2 | Ink set 302 | [MY-2] | [MC-1] | [MM-1] | 4 | 4 | 4 | 4 | 4 | 4 | ○ | ○ |
| Example MS-3 | Ink set 303 | [MY-3] | [MC-1] | [MM-1] | 3 | 4 | 4 | 2 | 4 | 4 | ○ | Δ |
| Example MS-4 | Ink set 304 | [MY-4] | [MC-1] | [MM-1] | 4 | 4 | 4 | 4 | 4 | 4 | ○ | ○ |
| Example MS-5 | Ink set 305 | [MY-5] | [MC-1] | [MM-1] | 4 | 4 | 4 | 4 | 4 | 4 | ○ | ○ |
| Example MS-6 | Ink set 306 | [MY-6] | [MC-1] | [MM-1] | 4 | 4 | 4 | 4 | 4 | 4 | ○ | ○ |
| Example MS-7 | Ink set 307 | [MY-7] | [MC-1] | [MM-1] | 4 | 4 | 4 | 3 | 4 | 4 | ○ | Δ |
| Example MS-8 | Ink set 308 | [MY-8] | [MC-1] | [MM-1] | 4 | 4 | 4 | 4 | 4 | 4 | ○ | ○ |
| Example MS-9 | Ink set 309 | [MY-9] | [MC-1] | [MM-1] | 4 | 4 | 4 | 4 | 4 | 4 | ○ | ○ |
| Example MS-10 | Ink set 310 | [MY-10] | [MC-1] | [MM-1] | 4 | 4 | 4 | 4 | 4 | 4 | ○ | ○ |
| Example MS-11 | Ink set 311 | [MY-11] | [MC-1] | [MM-1] | 4 | 4 | 4 | 4 | 4 | 4 | ○ | ○ |
| Example MS-12 | Ink set 312 | [MY-12] | [MC-1] | [MM-1] | 3 | 4 | 4 | 2 | 4 | 4 | ○ | Δ |
| Example MS-13 | Ink set 313 | [MY-14] | [MC-1] | [MM-1] | 4 | 4 | 4 | 3 | 4 | 4 | ○ | Δ |
| Example MS-14 | Ink set 314 | [MY-15] | [MC-1] | [MM-1] | 4 | 4 | 4 | 4 | 4 | 4 | ○ | ○ |
| Example MS-15 | Ink set 315 | [MY-16] | [MC-1] | [MM-1] | 4 | 4 | 4 | 4 | 4 | 4 | ○ | ○ |
| Example MS-16 | Ink set 316 | [MY-4] | [MC-1] | [MM-2] | 4 | 4 | 4 | 4 | 4 | 4 | ○ | ○ |
| Example MS-17 | Ink set 317 | [MY-4] | [MC-1] | [MM-3] | 4 | 4 | 4 | 4 | 4 | 4 | ○ | ○ |
| Example MS-18 | Ink set 318 | [MY-4] | [MC-1] | [MM-4] | 4 | 4 | 4 | 4 | 4 | 4 | ○ | ○ |
| Example MS-19 | Ink set 319 | [MY-4] | [MC-1] | [MM-5] | 4 | 4 | 4 | 4 | 4 | 4 | ○ | ○ |
| Example MS-20 | Ink set 320 | [MY-4] | [MC-1] | [MM-6] | 4 | 4 | 4 | 4 | 4 | 4 | ○ | ○ |
| Example MS-21 | Ink set 321 | [MY-4] | [MC-2] | [MM-1] | 4 | 4 | 4 | 4 | 4 | 4 | ○ | ○ |
| Example MS-22 | Ink set 322 | [MY-4] | [MC-2] | [MM-2] | 4 | 4 | 4 | 4 | 4 | 4 | ○ | ○ |
| Example MS-23 | Ink set 323 | [MY-4] | [MC-2] | [MM-3] | 4 | 4 | 4 | 4 | 4 | 4 | ○ | ○ |
| Example MS-24 | Ink set 324 | [MY-4] | [MC-2] | [MM-4] | 4 | 4 | 4 | 4 | 4 | 4 | ○ | ○ |
| Example MS-25 | Ink set 325 | [MY-4] | [MC-2] | [MM-5] | 4 | 4 | 4 | 4 | 4 | 4 | ○ | ○ |
| Example MS-26 | Ink set 326 | [MY-4] | [MC-2] | [MM-6] | 4 | 4 | 4 | 4 | 4 | 4 | ○ | ○ |
| Example MS-27 | Ink set 327 | [MY-4] | [MC-3] | [MM-1] | 4 | 4 | 4 | 4 | 4 | 4 | ○ | ○ |
| Example MS-28 | Ink set 328 | [MY-4] | [MC-3] | [MM-2] | 4 | 4 | 4 | 4 | 4 | 4 | ○ | ○ |
| Example MS-29 | Ink set 329 | [MY-4] | [MC-3] | [MM-3] | 4 | 4 | 4 | 4 | 4 | 4 | ○ | ○ |
| Example MS-30 | Ink set 330 | [MY-4] | [MC-3] | [MM-4] | 4 | 4 | 4 | 4 | 4 | 4 | ○ | ○ |
| Example MS-31 | Ink set 331 | [MY-4] | [MC-3] | [MM-5] | 4 | 4 | 4 | 4 | 4 | 4 | ○ | ○ |
| Example MS-32 | Ink set 332 | [MY-4] | [MC-3] | [MM-6] | 4 | 4 | 4 | 4 | 4 | 4 | ○ | ○ |
| Comparative Example MS-1 | Ink set 333 | [MY-13] | [MC-1] | [MM-1] | 1 | 4 | 4 | 1 | 4 | 4 | Reference | X |
| Comparative Example MS-2 | Ink set 334 | [MY-17] | [MC-1] | [MM-1] | 1 | 4 | 4 | 1 | 4 | 4 | Reference | X |
| Comparative Example MS-3 | Ink set 335 | [MY-13] | [MC-1] | [MM-2] | 1 | 4 | 4 | 1 | 4 | 4 | ○ | X |
| Comparative Example MS-4 | Ink set 336 | [MY-13] | [MC-1] | [MM-3] | 1 | 4 | 4 | 1 | 4 | 4 | ○ | X |
| Comparative Example MS-5 | Ink set 337 | [MY-13] | [MC-1] | [MM-4] | 1 | 4 | 4 | 1 | 4 | 4 | ○ | X |
| Comparative Example MS-6 | Ink set 338 | [MY-13] | [MC-1] | [MM-5] | 1 | 4 | 4 | 1 | 4 | 4 | ○ | X |
| Comparative Example MS-7 | Ink set 339 | [MY-13] | [MC-1] | [MM-6] | 1 | 4 | 4 | 1 | 4 | 4 | ○ | X |
| Comparative Example MS-8 | Ink set 340 | [MY-13] | [MC-2] | [MM-1] | 1 | 4 | 4 | 1 | 4 | 4 | ○ | X |
| Comparative Example MS-9 | Ink set 341 | [MY-13] | [MC-3] | [MM-1] | 1 | 4 | 4 | 1 | 4 | 4 | Reference | X |

(Evaluation References)

○: The area ratio is 90% or more (favorable).

Δ: The area ratio is 85% or more and less than 90% (available).

X: The area ratio is less than 85% (unavailable).

(Aging Evaluation)

Each aqueous IJ ink was put into a closed container and stored at 50° C. for four weeks, then, printing was performed in the same manner as in the initial evaluation, thereby producing a printed article for evaluation. For the obtained printed article, the color was measured in the same manner as in the initial evaluation, and the area was obtained from each of the obtained plots. The area ratio was obtained by dividing the area in the aging evaluation of each of the examples and the comparative examples by the area in the initial evaluation, and the area ratio was evaluated by criteria below.

According to Table 23, the aqueous IJ ink set of the present invention had the same or higher area ratio of gamut and favorable color reproducibility compared with conventional ink sets. In addition, the viscosity stability of the yellow ink over time improved, and the storage stability as an ink set was favorable. Furthermore, regarding the color reproducibility (gamut) as well, the aging evaluation was favorable, and the storage stability as an ink set was favorable.

On the other hand, in Comparative Examples MS-1 to MS-9, the viscosity stability of the yellow ink over time was poor, and, regarding the color reproducibility (gamut), the aging evaluation was poor, and thus the storage stability as an ink set was poor, and the problem of the present application cannot be solved.

The invention claimed is:

1. A pigment composition, comprising:

an isoindoline compound represented by formula (1) below; and an isoindoline compound represented by formula (2) below, wherein a content of the isoindoline compound represented by formula (1) is 50 to 99 mass % of the pigment composition, (1)

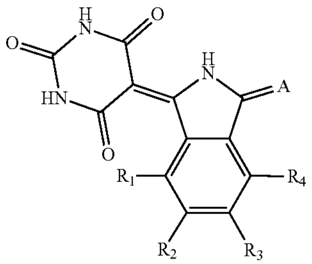

(2)

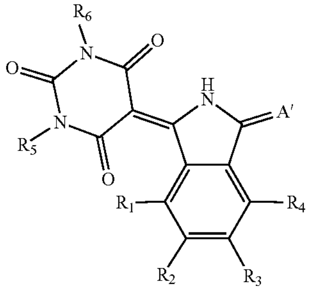

[in the formula, $R_1$ to $R_4$ represent hydrogen atoms, $R_5$ and $R_6$ each independently represent alkyl groups, and A and A' represent a group represented by formula (3) below or formula (5) below, (3)

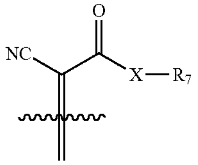

(5)

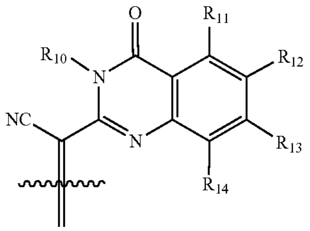

in the formula, X represents —O— or —NH—, $R_7$ represents an alkyl group or an aryl group, and $R_{10}$ to $R_{14}$ each independently represent hydrogen atoms, halogen atoms, alkyl groups, alkoxy groups, aryl groups, aryloxy groups, thioalkyl groups or thioaryl groups].

2. A coloring composition, comprising:

the pigment composition according to claim 1; and a dispersion medium.

3. A composition for molding, comprising:

the coloring composition according to claim 2.

4. A toner, comprising:

the coloring composition according to claim 2.

5. A paint, comprising:

the coloring composition according to claim 2.

6. A printing ink, comprising:

the coloring composition according to claim 2.

7. An inkjet ink, comprising:

the coloring composition according to claim 2.

8. An ink set, at least comprising:

a yellow ink;

a cyan ink; and a magenta ink, wherein the yellow ink is an ink containing the coloring composition according to claim 2.

9. A gravure printing ink set, at least comprising:

a yellow ink;

a cyan ink; and a magenta ink, wherein the yellow ink is an ink containing the coloring composition according to claim 2.

10. The gravure printing ink set according to claim 9, further comprising:

a clear ink.

11. A printed article, comprising:

a base material; and a printed layer formed of a gravure printing ink set containing the coloring composition according to claim 2.

12. A printed article, comprising:

a base material;

a printed layer formed of a gravure printing ink set containing the coloring composition according to claim 2; and a desorption layer formed of a clear ink.

13. A packaging material, comprising:

the printed article according to claim 11.

* * * * *